US009503355B2

United States Patent
Honda et al.

(10) Patent No.: US 9,503,355 B2
(45) Date of Patent: Nov. 22, 2016

(54) VIDEO RECEIVING TERMINAL, HOME GATEWAY DEVICE, QUALITY MANAGEMENT SYSTEM, AND QUALITY DETERIORATION ISOLATION SYSTEM

(71) Applicants: Hiroshi Honda, Chiyoda-ku (JP); Shinji Maeda, Chiyoda-ku (JP); Shin Miura, Chiyoda-ku (JP)

(72) Inventors: Hiroshi Honda, Chiyoda-ku (JP); Shinji Maeda, Chiyoda-ku (JP); Shin Miura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 206 days.

(21) Appl. No.: 14/347,845

(22) PCT Filed: Dec. 27, 2012

(86) PCT No.: PCT/JP2012/083922
§ 371 (c)(1),
(2) Date: Mar. 27, 2014

(87) PCT Pub. No.: WO2013/108566
PCT Pub. Date: Jul. 25, 2013

(65) Prior Publication Data
US 2014/0233420 A1    Aug. 21, 2014

(30) Foreign Application Priority Data

Jan. 16, 2012    (JP) ................................. 2012-006214

(51) Int. Cl.
*H04L 1/00*    (2006.01)
*H04L 12/26*    (2006.01)
(Continued)

(52) U.S. Cl.
CPC ............... *H04L 43/50* (2013.01); *H04L 43/06* (2013.01); *H04L 65/605* (2013.01); *H04L 65/80* (2013.01); *H04L 67/303* (2013.01); *H04N 21/2383* (2013.01); *H04N 21/4382* (2013.01);
(Continued)

(58) Field of Classification Search
None
See application file for complete search history.

(56) References Cited

U.S. PATENT DOCUMENTS 8,707,139 B2 *   4/2014   Wolfgang ............... H04L 1/007
                                                        714/776
2005/0180415 A1    8/2005   Cheung et al.
(Continued)

FOREIGN PATENT DOCUMENTS

JP    2003-333577    11/2003
JP    2005-210160    8/2005
(Continued)

OTHER PUBLICATIONS

Partial Supplementary European Search Report issued Jun. 26, 2015 in Patent Application No. 12866194.9.
(Continued)

Primary Examiner — Minh-Trang Nguyen
(74) Attorney, Agent, or Firm — Oblon, McClelland, Maier & Neustadt, L.L.P.

(57) ABSTRACT

A pre-FEC packet quality analyzer 310 measures quality information from a video stream which is not yet stored in a buffer 303 and on which a recovery process using FEC is not yet carried out. A post-FEC packet quality analyzer 308 measures quality information from the video stream which is stored in the buffer 303 and on which the recovery process using FEC is carried out. A video receiving terminal profile transmitter 307 generates a video receiving terminal profile including at least information showing the size of the buffer 303, and transmits the video receiving terminal profile to a home gateway device.

24 Claims, 41 Drawing Sheets

(51) Int. Cl.

| | |
|---|---|
| *H04N 21/438* | (2011.01) |
| *H04N 21/4425* | (2011.01) |
| *H04L 29/06* | (2006.01) |
| *H04L 29/08* | (2006.01) |
| *H04N 21/2383* | (2011.01) |
| *H04N 21/61* | (2011.01) |
| *H04N 21/436* | (2011.01) |
| *H04N 21/6437* | (2011.01) |

(52) U.S. Cl.
CPC .... *H04N21/43615* (2013.01); *H04N 21/4425* (2013.01); *H04N 21/6125* (2013.01); *H04N 21/6437* (2013.01)

(56) References Cited

U.S. PATENT DOCUMENTS

| | | | |
|---|---|---|---|
| 2009/0158362 A1* | 6/2009 | Kajos | H04N 7/17318 725/91 |
| 2011/0055882 A1* | 3/2011 | Ohya | H04N 21/23439 725/93 |
| 2011/0126241 A1* | 5/2011 | Beattie, Jr. | H04N 21/23439 725/62 |
| 2013/0091528 A1 | 4/2013 | Honda | |
| 2013/0111538 A1 | 5/2013 | Endo et al. | |

FOREIGN PATENT DOCUMENTS

| | | |
|---|---|---|
| JP | 2009-77108 | 4/2009 |
| JP | 2010-41496 | 2/2010 |
| JP | 2010-161550 | 7/2010 |
| JP | 2010-161649 | 7/2010 |
| JP | 2011-9927 | 1/2011 |
| JP | 2011-10237 | 1/2011 |
| JP | 2011-19068 | 1/2011 |
| WO | WO 2011/161874 A1 | 12/2011 |
| WO | WO 2012/004924 A1 | 1/2012 |

OTHER PUBLICATIONS

Mu Mu, et al., "Discrete quality assessment in IPTV content distribution networks" Signal processing: Image Communication, vol. 26, No. 7, XP028256053, Mar. 29, 2011, pp. 339-357.

"Speech and multimedia Transmission Quality (STQ); Multimedia quality measurement; End-to-end quality measurement framework" Technical Report, ETSI TR 102 714, vol. STQ, No. V1. 1. 1, XP014067974, Aug. 1, 2011, 24 Pages.

International Search Report issued Apr. 9, 2013, in PCT/JP12/083922 filed Dec. 27, 2012.

\* cited by examiner

FIG.4

| User Identification Information A1 | 1234A |
|---|---|
| Quality Information Measurement Time Interval B1 | 10 sec |
| Destination Address C1 | ff3e::1 |
| Buffer Size D1 | 10Mbyte |

FIG.5

| User Identification Information A2 | 1234A |
|---|---|
| Device Identification Information E2 | IPSTB01 |
| Quality Information Type F2 | FEC_AFTER |
| Quality Information Sequence Number G2 | 20 |
| Timestamp H2 | Mon Sep 5 16:19:15 2011 |
| Measurement Section Identification Value I2 | 3253 |
| Number Of Packets J2 | 12314 |
| Quality Value K2 | 10 |

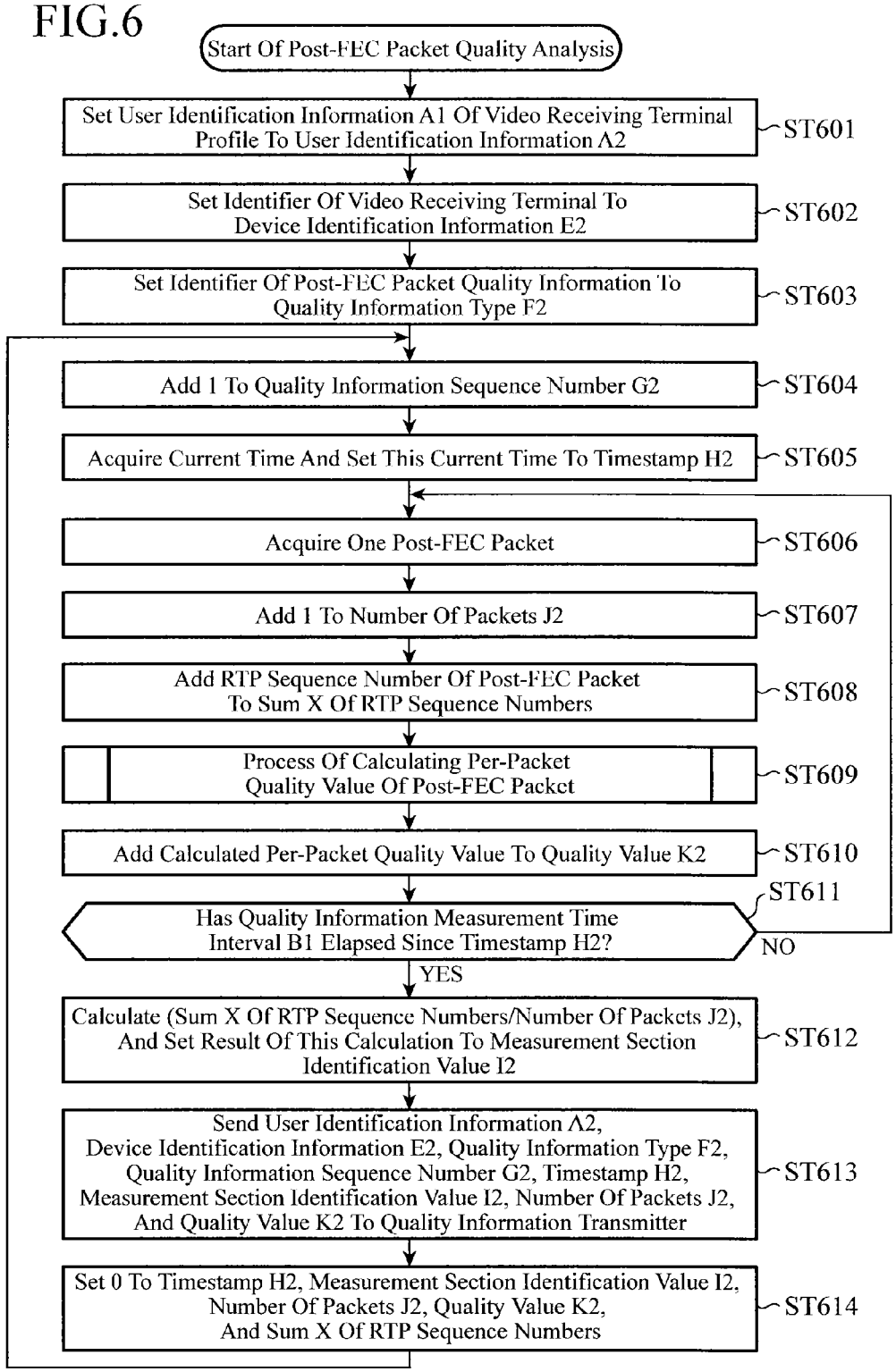

| User Identification Information A3 | 1234A |
|---|---|
| Device Identification Information E3 | IPSTB01 |
| Quality Information Type F3 | FEC_BEFORE |
| Quality Information Sequence Number G3 | 24 |
| Timestamp H3 | Mon Sep 5 16:19:14 2011 |
| Measurement Section Identification Value I3 | 3453 |
| Number Of Packets J3 | 12334 |
| Quality Value K3 | 18 |

FIG.12

| User Identification Information A4 | 1234A |
|---|---|
| Device Identification Information E4 | HGW01 |
| Quality Information Type F4 | FEC_BEFORE |
| Quality Information Sequence Number G4 | 32 |
| Timestamp H4 | Mon Sep 5 16:19:12 2011 |
| Measurement Section Identification Value I4 | 3053 |
| Number Of Packets J4 | 10334 |
| Quality Value K4 | 9 |

FIG.20

| Post-FEC Packet Quality Of Video Receiving Terminal | Pre-FEC Packet Quality Of Video Receiving Terminal | Pre-FEC Packet Quality Of Home Gateway Device | Result Of Determination Of Isolation Of Quality Deterioration |
|---|---|---|---|
| Good | Good | Good | No Deterioration Occurs |
| Good | Good | Deteriorated | System Abnormality |
| Good | Deteriorated | Good | Deterioration Has Occurred In Home Network, But Is Recovered Through FEC Process By Video Receiving Terminal |
| Deteriorated | Good | Good | Deterioration Has Occurred In Video Receiving Terminal |
| Good | Deteriorated | Deteriorated | Deterioration Has Occurred In External Network, But Is Recovered Through FEC Process By Video Receiving Terminal |
| Deteriorated | Good | Deteriorated | System Abnormality |
| Deteriorated | Deteriorated | Good | Deterioration Has Occurred In Home Network And Cannot Be Recovered Even Through FEC Process By Video Receiving Terminal |
| Deteriorated | Deteriorated | Deteriorated | Deterioration Has Occurred In External Network And Cannot Be Recovered Even Through FEC Process By Video Receiving Terminal |

FIG.24

| User Identification Information A5 | 1234A |
|---|---|
| Quality Information Sequence Number G5 | 20 |
| Timestamp H5 | Mon Sep 5 16:19:15 2011 |
| Number Of Packets J5 | 12314 |
| Quality Value (1) L5 | 0 |
| Quality Value (2) M5 | 8 |
| Quality Value (3) N5 | 8 |

FIG.36

| | |
|---|---|
| User Identification Information A6 | 1234A |
| Device Identification Information E6 | IPSTB01 |
| Quality Information Type F6 | FEC_AFTER |
| Quality Information Sequence Number G6 | 20 |
| Quality Value K6 | 9 |
| NTP Time L6 At Time Of First Time Packet Reception | Mon Sep 5 16:19:14 2011 |
| NTP Time M6 At Time Of Final Packet Reception | Mon Sep 5 16:24:44 2011 |
| NTP Time N6 At Time Of Specific Packet Reception | Mon Sep 5 16:22:24 2011 |
| Identification Value O6 Of Specific Packet | 10000 |

FIG.38

| User Identification Information A7 | 1234A |
|---|---|
| Device Identification Information E7 | IPSTB01 |
| Quality Information Type F7 | FEC_BEFORE |
| Quality Information Sequence Number G7 | 24 |
| Quality Value K7 | 9 |
| NTP Time L7 At Time Of First Time Packet Reception | Mon Sep 5 16:18:12 2011 |
| NTP Time M7 At Time Of Final Packet Reception | Mon Sep 5 16:22:43 2011 |
| NTP Time N7 At Time Of Specific Packet Reception | Mon Sep 5 16:24:21 2011 |
| Identification Value O7 Of Specific Packet | 10000 |

FIG.41

| User Identification Information A8 | 1234A |
|---|---|
| Device Identification Information E8 | HGW01 |
| Quality Information Type F8 | FEC_BEFORE |
| Quality Information Sequence Number G8 | 32 |
| Quality Value K8 | 9 |
| NTP Time L8 At Time Of First Time Packet Reception | Mon Sep 5 16:18:09 2011 |
| NTP Time M8 At Time Of Final Packet Reception | Mon Sep 5 16:22:42 2011 |
| NTP Time N8 At Time Of Specific Packet Reception | Mon Sep 5 16:24:20 2011 |
| Identification Value O8 Of Specific Packet | 10000 |

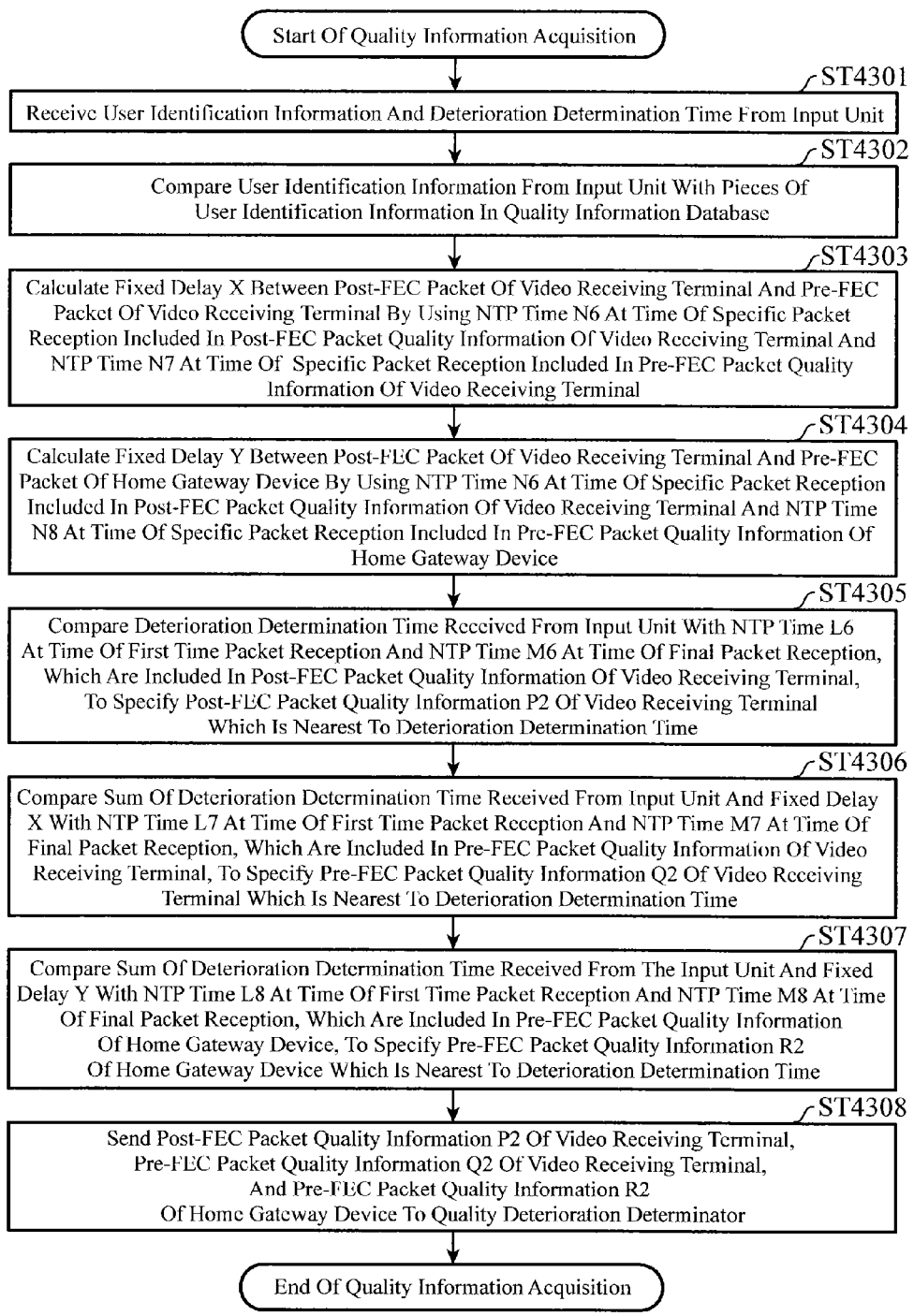

VIDEO RECEIVING TERMINAL, HOME GATEWAY DEVICE, QUALITY MANAGEMENT SYSTEM, AND QUALITY DETERIORATION ISOLATION SYSTEM

FIELD OF THE INVENTION

The present invention relates to a video receiving terminal, a home gateway device, a quality management system, and a quality deterioration isolation system that isolate the cause of a quality deterioration in a real-time video communication service.

BACKGROUND OF THE INVENTION

In recent years, services of carrying out video communications on an IP network in real time, such as video delivery, have become widespread. Because an IP network is a best-effort network and does not guarantee network transmission quality, a transfer delay may occur in a packet and packet losses may occur. In addition, also in a video receiving terminal which receives services, packet discarding due to a buffer overflow or the like may occur. To solve this problem, there is a necessity to provide a technique of, if the quality of a video which a user is watching and listening deteriorates when providing a video communication service, isolating the cause of the deterioration.

As the technique of isolating the cause of a quality deterioration, there is a method of, when a deterioration has occurred, determining whether the deterioration has occurred in either one of an external network side which is a network outside the user's house, a home network side which is a network in the user's house, and the video receiving terminal.

As the technique of isolating the cause of a quality deterioration, there is a method as disclosed in, for example, patent reference 1. According to this method, quality information of a video stream is measured in a relay device, such as a home gateway device, between an external network and a home network, and a video receiving terminal. Information about packet losses and packet delays are included in the quality information. By comparing the quality information measured in the relay device with that measure in the video receiving terminal, whether the cause of a quality deterioration is in the external network side, the home network side or the video receiving terminal can be determined and notified.

RELATED ART DOCUMENT

Patent Reference

Patent reference 1: Japanese Unexamined Patent Application Publication No. 2010-161649

SUMMARY OF THE INVENTION

Problems to be Solved by the Invention

However, the conventional technique shown in the patent reference 1 has the following problem. More specifically, a problem with the conventional technology is that because the measurement of the quality information is not carried out according to the size of a buffer for absorbing packet delay fluctuations which the video receiving terminal has, the accuracy of the isolation of a quality deterioration gets worse. In the conventional technology, the home gateway device does not measure the quality information according to the buffer size. Therefore, it may be determined erroneously that although no quality deterioration has occurred actually, a quality deterioration has occurred, or that although a quality deterioration has occurred actually, no quality deterioration has occurred.

Further, conventionally, in the course of processing a video stream by a video receiving terminal, the video receiving terminal does not isolate whether a packet loss of the video stream has been recovered by using FEC (Forward Error Correction). Therefore, a problem is that even when, for example, a packet loss has been recovered by using FEC and a deterioration has not occurred in a video which the user is watching and listening, a notification that a deterioration has occurred is provided.

The present invention is made in order to solve the above-mentioned problems, and it is therefore an object of the present invention to provide a video receiving terminal, a home gateway device, a quality management system, and a quality deterioration isolation system that isolate the cause of a quality deterioration with a high degree of precision in a real-time video communication service.

Means for Solving the Problem

In accordance with the present invention, there is provided a video receiving terminal that is connected to a best-effort network and uses a service of carrying out video communications in real time, the video receiving terminal including: a pre-FEC packet quality analyzer that measures quality information from a video stream which is not yet stored in a buffer used for absorbing packet delay fluctuations in the video stream and on which a recovery process using FEC is not yet carried out; a post-FEC packet quality analyzer that measures quality information from the video stream which is stored in the buffer and on which the recovery process using FEC is carried out; a quality information transmitter that transmits the pieces of measured quality information; and a video receiving terminal profile transmitter that generates a video receiving terminal profile including at least information showing the size of the buffer, and transmits the video receiving terminal profile.

Advantages of the Invention

Because the video receiving terminal in accordance with the present invention generates the quality information by using the video receiving terminal profile including the information showing the size of the buffer for absorbing packet delay fluctuations of the video stream in the video receiving terminal, the cause of a quality deterioration can be isolated with a high degree of precision.

BRIEF DESCRIPTION OF THE FIGURES

FIG. 4 is an explanatory drawing showing an example of a video receiving terminal profile in accordance with Embodiment 1 of the present invention;

FIG. 5 is an explanatory drawing showing an example of post-FEC packet quality information measured by the video receiving terminal in accordance with Embodiment 1 of the present invention;

FIG. 6 is a flow chart a series of processes of measuring the post-FEC packet quality information which is carried out by a post-FEC packet quality analyzer disposed in the video receiving terminal in accordance with Embodiment 1 of the present invention;

FIG. 12 is an explanatory drawing showing an example of pre-FEC packet quality information measured by the home gateway device in accordance with Embodiment 1 of the present invention;

FIG. 20 is an explanatory drawing showing a quality deterioration isolating determination table for use in the quality deterioration determinator disposed in the quality management system in accordance with Embodiment 1 of the present invention;

FIG. 24 is an explanatory drawing showing an example of quality information measured by the video receiving terminal in accordance with Embodiment 2 of the present invention;

FIG. 36 is an explanatory drawing showing an example of post-FEC packet quality information measured by the video receiving terminal in accordance with Embodiment 4 of the present invention;

FIG. 38 is an explanatory drawing showing an example of pre-FEC packet quality information measured by the video receiving terminal in accordance with Embodiment 4 of the present invention;

FIG. 41 is an explanatory drawing showing an example of pre-FEC packet quality information measured by the home gateway device in accordance with Embodiment 4 of the present invention;

FIG. 43 is a flow chart showing a series of processes of acquiring quality information from a quality information database which is carried out by a quality information classifier disposed in a quality management system in accordance with Embodiment 4 of the present invention.

EMBODIMENTS OF THE INVENTION

Hereafter, in order to explain this invention in greater detail, the preferred embodiments of the present invention will be described with reference to the accompanying drawings.

Embodiment 1

Figure 1:
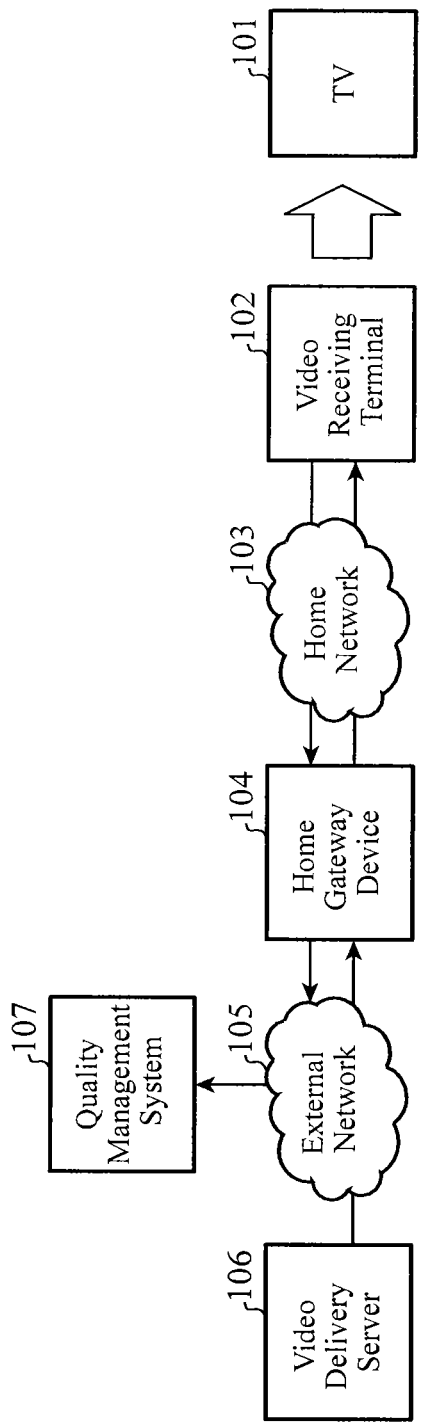
FIG. 1 is a block diagram of a quality deterioration isolation system in accordance with Embodiment 1 of the present invention.

FIG. 1 is a block diagram showing a quality deterioration isolation system in accordance with Embodiment 1. FIG. 1 shows a system structure including a TV 101, a video receiving terminal 102, a home network 103, a home gateway device 104, an external network 105, a video delivery server 106, and a quality management system 107. The TV 101, the video receiving terminal 102, and the home gateway device 104 are placed in a house. The TV 101 is connected to the video receiving terminal 102 via a video input/output interface (not shown). The video receiving terminal 102 is connected to the home gateway device 104 via the home network 103 which is a network in the house. The home gateway device 104 is connected to the external network 105 by way of an optical fiber or a telephone line (neither of them is shown in the figure), and transfers packets between the external network and the home network.

Further, the video delivery server 106 delivers a video via the external network 105. In this embodiment, it is assumed that the video is formed into RTP packets and is delivered by using UDP as a transport protocol. As an alternative, the video can be delivered by using HTTP or the like. Packets, which are simply mentioned hereafter, refer to RTP packets. A video stream delivered is transferred to the video receiving terminal 102 via the home gateway device 104. The video receiving terminal 102 outputs the video delivered thereto to the TV 101.

At this time, the video receiving terminal 102 measures quality information by using the video stream delivered thereto from the video delivery server 106. Information which the quality management system 107 uses to isolate the cause of a quality deterioration is included in the quality information. The quality information measured by the video receiving terminal 102 includes pre-FEC packet quality information and post-FEC packet quality information.

A video stream which is not yet stored in a buffer disposed in the video receiving terminal 102 in order to absorb packet delay fluctuations and on which no recovery from packet losses using FEC is carried out is called pre-FEC packets. The pre-FEC packets are lined up in the order in which they have arrived at the video receiving terminal 102, and this order does not necessarily match the order of RTP sequence numbers. Quality information measured from these pre-FEC packets is the pre-FEC packet quality information.

A video stream which is already stored in the buffer of the video receiving terminal 102 and on which recovery from packet losses using FEC is carried out is called post-FEC packets. The post-FEC packets are lined up in the order of the RTP sequence numbers. Quality information measured from these post-FEC packets is the post-FEC packet quality information. The video receiving terminal 102 transmits both the pre-FEC packet quality information and the post-FEC packet quality information to the quality management system 107.

Further, the home gateway device 104 catches the video stream transferred to the video receiving terminal 102, and measures quality information. Information which the quality management system 107 uses to isolate the cause of a quality deterioration is included in the quality information. The quality information measured by the home gateway device 104 is pre-FEC packet quality information. The home gateway device 104 measures the quality information on the basis of buffering for absorbing packet delay fluctuations and packets on which no recovery from packet losses using FEC is carried out. Therefore, the quality information measured by the home gateway device 104 is also called pre-FEC packet quality information. The home gateway device 104 transmits the pre-FEC packet quality information measured thereby to the quality management system 107.

The quality management system 107 stores both the quality information transmitted thereto from the video receiving terminal 102 and the quality information transmitted thereto from the home gateway device 104. When user identification information and a time are inputted, the quality management system 107 outputs the result of the determination of isolation of a quality deterioration of the video which the corresponding user was watching and listening at that time by using the quality information stored therein. The quality management system 107 can carry out the determination of isolation of a quality deterioration on pieces of quality information about a plurality of users in real time, or can carry out the determination of isolation of a quality deterioration on past quality information about a specific user.

The result of the determination of isolation of a quality deterioration includes information showing in which one of the external network 105, the home network 103, and the video receiving terminal 102 the deterioration has occurred, and information showing whether or not the deterioration has been recovered by using FEC.

[The Operation of the System in Accordance with Embodiment 1]

Figure 2:
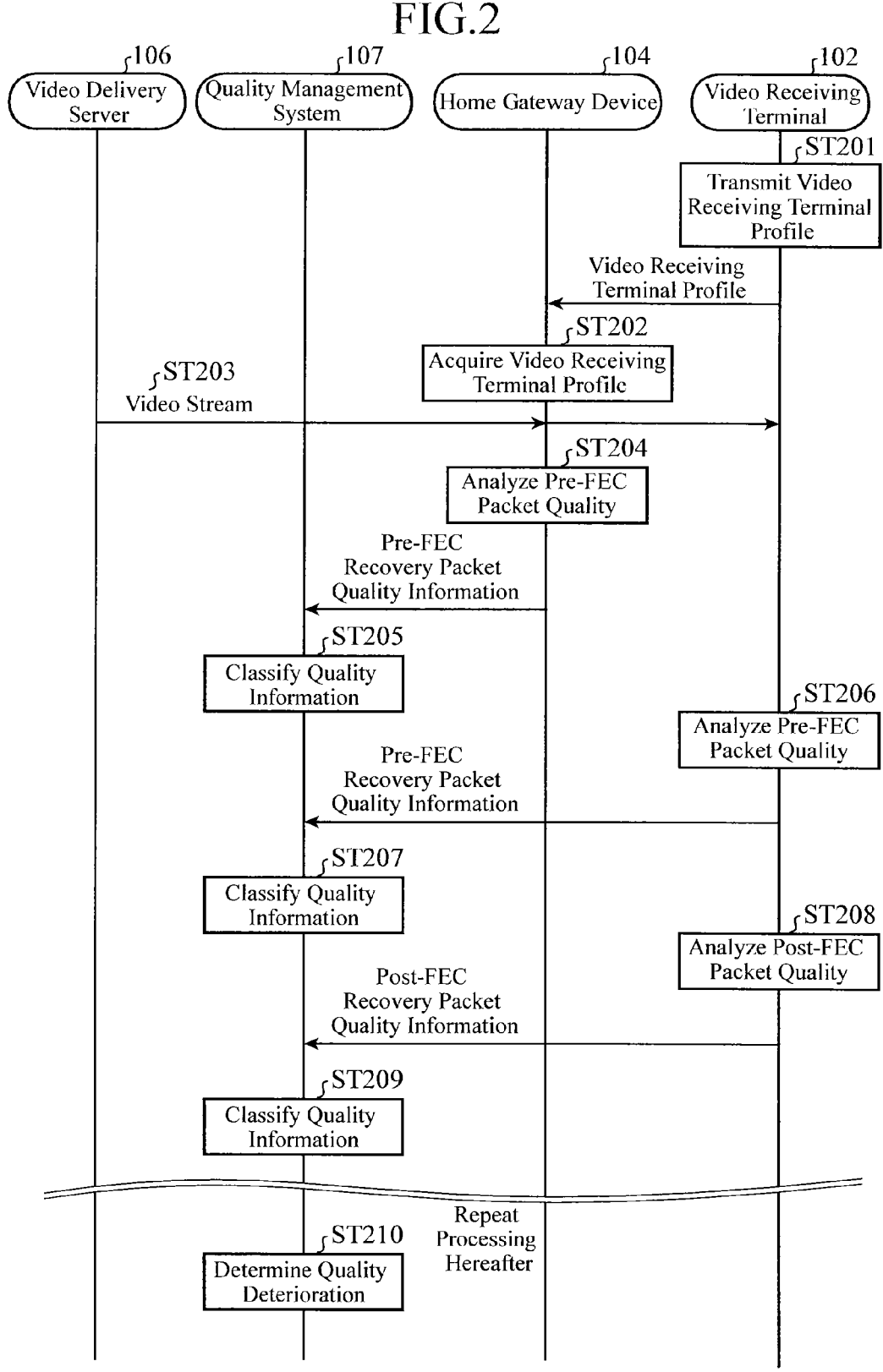
FIG. 2 is a sequence diagram showing the operation of the quality deterioration isolation system in accordance with Embodiment 1 of the present invention.

The operation of the system in accordance with Embodiment 1 of the present invention will be explained with reference to FIG. 2. FIG. 2 is a sequence diagram showing the operation of the quality deterioration isolation system. The video receiving terminal 102 generates a video receiving terminal profile, and transmits this video receiving terminal profile to the home gateway device 104 (step ST201). Information used in order for the home gateway device 104 to measure pre-FEC packet quality information is included in the video receiving terminal profile.

The video delivery server 106 delivers a video to the external network 105 (step ST203). The home gateway device 104 catches the video stream delivered thereto, measures pre-FEC packet quality information, and transmits this pre-FEC packet quality information to the quality management system 107 (step ST204). The quality management system 107 classifies and stores the pre-FEC packet quality information received thereby (step ST205).

The video receiving terminal 102 catches the video stream delivered thereto which is not yet stored in the buffer and on which a recovery process using FEC is not yet carried out, and measures pre-FEC packet quality information and transmits this pre-FEC packet quality information to the quality management system 107 (step ST206). The quality management system 107 classifies and stores the pre-FEC packet quality information received thereby (step ST207).

The video receiving terminal 102 catches the video stream delivered thereto which is already stored in the buffer and on which the recovery process using FEC is already carried out, and measures post-FEC packet quality information and transmits this post-FEC packet quality information to the quality management system 107 (step ST208). The quality management system 107 classifies and stores the post-FEC packet quality information received thereby (step ST209).

After that, the video receiving terminal 102 and the home gateway device 104 transmit the pieces of quality information measured thereby to the quality management system 107 at specified quality information measurement time intervals.

When user identification information and a time are inputted, the quality management system 107 outputs the result of the determination of isolation of a quality deterioration for the video which the corresponding user was watching and listening at that time by using the quality information stored therein (step ST210).

[The Video Receiving Terminal in Accordance with Embodiment 1]

Figure 3:
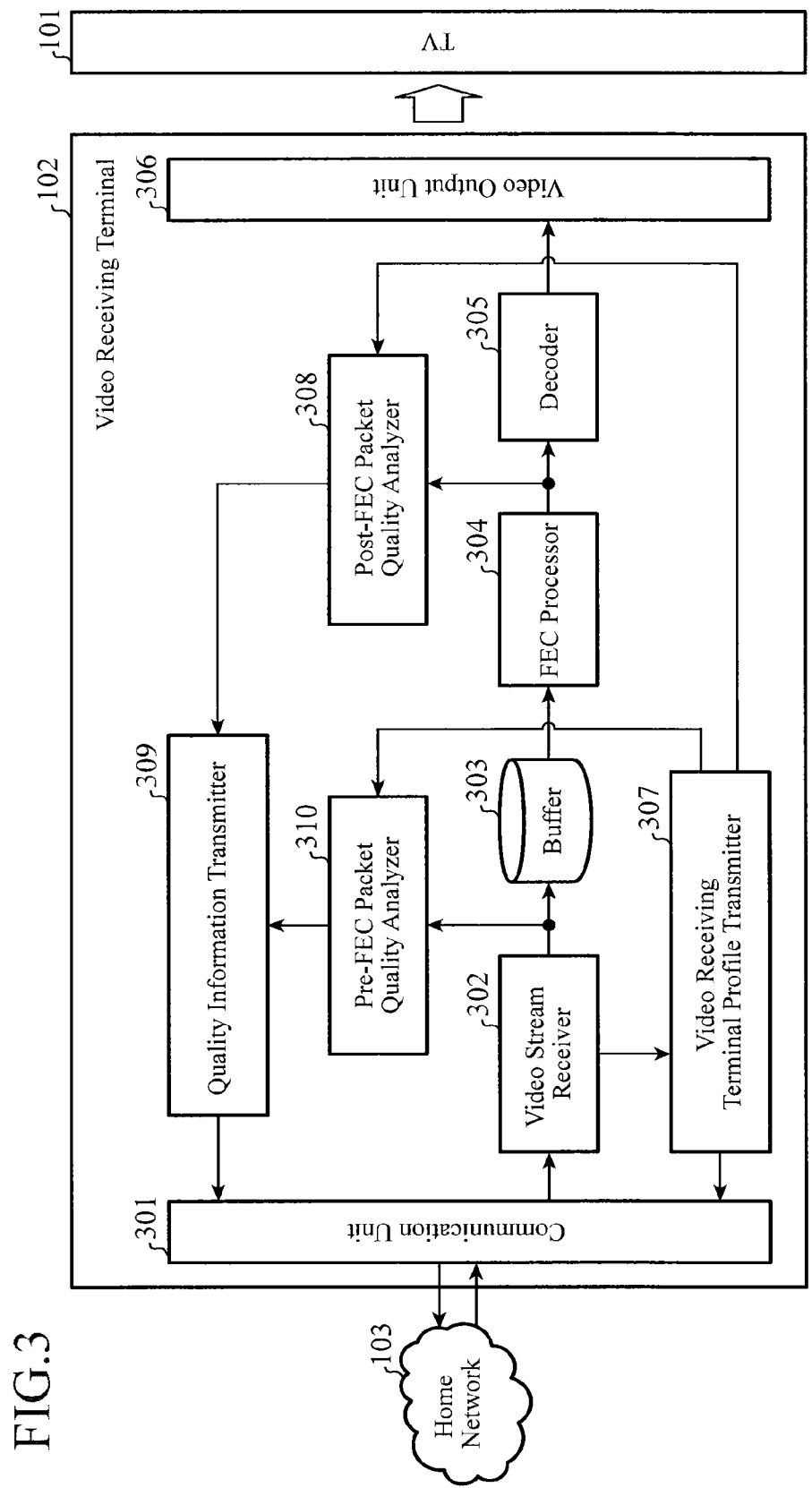
FIG. 3 is a block diagram of a video receiving terminal in accordance with Embodiment 1 of the present invention.

The structure of the video receiving terminal 102 in accordance with Embodiment 1 of the present invention will be explained. FIG. 3 is a diagram showing the structure of the video receiving terminal 102. A communication unit 301 receives a video stream from the home network 103, and delivers this video stream to a video stream receiver 302. The video stream receiver 302 stores the video stream received thereby in a buffer 303 in order to absorb packet delay fluctuations of the received video stream. An FEC processor 304 extracts the video stream from the buffer 303, and, when a packet loss has occurred in the video stream, carries out a recovery process using FEC on the video stream and sends this video stream to a decoder 305. The decoder 305 decodes the video stream received thereby and sends the video stream decoded thereby to a video output unit 306. The video output unit 306 outputs the video to the TV 101 via the video input/output interface.

Next, the video receiving terminal profile generated by the video receiving terminal 102 will be explained. A video receiving terminal profile transmitter 307 generates the video receiving terminal profile from information specific to the video receiving terminal 102 and information acquired from the video stream receiver 302.

The video receiving terminal 102 and the home gateway device 104 use the video receiving terminal profile in order to measure the quality information. The video receiving terminal profile transmitter 307 sends the video receiving terminal profile generated to a pre-FEC packet quality analyzer 310 and a post-FEC packet quality analyzer 308. The video receiving terminal profile transmitter 307 also transmits the video receiving terminal profile to the home gateway device 104 via the communication unit 301.

FIG. 4 shows an example of the video receiving terminal profile. User identification information A1 is the one for identifying a user. The user identification information A1 is added to the pre-FEC packet quality information and the post-FEC packet quality information which are measured by the video receiving terminal 102, and the pre-FEC packet quality information measured by the home gateway device 104. The quality management system 107 identifies from which user the quality information has been transmitted by using the user identification information A1.

Quality information measurement time intervals of B1 are the ones at which the video receiving terminal 102 and the home gateway device 104 measure the pieces of quality information. The video receiving terminal 102 measures the pre-FEC packet quality information and the post-FEC packet quality information at the quality information measurement time intervals of B1. The home gateway device 104 measures the pre-FEC packet quality information at the quality information measurement time intervals of B1.

A destination address C1 is the destination IP address of the video stream. When acquiring the destination IP address of the video stream delivered thereto from the video delivery server 106, the video stream receiver 302 notifies the destination IP address to the video receiving terminal profile transmitter 307. The home gateway device 104 catches a packet whose destination IP address matches the destination address C1, and measures the pre-FEC packet quality information.

A buffer size D1 is the size of the buffer 303. When measuring the pre-FEC packet quality information, the video receiving terminal 102 and the home gateway device 104 use the buffer size D1.

Next, the post-FEC packet quality information measured by the video receiving terminal 102 will be explained. The post-FEC packet quality analyzer 308 makes a copy of the video stream which the FEC processor 304 sends to the decoder 305, and measures the post-FEC packet quality information.

The post-FEC packet quality analyzer 308 then sends the post-FEC packet quality information measured thereby to a quality information transmitter 309. The quality information transmitter 309 transmits the post-FEC packet quality information to the quality management system 107 via the communication unit 301.

FIG. 5 shows an example of the post-FEC packet quality information measured by the video receiving terminal 102. User identification information A2 has a value equal to that of the user identification information A1 included in the video receiving terminal profile acquired from the video receiving terminal profile transmitter 307.

Device identification information E2 is used in order to identify which one of the video receiving terminal 102 and the home gateway device 104 has measured the quality information. The quality management system 107 identifies from which one of the video receiving terminal 102 and the home gateway device 104 the quality information has been transmitted by using the device identification information E2. In the example of FIG. 5, the identifier (=IPSTB01) of the video receiving terminal is set to the device identification information E2.

A quality information type F2 is used in order to identify whether the quality information is pre-FEC packet quality information or post-FEC packet quality information. The quality management system 107 identifies whether the quality information is pre-FEC packet quality information or post-FEC packet quality information by using the quality information type F2. In the example of FIG. 5, the identifier (=FEC_AFTER) of the post-FEC packet quality information is set to the quality information type F2.

A quality information sequence number G2 is incremented by one every time when the post-FEC packet quality analyzer 308 measures the post-FEC packet quality information. The quality management system 107 sorts the pieces of post-FEC packet quality information transmitted thereto in the order in which they have been measured by using the quality information sequence number G2.

A timestamp H2 is the time that the post-FEC packet quality information is measured. The quality management system 107 isolates a quality deterioration at a specified time with reference to the timestamp H2.

A measurement section identification value I2 is the one used in order to determine in which section in the video stream the post-FEC packet quality information has been measured. In this embodiment, the measurement section identification value I2 is the average of RTP sequence numbers. The average of RTP sequence numbers is the average of the sequence numbers of RTP packets included in post-FEC packets used for the measurement of the post-FEC packet quality information during a quality information measurement time interval of B1. The quality management system 107 uses the measurement section identification value I2 to determine in which section in the video stream the post-FEC packet quality information has been measured. As the measurement section identification value I2, instead of the average of RTP sequence numbers, the median of RTP sequence numbers or the like can be used.

A number of packets J2 is the number of post-FEC packets used for the measurement of the post-FEC packet quality information during a quality information measurement time interval of B1. Like the measurement section identification value I2, the number of packets is used in order to determine in which section in the video stream the post-FEC packet quality information has been measured.

A quality value K2 is a value showing the quality of the post-FEC packet quality information. In this embodiment, the quality value K2 is the number of packet losses. The number of packet losses is the number of post-FEC packets each of which is determined to be a loss during a quality information measurement time interval of B1. The quality management system 107 uses the quality value K2 in order to determine whether the quality of post-FEC packets has deteriorated. Therefore, in the case of using, for example, MPEG-2 or H.264 for the image compression coding of the video stream, the quality value K2 can be the number of lost video frames or the like. Further, an only one value does not have to be provided as the quality value K2, and a plurality of values can be alternatively provided as quality values.

FIG. 6 is a flow chart a series of processes of measuring the post-FEC packet quality information which is carried out by the post-FEC packet quality analyzer 308. First, the post-FEC packet quality analyzer sets the user identification information A1 included in the video receiving terminal profile acquired from the video receiving terminal profile transmitter 307 to the user identification information A2 (step ST601). The post-FEC packet quality analyzer sets the identifier of the video receiving terminal to the device identification information E2 (step ST602). The post-FEC packet quality analyzer sets the identifier of the post-FEC packet quality information to the quality information type F2 (step ST603).

The post-FEC packet quality analyzer adds 1 to the quality information sequence number G2 (step ST604). The post-FEC packet quality analyzer acquires the current time and sets this current time to the timestamp H2 (step ST605).

The post-FEC packet quality analyzer acquires one post-FEC packet (step ST606). The post-FEC packet quality analyzer adds 1 to the number of packets J2 (step ST607). The post-FEC packet quality analyzer adds the RTP sequence number of the post-FEC packet acquired in step ST606 to the sum X of RTP sequence numbers (step ST608). The post-FEC packet quality analyzer uses the sum X of RTP sequence numbers in order to calculate the measurement section identification value I2.

The post-FEC packet quality analyzer calculates a per-packet quality value of the post-FEC packet (step ST609). The per-packet quality value of the post-FEC packet is the one calculated for each post-FEC packet, and the cumulative sum of per-packet quality values during a quality information measurement time interval of B1 is provided as the quality value. A method of calculating the per-packet quality value of the post-FEC packet in step ST609 will be mentioned below by using a flow chart shown in FIG. 7. The post-FEC packet quality analyzer then adds the per-packet quality value calculated in step ST609 to the quality value K2 (step ST610).

The post-FEC packet quality analyzer checks whether a quality information measurement time interval of B1 included in the video receiving terminal profile has elapsed since the timestamp H2 set in step ST605 (step ST611). When the result of the check shows that a quality information measurement time interval has elapsed since the timestamp, the post-FEC packet quality analyzer advances to step ST612 (when Yes in step ST611). In contrast, when a quality information measurement time interval has not elapsed since the timestamp, the post-FEC packet quality analyzer advances to step ST606 (when No in step ST611).

The post-FEC packet quality analyzer calculates (the sum X of RTP sequence numbers/the number of packets J2), and sets the result of this division to the measurement section identification value I2 (step ST612). The post-FEC packet quality analyzer sends the user identification information A2, the device identification information E2, the quality information type F2, the quality information sequence number G2, the timestamp H2, the measurement section identification value I2, the number of packets J2, and the quality value K2 to the quality information transmitter 309 as the post-FEC packet quality information (step ST613). The post-FEC packet quality analyzer then sets 0 to the timestamp H2, the measurement section identification value I2, the number of packets J2, the quality value K2, and the sum X of RTP sequence numbers, and advances to step ST604 (step ST614).

Referring to FIG. 6, the post-FEC packet quality analyzer calculates the measurement section identification value I2 and the number of packets J2, and then adds these values to the post-FEC packet quality information, so that the quality management system 107 can determine in which section in the video stream the post-FEC packet quality information has been measured.

Figures 7, 8:
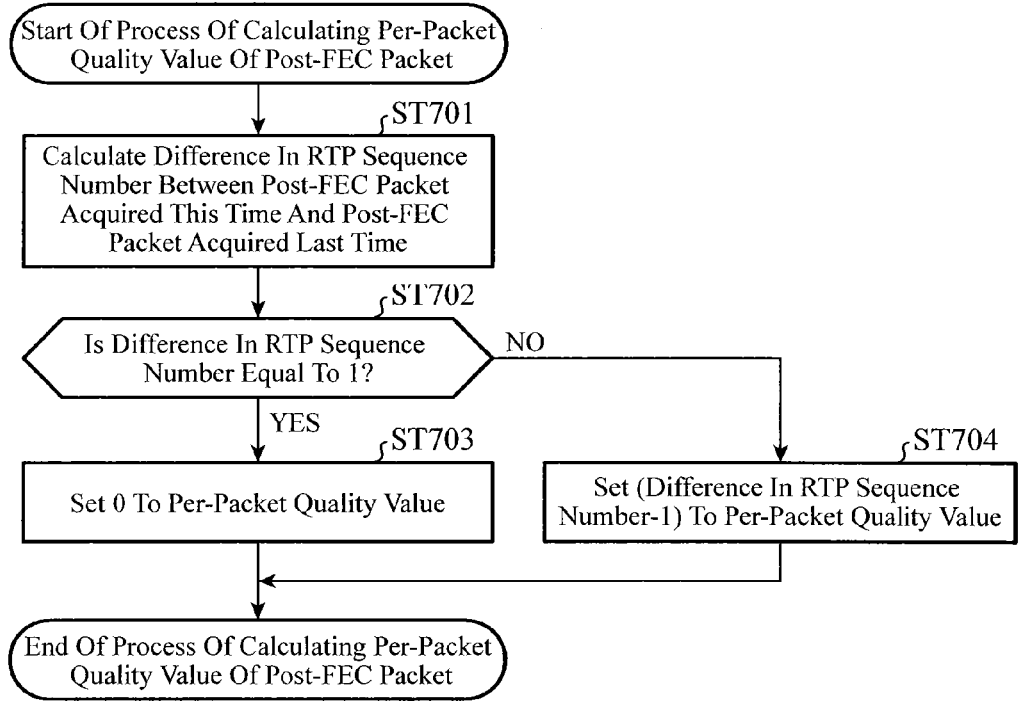
FIG. 7 is a flow chart showing a series of processes of calculating a per-packet quality value of a post-FEC packet which is carried out by the post-FEC packet quality analyzer disposed in the video receiving terminal in accordance with Embodiment 1 of the present invention.
FIG. 8 is an explanatory drawing showing an example of pre-FEC packet quality information measured by the video receiving terminal in accordance with Embodiment 1 of the present invention.

FIG. 7 is a flow chart showing a series of processes of calculating the per-packet quality value of one post-FEC packet which is carried out by the post-FEC packet quality analyzer 308. The post-FEC packet quality analyzer calculates the difference in the RTP sequence number between the post-FEC packet acquired this time in step ST606 of FIG. 6 and the post-FEC packet acquired the last time (step ST701).

The post-FEC packet quality analyzer judges the difference in the RTP sequence number calculated in step ST701 (step ST702). When the difference is equal to 1, the post-FEC packet quality analyzer advances to step ST703 (when Yes in step ST702). In contrast, when the difference is not equal to 1, the post-FEC packet quality analyzer advances to step ST704 (when No in step ST702). The case in which the difference in the RTP sequence number is not equal to 1 means that the post-FEC packet has been lost.

The post-FEC packet quality analyzer, in step ST703, sets 0 to the per-packet quality value and ends the processing. The post-FEC packet quality analyzer, in step ST704, sets (the difference in the RTP sequence number−1) to the per-packet quality value and ends the processing. (The difference in the RTP sequence number−1) is the number of post-FEC packets which have been lost.

Referring to FIG. 7, from the comparison between the RTP sequence number of the post-FEC packet acquired this time and that of the post-FEC packet acquired the last time for each post-FEC packet, the post-FEC packet quality analyzer determines packet losses.

Next, the pre-FEC packet quality information measured by the video receiving terminal 102 will be explained. The pre-FEC packet quality analyzer 310 makes a copy of the video stream which is not yet stored in the buffer 303 by the video stream receiver 302, and measures the pre-FEC packet quality information.

The pre-FEC packet quality analyzer 310 then sends the pre-FEC packet quality information measured thereby to the quality information transmitter 309. The quality information transmitter 309 transmits the pre-FEC packet quality information to the quality management system 107 via the communication unit 301.

FIG. 8 shows an example of the pre-FEC packet quality information measured by the video receiving terminal 102. User identification information A3 has a value equal to that of the user identification information A1 included in the video receiving terminal profile acquired from the video receiving terminal profile transmitter 307.

Device identification information E3 is used in order to identify which one of the video receiving terminal 102 and the home gateway device 104 has measured the quality information. The quality management system 107 identifies from which one of the video receiving terminal 102 and the home gateway device 104 the quality information has been transmitted by using the device identification information E3. In the example of FIG. 8, the identifier (=IPSTB01) of the video receiving terminal is set to the device identification information E3.

A quality information type F3 is used in order to identify whether the quality information is pre-FEC packet quality information or post-FEC packet quality information. The quality management system 107 identifies whether the quality information is pre-FEC packet quality information or post-FEC packet quality information by using the quality information type F3. In the example of FIG. 8, the identifier (=FEC_BEFORE) of the pre-FEC packet quality information is set to the quality information type F3.

A quality information sequence number G3 is incremented by one every time when the pre-FEC packet quality analyzer 310 measures the pre-FEC packet quality information. The quality management system 107 sorts the pieces of pre-FEC packet quality information transmitted thereto in the order in which they have been measured by using the quality information sequence number G3.

A timestamp H3 is the time that the pre-FEC packet quality information is measured. The quality management system 107 isolates a quality deterioration at a specified time with reference to the timestamp H3.

A measurement section identification value I3 is the one used in order to determine in which section in the video stream the pre-FEC packet quality information has been measured. In this embodiment, the measurement section identification value I3 is the average of RTP sequence numbers. The average of RTP sequence numbers is the average of the sequence numbers of RTP packets included in pre-FEC packets used for the measurement of the pre-FEC packet quality information during a quality information measurement time interval of B1. The quality management system 107 uses the measurement section identification value I3 to determine in which section in the video stream the pre-FEC packet quality information has been measured. As the measurement section identification value I3, instead of the average of RTP sequence numbers, the median of RTP sequence numbers or the like can be used.

A number of packets J3 is the number of pre-FEC packets used for the measurement of the pre-FEC packet quality information during a quality information measurement time interval of B1. Like the measurement section identification value I3, the number of packets is used in order to determine in which section in the video stream the post-FEC packet quality information has been measured.

A quality value K3 is a value showing the quality of the pre-FEC packet quality information. In this embodiment, the quality value K3 is the number of packet losses. A packet loss is judged by determining whether or not the packet is stored in a buffer having a buffer size D1 without being discarded virtually. More specifically, when it is determined that the pre-FEC packet is discarded from the buffer because of a delay in the arrival of the pre-FEC packet, it is determined that a packet loss has occurred. The number of packet losses is the number of pre-FEC packets each of which is determined to be a loss during a quality information measurement time interval of B1. The quality management system 107 uses the quality value K3 in order to determine whether the quality of pre-FEC packets has deteriorated. Therefore, in the case of using, for example, MPEG-2 or H.264 for the image compression coding of the video stream, the quality value K3 can be the number of lost video frames or the like. Further, an only one value does not have to be provided as the quality value K3, and a plurality of values can be alternatively provided as quality values.

Figure 9:
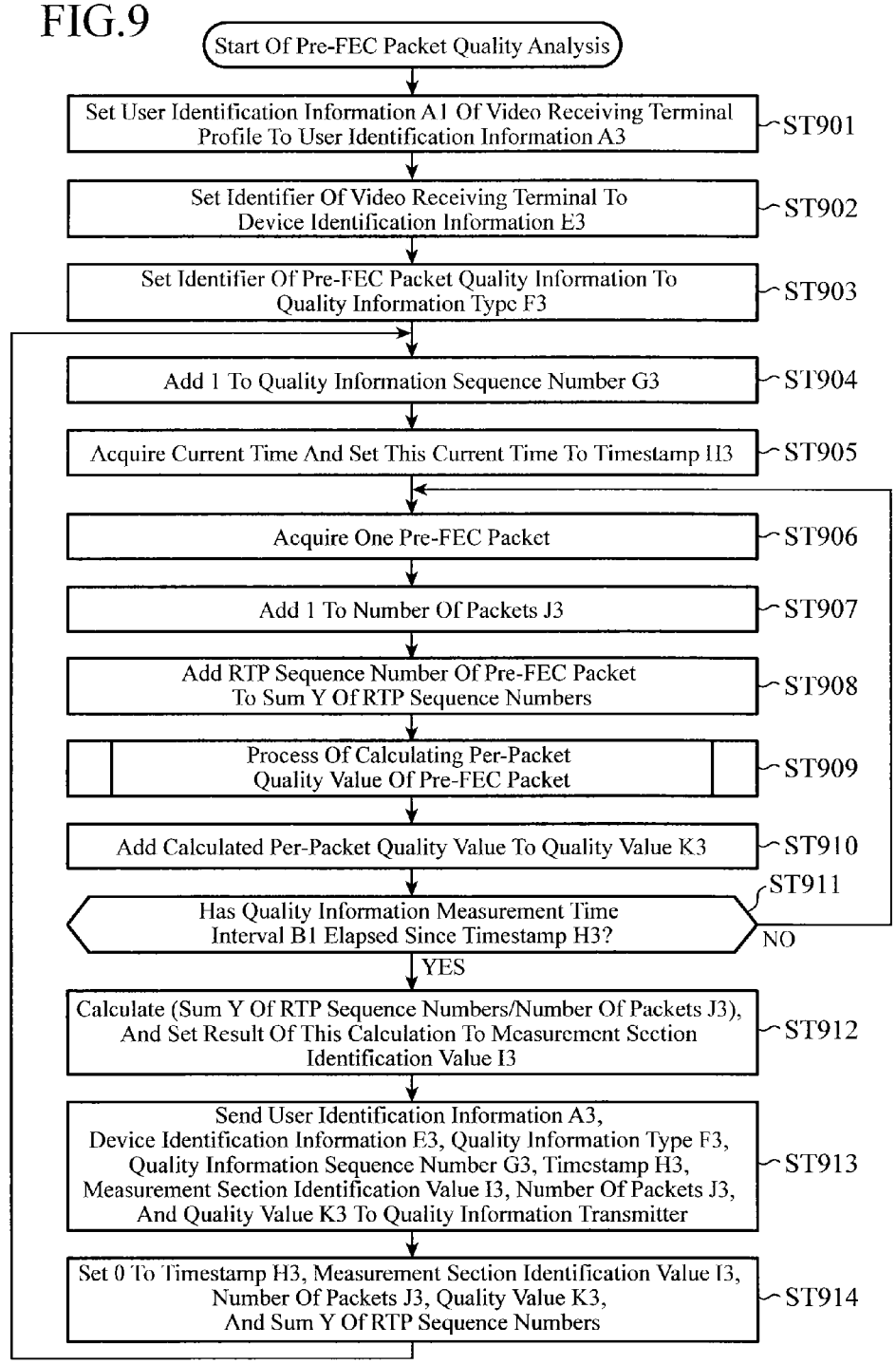
FIG. 9 is a flow chart a series of processes of measuring the pre-FEC packet quality information which is carried out by a pre-FEC packet quality analyzer disposed in the video receiving terminal in accordance with Embodiment 1 of the present invention.

FIG. 9 is a flow chart a series of processes of measuring the pre-FEC packet quality information which is carried out by the pre-FEC packet quality analyzer 310. First, the pre-FEC packet quality analyzer sets the user identification information A1 included in the video receiving terminal profile acquired from the video receiving terminal profile transmitter 307 to the user identification information A3 (step ST901). The pre-FEC packet quality analyzer sets the identifier of the video receiving terminal to the device identification information E3 (step ST902). The pre-FEC packet quality analyzer sets the identifier of the pre-FEC packet quality information to the quality information type F3 (step ST903).

The pre-FEC packet quality analyzer adds 1 to the quality information sequence number G3 (step ST904). The pre- FEC packet quality analyzer acquires the current time and sets this current time to the timestamp H3 (step ST905).

The pre-FEC packet quality analyzer acquires one pre-FEC packet (step ST906). The pre-FEC packet quality analyzer adds 1 to the number of packets J3 (step ST907). The pre-FEC packet quality analyzer adds the RTP sequence number of the pre-FEC packet acquired in step ST906 to the sum Y of RTP sequence numbers (step ST908). The pre-FEC packet quality analyzer uses the sum Y of RTP sequence numbers in order to calculate the measurement section identification value I3.

The pre-FEC packet quality analyzer calculates a per-packet quality value of the pre-FEC packet (step ST909). The per-packet quality value of the pre-FEC packet is the one calculated for each pre-FEC packet, and the cumulative sum of per-packet quality values during a quality information measurement time interval of B1 is provided as the quality value. A method of calculating the per-packet quality value of the pre-FEC packet in step ST909 will be mentioned below by using a flow chart shown in FIG. 10. The pre-FEC packet quality analyzer then adds the per-packet quality value calculated in step ST909 to the quality value K3 (step ST910).

The pre-FEC packet quality analyzer checks whether a quality information measurement time interval of B1 included in the video receiving terminal profile acquired from the video receiving terminal profile transmitter 307 has elapsed since the timestamp H3 set in step ST905 (step ST911). When the result of the check shows that a quality information measurement time interval has elapsed since the timestamp, the pre-FEC packet quality analyzer advances to step ST912 (when Yes in step ST911). In contrast, when a quality information measurement time interval has not elapsed since the timestamp, the pre-FEC packet quality analyzer advances to step ST906 (when No in step ST911).

The pre-FEC packet quality analyzer calculates (the sum Y of RTP sequence numbers/the number of packets J3), and sets the result of this division to the measurement section identification value I3 (step ST912). The pre-FEC packet quality analyzer sends the user identification information A3, the device identification information E3, the quality information type F3, the quality information sequence number G3, the timestamp H3, the measurement section identification value I3, the number of packets J3, and the quality value K3 to the quality information transmitter 309 as the pre-FEC packet quality information (step ST913). The pre-FEC packet quality analyzer then sets 0 to the timestamp H3, the measurement section identification value I3, the number of packets J3, the quality value K3, and the sum Y of RTP sequence numbers, and advances to step ST904 (step ST914).

Referring to FIG. 9, the pre-FEC packet quality analyzer calculates the measurement section identification value I3 and the number of packets J3, and then adds these values to the pre-FEC packet quality information, so that the quality management system 107 can determine in which section in the video stream the pre-FEC packet quality information has been measured.

Figure 10:
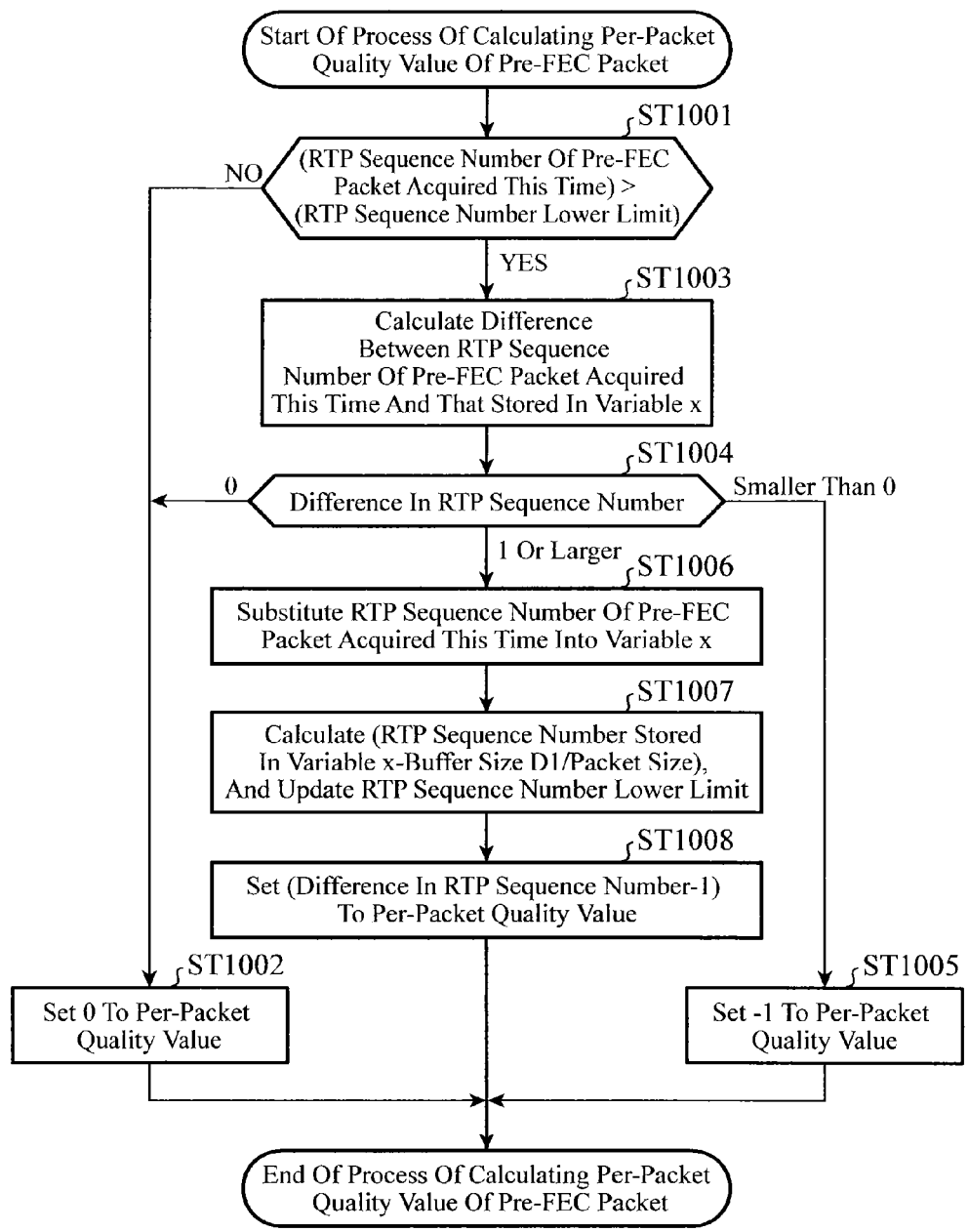
FIG. 10 is a flow chart showing a series of processes of calculating a per-packet quality value of a pre-FEC packet which is carried out by the pre-FEC packet quality analyzer disposed in the video receiving terminal in accordance with Embodiment 1 of the present invention.

FIG. 10 is a flow chart showing a series of processes of calculating the per-packet quality value of one pre-FEC packet which is carried out by the pre-FEC packet quality analyzer 310. The pre-FEC packet quality analyzer compares the RTP sequence number of the pre-FEC packet acquired this time in step ST906 of FIG. 9 with an RTP sequence number lower limit (step ST1001). The RTP sequence number lower limit is a threshold used for determining whether the pre-FEC packet is discarded virtually from the buffer having the buffer size D1 because of a delay in the arrival of the pre-FEC packet. When the RTP sequence number of the pre-FEC packet is smaller than the RTP sequence number lower limit, the pre-FEC packet quality analyzer determines that the packet is discarded. In contrast, when the RTP sequence number of the pre-FEC packet acquired this time is equal to or larger than the RTP sequence number lower limit, the pre-FEC packet quality analyzer advances to step ST1003 (when Yes in step ST1001). Otherwise, the pre-FEC packet quality analyzer advances to step ST1002 (when No in step ST1001).

The pre-FEC packet quality analyzer, in step ST1002, sets 0 to the per-packet quality value and ends the processing.

The pre-FEC packet quality analyzer, in step ST1003, calculates the difference between the RTP sequence number of the pre-FEC packet acquired this time and that stored in a variable x. The RTP sequence number of the pre-FEC packet which is acquired the last time and which has arrived at the terminal without delay is stored in the variable x.

Next, the pre-FEC packet quality analyzer judges the difference in the RTP sequence number calculated in step ST1003 (step ST1004). When the difference is equal to or larger than 1, the pre-FEC packet quality analyzer advances to step ST1006 (when 1 or larger in step ST1004). When the difference is smaller than 0, the pre-FEC packet quality analyzer advances to step ST1005 (when smaller than 0 in step ST1004). When the difference is equal to 0, the pre-FEC packet quality analyzer advances to step ST1002 (when 0 in step ST1004). The case in which the difference is equal to or larger than 1 shows that the pre-FEC packet which has arrived at the terminal without delay is stored in the virtual buffer. The case in when the difference is smaller than 0 shows that the pre-FEC packet which has arrived at the terminal with a delay is stored in the virtual buffer. The case in which the difference is 0 shows that the pre-FEC packet whose RTP sequence number matches that of another pre-FEC packet has arrived at the terminal.

The pre-FEC packet quality analyzer, in step ST1005, sets −1 to the per-packet quality value and ends the processing. This process is the one of subtracting one from the number of packet losses because the pre-FEC packet which has arrived at the terminal with a delay is stored in the virtual buffer.

The pre-FEC packet quality analyzer, in step ST1006, substitutes the RTP sequence number of the pre-FEC packet acquired this time into the variable x. Next, the pre-FEC packet quality analyzer calculates (the RTP sequence number stored in the variable x−the buffer size D1/the packet size), and sets the result of this calculation to the RTP sequence number lower limit (step ST1007). The buffer size D1 is included in the video receiving terminal profile. The packet size is the one of the pre-FEC packet and has a fixed value. The pre-FEC packet quality analyzer sets (the difference in the RTP sequence number−1) to the per-packet quality value, and ends the processing (step ST1008).

Referring to FIG. 10, the pre-FEC packet quality analyzer determines a packet loss for each pre-FEC packet by determining whether or not the pre-FEC packet is discarded virtually from the buffer by using the buffer size D1 of the buffer disposed in the video receiving terminal 102.

[The Home Gateway Device in Accordance with Embodiment 1]

Figure 11:
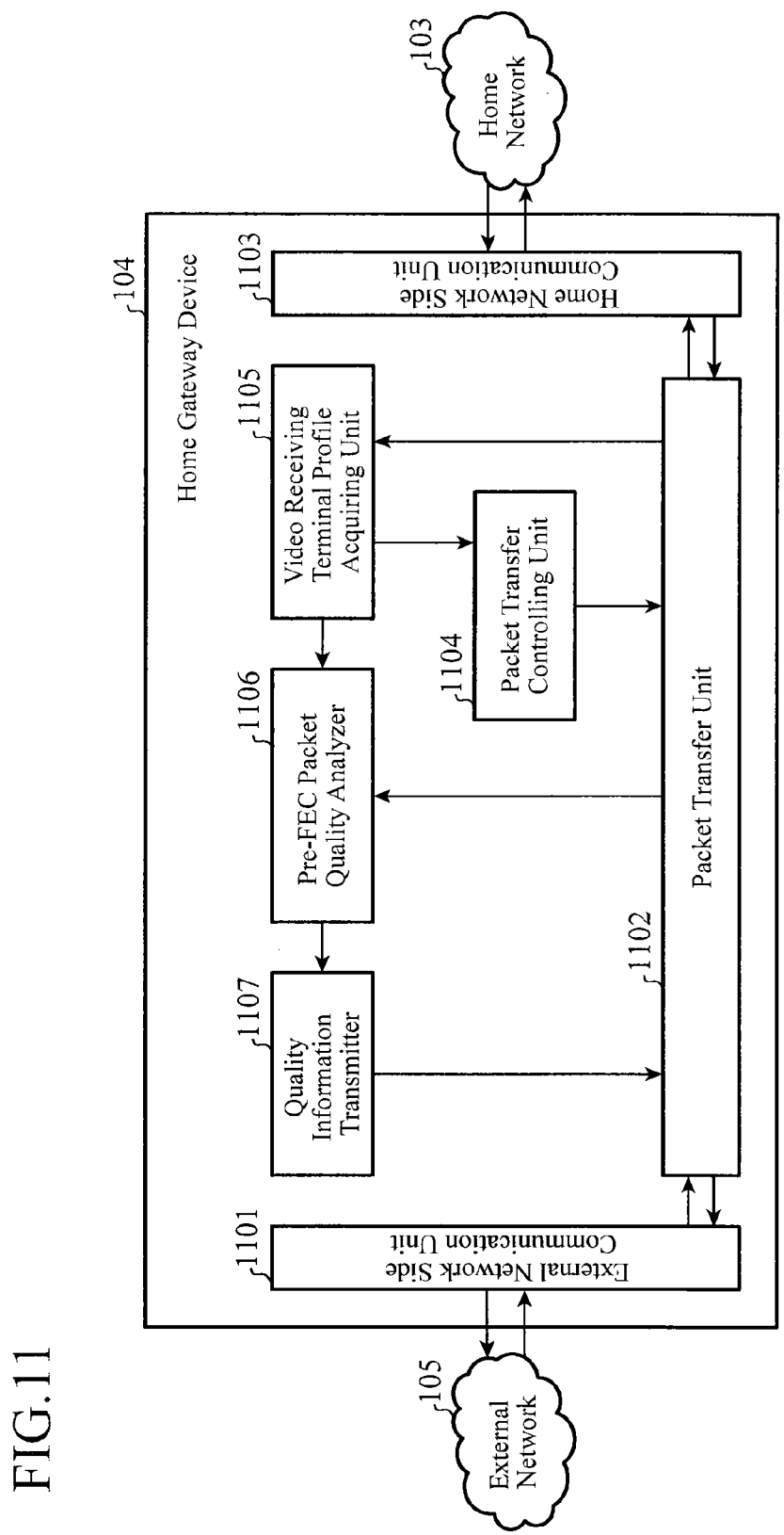
FIG. 11 is a block diagram of a home gateway device in accordance with Embodiment 1 of the present invention.

Next, the structure of the home gateway device 104 in accordance with Embodiment 1 of the present invention will be explained. FIG. 11 is a diagram showing the structure of the home gateway device 104. An external network side communication unit 1101 receives a video stream which the video delivery server 106 delivers via the external network 105. The external network side communication unit 1101 sends the video stream received thereby to a packet transfer unit 1102. The packet transfer unit 1102 transfers the video stream to a home network side communication unit 1103. The home network side communication unit 1103 transmits the video stream received thereby to the video receiving terminal 102 via the home network 103.

Next, the video receiving terminal profile transmitted from the video receiving terminal 102 to the home gateway device 104 will be explained. The home network side communication unit 1103 receives the video receiving terminal profile which the video receiving terminal 102 transmits via the home network 103. The home network side communication unit 1103 sends the video receiving terminal profile received thereby to the packet transfer unit 1102. The packet transfer unit 1102 transfers the video receiving terminal profile to a video receiving terminal profile acquiring unit 1105.

The video receiving terminal profile acquiring unit 1105 sends the destination address C1 included in the video receiving terminal profile to a packet transfer controlling unit 1104. The packet transfer controlling unit 1104 provides a setting for making a copy of a packet whose destination IP address matches the destination address C1 and sending the copy to a pre-FEC packet quality analyzer 1106 for the packet transfer unit 1102. As a result, the packet transfer unit 1102 makes a copy of the video stream delivered to the video receiving terminal 102, and sends the copy to the pre-FEC packet quality analyzer 1106.

Further, the video receiving terminal profile acquiring unit 1105 sends the user identification information A1, the quality information measurement time intervals of B1, and the buffer size D1 which are included in the video receiving terminal profile to the pre-FEC packet quality analyzer 1106. When measuring the pre-FEC packet quality information, the pre-FEC packet quality analyzer 1106 uses the user identification information A1, the quality information measurement time intervals of B1, and the buffer size D1.

Next, the pre-FEC packet quality information measured by the home gateway device 104 will be explained. The pre-FEC packet quality analyzer 1106 measures the pre-FEC packet quality information from the video stream received from the packet transfer unit 1102.

The pre-FEC packet quality analyzer 1106 sends the pre-FEC packet quality information measured thereby to the quality information transmitter 1107. The quality information transmitter 1107 transmits the pre-FEC packet quality information to the quality management system 107 via the packet transfer unit 1102 and the external network side communication unit 1101.

FIG. 12 is an example of the pre-FEC packet quality information measured by the home gateway device 104. User identification information A4 has a value equal to that of the user identification information A1 included in the video receiving terminal profile acquired from the video receiving terminal profile acquiring unit 1105.

Device identification information E4 is used in order to identify which one of the video receiving terminal 102 and the home gateway device 104 has measured the quality information. The quality management system 107 identifies from which one of the video receiving terminal 102 and the home gateway device 104 the quality information has been transmitted by using the device identification information E4. In the example of FIG. 12, the identifier (=HGW01) of the home gateway device is set to the device identification information E4.

A quality information type F4 is used in order to identify whether the quality information is pre-FEC packet quality information or post-FEC packet quality information. The quality management system 107 identifies whether the quality information is pre-FEC packet quality information or post-FEC packet quality information by using the quality information type F4. In the example of FIG. 12, the identifier (=FEC_BEFORE) of the pre-FEC packet quality information is set to the quality information type F4.

A quality information sequence number G4 is incremented by one every time when the pre-FEC packet quality analyzer 1106 measures the pre-FEC packet quality information. The quality management system 107 sorts the pieces of pre-FEC packet quality information transmitted thereto in the order in which they have been measured by using the quality information sequence number G4.

A timestamp H4 is the time that the pre-FEC packet quality information is measured. The quality management system 107 isolates a quality deterioration at a specified time with reference to the timestamp H4.

A measurement section identification value I4 is the one used in order to determine in which section in the video stream the pre-FEC packet quality information has been measured. In this embodiment, the measurement section identification value I4 is the average of RTP sequence numbers. The average of RTP sequence numbers is the average of the sequence numbers of RTP packets included in pre-FEC packets used for the measurement of the pre-FEC packet quality information during a quality information measurement time interval of B1. The quality management system 107 uses the measurement section identification value I4 to determine in which section in the video stream the pre-FEC packet quality information has been measured. As the measurement section identification value I4, instead of the average of RTP sequence numbers, the median of RTP sequence numbers or the like can be used.

A number of packets J4 is the number of pre-FEC packets used for the measurement of the pre-FEC packet quality information during a quality information measurement time interval of B1. Like the measurement section identification value I4, the number of packets is used in order to determine in which section in the video stream the pre-FEC packet quality information has been measured.

A quality value K4 is a value showing the quality of the pre-FEC packet quality information. In this embodiment, the quality value K4 is the number of packet losses. A packet loss is judged by determining whether or the packet is stored in a buffer having a buffer size D1 without being discarded virtually. More specifically, when it is determined that the pre-FEC packet is discarded from the buffer because of a delay in the arrival of the pre-FEC packet, it is determined that a packet loss has occurred. The number of packet losses is the number of pre-FEC packets each of which is determined to be a loss during a quality information measurement time interval of B1. The quality management system 107 uses the quality value K4 in order to determine whether the quality of pre-FEC packets has deteriorated. Therefore, in the case of using, for example, MPEG-2 or H.264 for the image compression coding of the video stream, the quality value K4 can be the number of lost video frames or the like. Further, an only one value does not have to be provided as the quality value K4, and a plurality of values can be alternatively provided as quality values.

Figure 13:
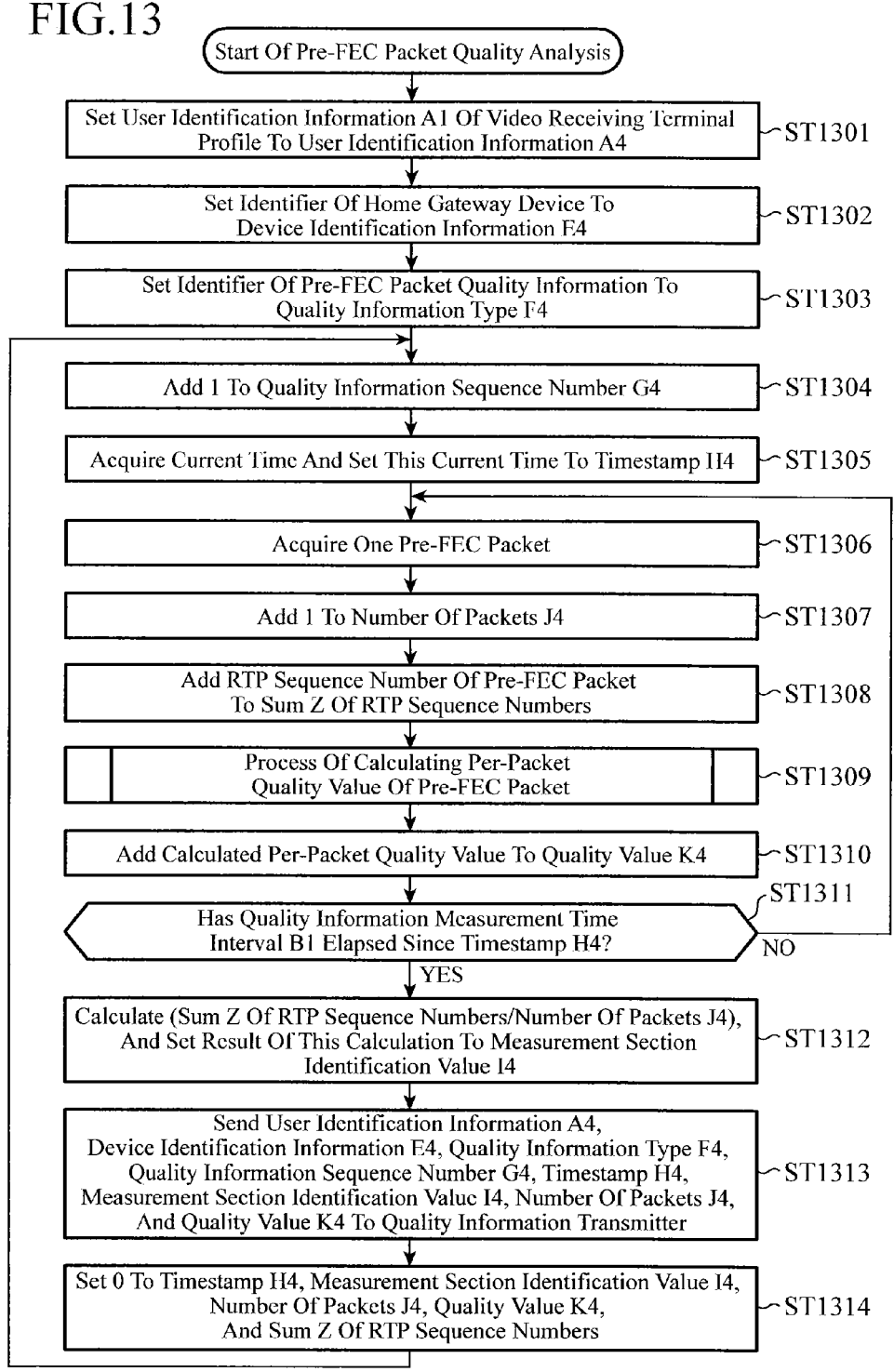
FIG. 13 is a flow chart a series of processes of measuring the pre-FEC packet quality information which is carried out by a pre-FEC packet quality analyzer disposed in the home gateway device in accordance with Embodiment 1 of the present invention.

FIG. 13 is a flow chart a series of processes of measuring the pre-FEC packet quality information which is carried out by the pre-FEC packet quality analyzer 1106. First, the pre-FEC packet quality analyzer sets the user identification information A1 included in the video receiving terminal profile acquired from the video receiving terminal profile acquiring unit 1105 to the user identification information A4 (step ST1301). The pre-FEC packet quality analyzer sets the identifier of the video receiving terminal to the device identification information E4 (step ST1302). The pre-FEC packet quality analyzer sets the identifier of the pre-FEC packet quality information to the quality information type F4 (step ST1303).

The pre-FEC packet quality analyzer adds 1 to the quality information sequence number G4 (step ST1304). The pre-FEC packet quality analyzer acquires the current time and sets this current time to the timestamp H4 (step ST1305).

The pre-FEC packet quality analyzer acquires one pre-FEC packet (step ST1306). The pre-FEC packet quality analyzer adds 1 to the number of packets J4 (step ST1307). The pre-FEC packet quality analyzer adds the RTP sequence number of the pre-FEC packet acquired in step ST1306 to the sum Z of RTP sequence numbers (step ST1308). The pre-FEC packet quality analyzer uses the sum Z of RTP sequence numbers in order to calculate the measurement section identification value I4.

The pre-FEC packet quality analyzer calculates a per-packet quality value of the pre-FEC packet (step ST1309). The per-packet quality value of the pre-FEC packet is the one calculated for each pre-FEC packet, and the cumulative sum of per-packet quality values during a quality information measurement time interval of B1 is provided as the quality value. A method of calculating the per-packet quality value of the pre-FEC packet in step ST1309 is the same as that shown in the flow chart of FIG. 10. Next, the pre-FEC packet quality analyzer adds the per-packet quality value calculated in step ST1309 to the quality value K4 (step ST1310).

The pre-FEC packet quality analyzer checks whether a quality information measurement time interval of B1 included in the video receiving terminal profile acquired from the video receiving terminal profile acquiring unit 1105 has elapsed since the timestamp H4 set in step ST1305 (step ST1311). When the result of the check shows that a quality information measurement time interval has elapsed since the timestamp, the pre-FEC packet quality analyzer advances to step ST1312 (when Yes in step ST1311). In contrast, when a quality information measurement time interval has not elapsed since the timestamp, the pre-FEC packet quality analyzer advances to step ST1306 (when No in step ST1311).

The pre-FEC packet quality analyzer calculates (the sum Z of RTP sequence numbers/the number of packets J4), and sets the result of this division to the measurement section identification value I4 (step ST1312). The pre-FEC packet quality analyzer sends the user identification information A4, the device identification information E4, the quality information type F4, the quality information sequence number G4, the timestamp H4, the measurement section identification value I4, the number of packets J4, and the quality value K4 to the quality information transmitter 1107 as the pre-FEC packet quality information (step ST1313). The pre-FEC packet quality analyzer then sets 0 to the timestamp H4, the measurement section identification value I4, the number of packets J4, the quality value K4, and the sum Z of RTP sequence numbers, and advances to step ST1304 (step ST1314).

Referring to FIG. 13, the pre-FEC packet quality analyzer calculates the measurement section identification value I4 and the number of packets J4, and then adds these values to the pre-FEC packet quality information, so that the quality management system 107 can determine in which section in the video stream the pre-FEC packet quality information has been measured.

[The Quality Management System in Accordance with Embodiment 1]

Figure 14:
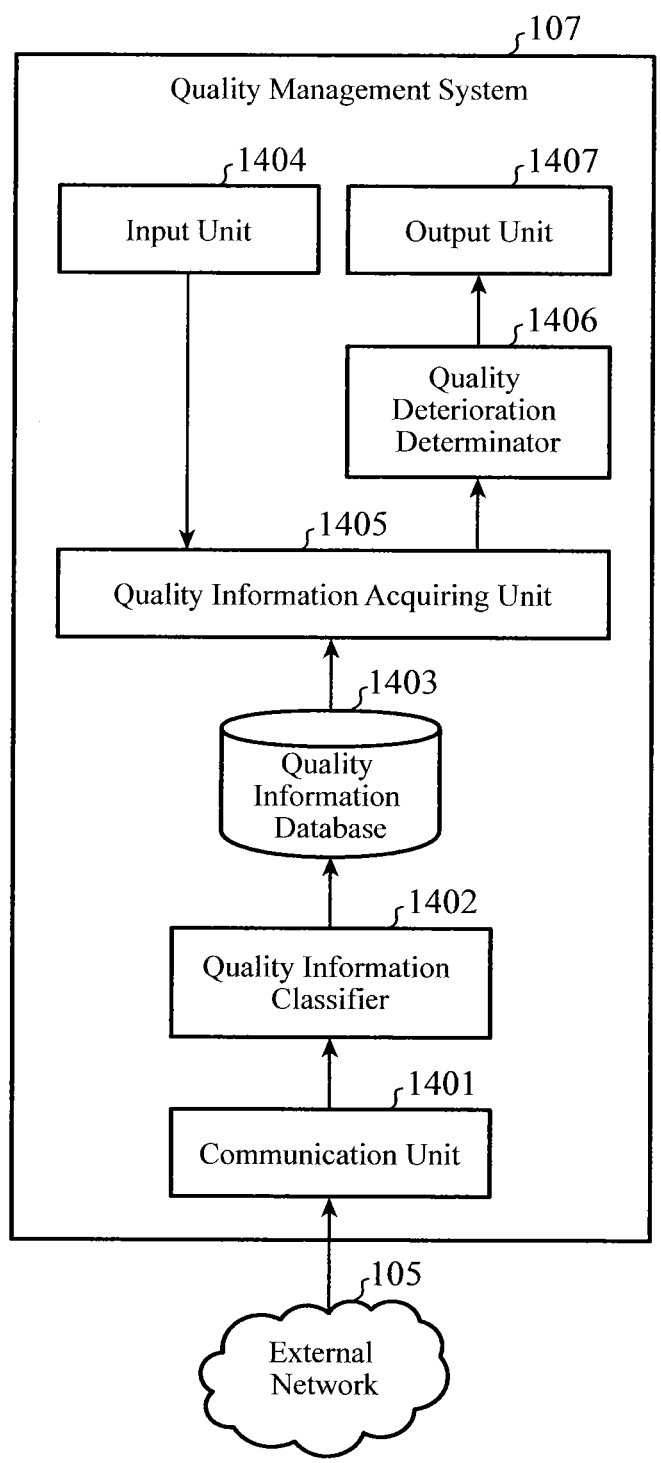
FIG. 14 is a block diagram of a quality management system in accordance with Embodiment 1 of the present invention.

The structure of the quality management system 107 in accordance with Embodiment 1 of the present invention will be explained. FIG. 14 is a diagram showing the structure of the quality management system 107. A communication unit 1401 receives the quality information transmitted by the video receiving terminal 102 and the quality information transmitted by the home gateway device 104 from the external network 105. The communication unit 1401 sends the pieces of quality information to a quality information classifier 1402. The quality information classifier 1402 classifies each of the pieces of quality information received thereby, and stores them in a quality information database 1403.

Figure 15:
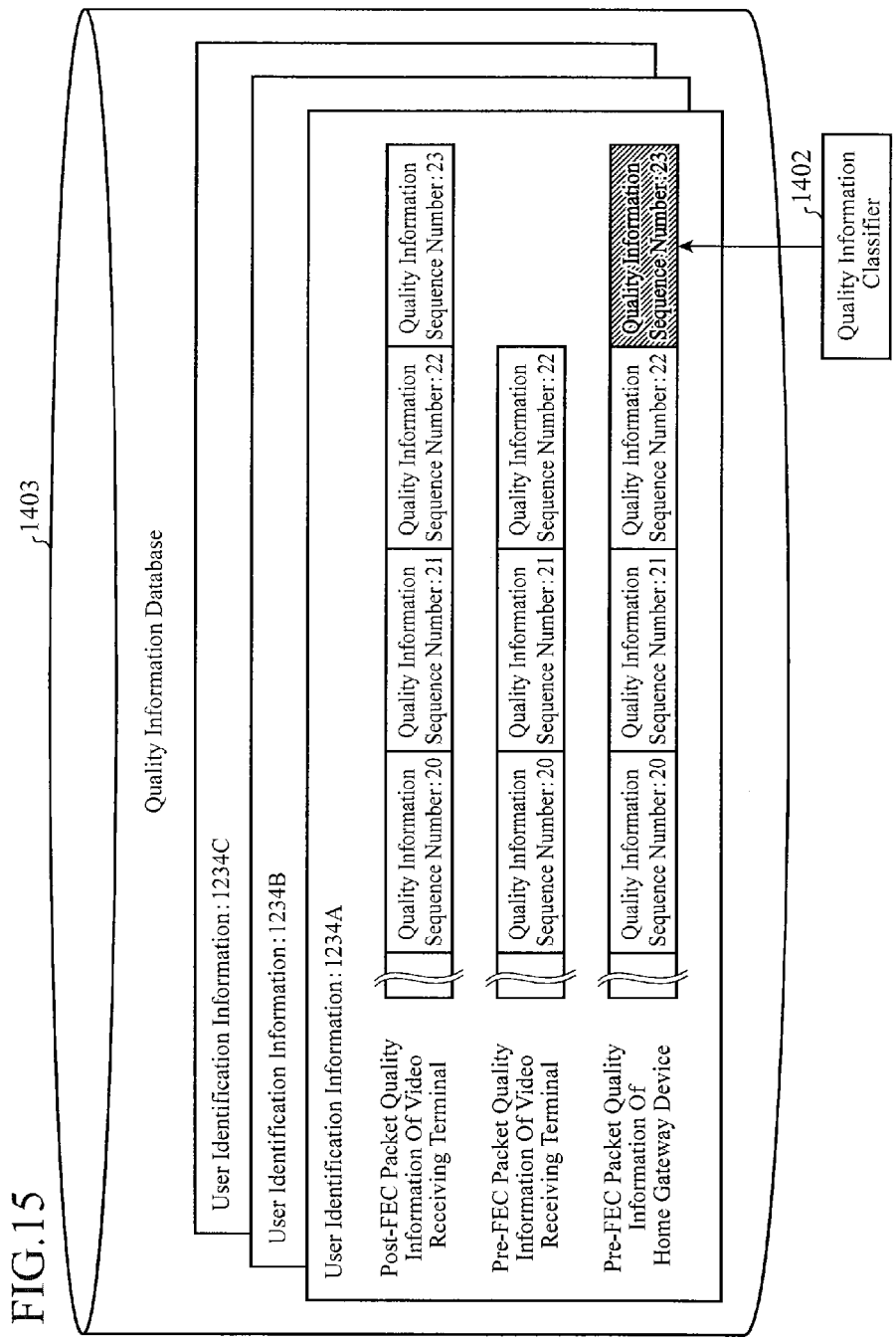
FIG. 15 is an explanatory drawing showing an example in which a quality information classifier disposed in the quality management system in accordance with Embodiment 1 of the present invention stores quality information in a quality information database.

FIG. 15 shows an example in which the quality information classifier 1402 classifies the quality information and stores this quality information in the quality information database 1403. The quality information database 1403 holds the post-FEC packet quality information of the video receiving terminal 102, the pre-FEC packet quality information of the video receiving terminal 102, and the pre-FEC packet quality information of the home gateway device 104 for each user identification information in the order of their quality information sequence numbers. The quality information classifier 1402 stores each quality information in a corresponding section in the quality information database 1403.

Figure 16:
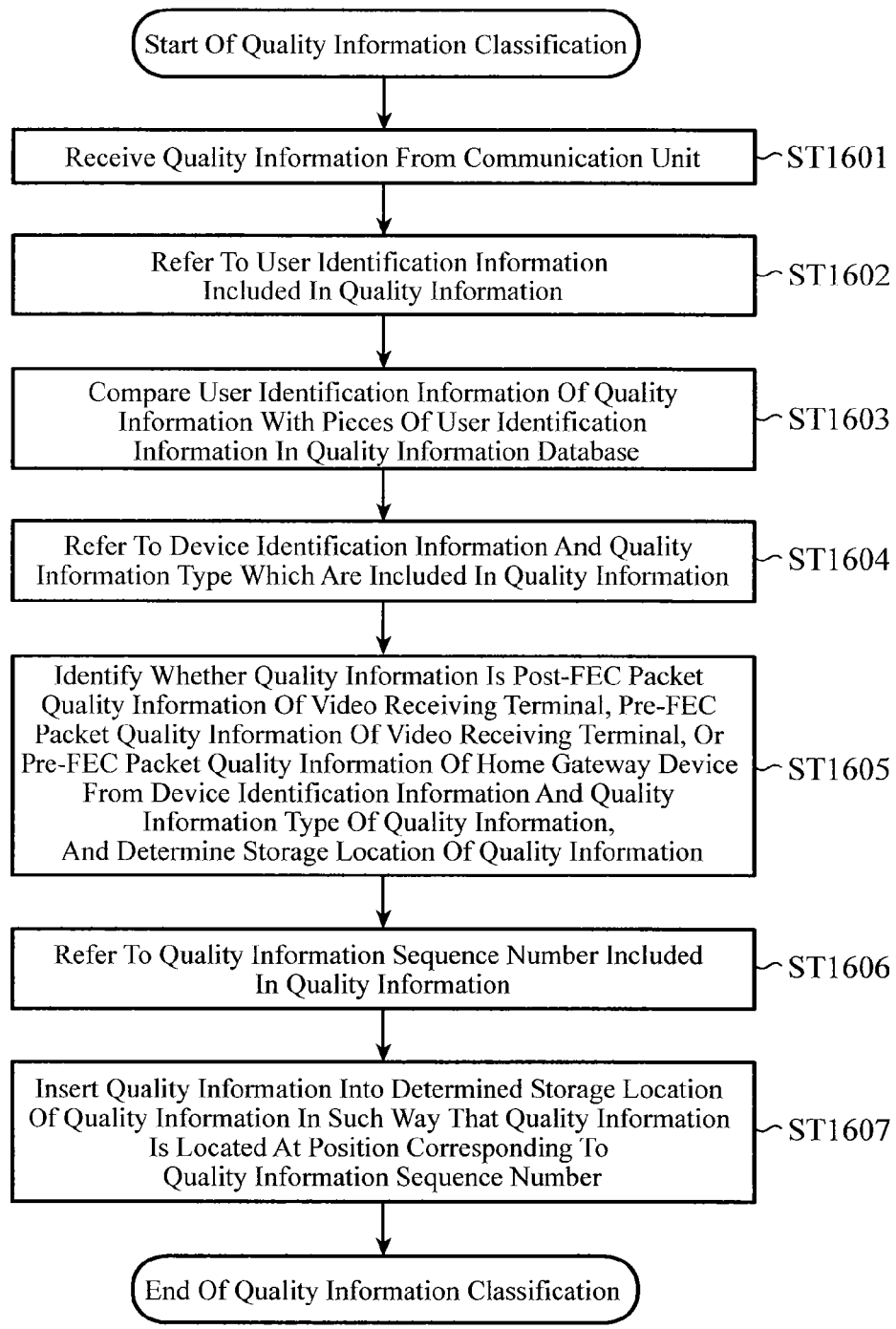
FIG. 16 is a flow chart showing a series of processes of storing quality information in the quality information database which is carried out by the quality information classifier disposed in the quality management system in accordance with Embodiment 1 of the present invention.

FIG. 16 is a flow chart showing a series of processes of storing quality information received from the communication unit 1401 in the quality information database 1403 which is carried out by the quality information classifier 1402. First, the quality information classifier receives quality information from the communication unit 1401 (step ST1601).

The quality information classifier refers to the user identification information included in the quality information received in step ST1601 (step ST1602). The quality information classifier compares the user identification information to which the quality information classifier refers in step ST1602 with the pieces of user identification information stored in the quality information database 1403 (step ST1603). As a result, the quality information classifier specifies the user of the quality information to be added to the quality information database 1403.

The quality information classifier refers to the device identification information and the quality information type which are included in the quality information received in step ST1601 (step ST1604). The quality information classifier identifies whether the quality information is the post-FEC packet quality information of the video receiving terminal 102, the pre-FEC packet quality information of the video receiving terminal 102, or the pre-FEC packet quality information of the home gateway device 104 from the device identification information and the quality information type to which the quality information classifier refers in step ST1604, and determines the storage location of the quality information (step ST1605).

The quality information classifier refers to the quality information sequence number included in the quality information received in step ST1601 (step ST1606). The quality information classifier inserts the quality information into the storage location of the quality information determined in step ST1605 in such a way that the quality information is located at a position corresponding to its quality information sequence number (step ST1607).

Next, a method of acquiring the quality information used for the determination of a quality deterioration from the quality information database 1403, which a quality information acquiring unit 1405 uses, will be explained. An input unit 1404 sends user identification information and a deterioration determination time to the quality information acquiring unit 1405. The user identification information is used in order to specify the user who is the target for the isolation of a quality deterioration. The deterioration determination time is the one that a quality deterioration is to be isolated.

Figure 17:
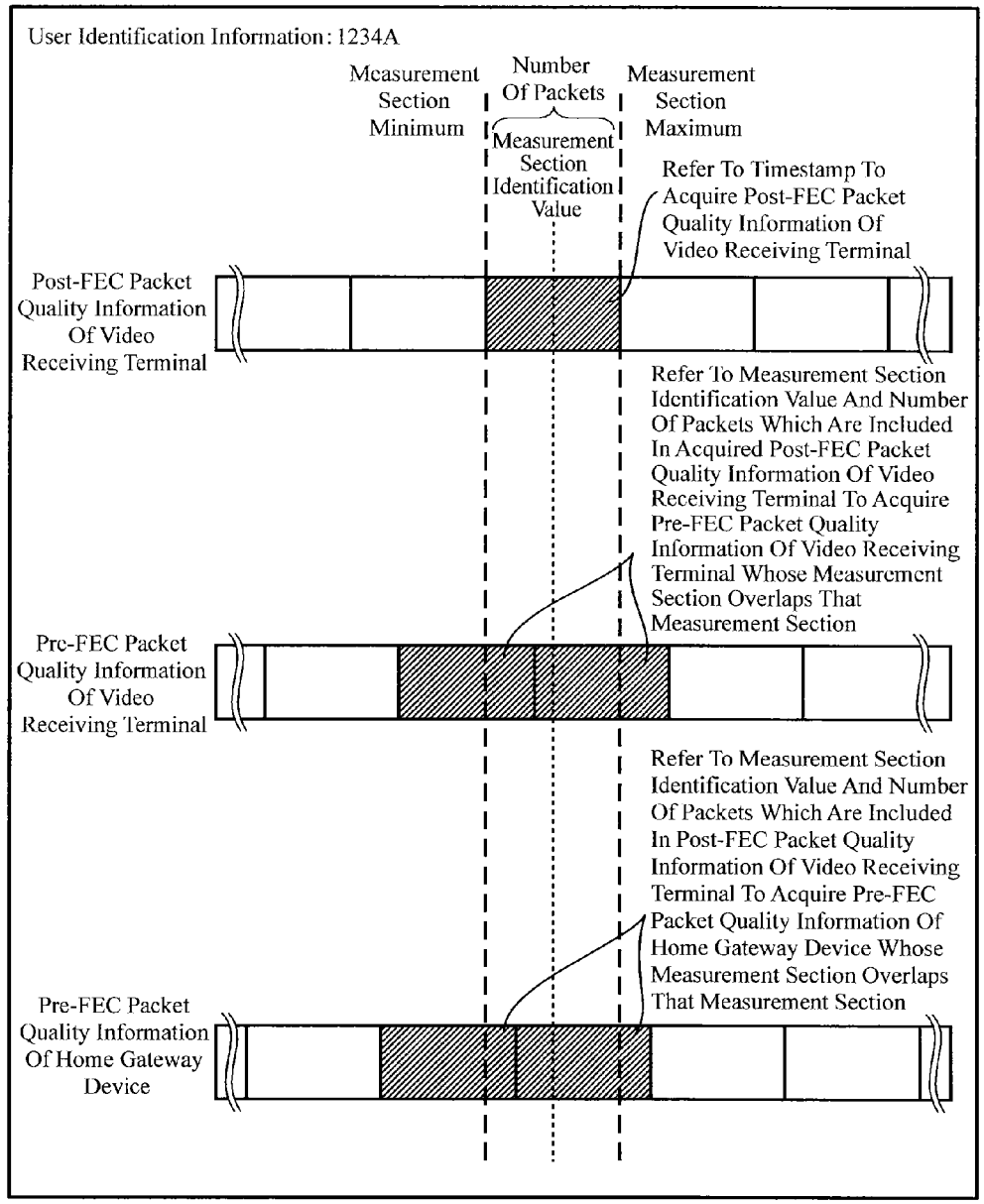
FIG. 17 is an explanatory drawing showing an example in which a quality information acquiring unit disposed in the quality management system in accordance with Embodiment 1 of the present invention acquires quality information from the quality information database.

The quality information acquiring unit 1405 acquires the quality information used for the isolation of a quality deterioration from the quality information database 1403 on the basis of the user identification information and the deterioration determination time which are received from the input unit 1404. FIG. 17 is an example in which the quality information acquiring unit 1405 acquires the quality information from the quality information database 1403.

The quality information acquiring unit 1405 specifies the user of the quality information which the quality information acquiring unit acquires from the user identification information received from the input unit 1404. The quality information acquiring unit then acquires the post-FEC packet quality information of the video receiving terminal 102 whose timestamp is the nearest to the deterioration determination time received from the input unit 1404. The quality information acquiring unit refers to the measurement section identification value I2 and the number of packets J2 which are included in the acquired post-FEC packet quality information of the video receiving terminal 102 to select the pre-FEC packet quality information of the video receiving terminal 102 whose measurement section overlaps the above-mentioned measurement section. Similarly, the quality information acquiring unit refers to the measurement section identification value I2 and the number of packets J2 which are included in the acquired post-FEC packet quality information of the video receiving terminal 102 to acquire the pre-FEC packet quality information of the home gateway device 104 whose measurement section overlaps the above-mentioned measurement section.

Although after acquiring the post-FEC packet quality information of the video receiving terminal 102 whose timestamp is the nearest to the deterioration determination time, the quality information acquiring unit acquires other quality information whose measurement section overlaps the measurement section in this embodiment, the quality information acquiring unit can alternatively acquire other quality information whose measurement section overlaps the measurement section after acquiring either the pre-FEC packet quality information of the video receiving terminal 102 or the pre-FEC packet quality information of the home gateway device 104 whose timestamp is the nearest to the deterioration determination time.

Figure 18:
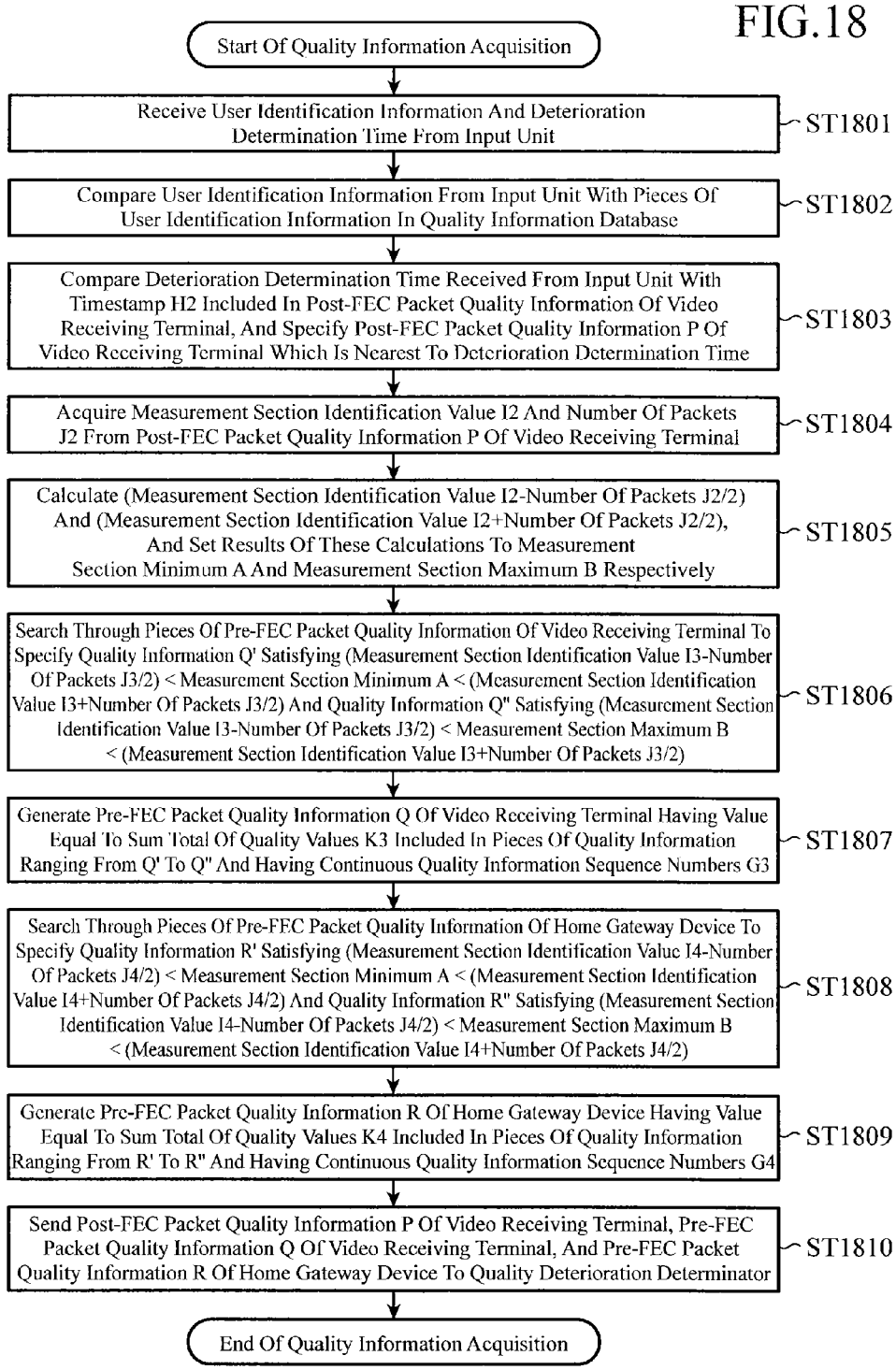
FIG. 18 is a flow chart showing a series of processes of acquiring quality information from the quality information database which is carried out by the quality information classifier disposed in the quality management system in accordance with Embodiment 1 of the present invention.

FIG. 18 is a flow chart showing a series of processes of acquiring quality information from the quality information database 1403 which is carried out by the quality information acquiring unit 1405. The quality information acquiring unit receives user identification information and a deterioration determination time from the input unit 1404 (step ST1801). The quality information acquiring unit compares the user identification information received from the input unit 1404 with the pieces of user identification information stored in the quality information database 1403 (step ST1802). As a result, the quality information acquiring unit specifies the user of the quality information which the quality information acquiring unit acquires from the quality information database 1403.

The quality information acquiring unit compares the deterioration determination time received from the input unit 1404 with the timestamp H2 included in each of the pieces of post-FEC packet quality information of the video receiving terminal 102, and specifies the post-FEC packet quality information P of the video receiving terminal 102 whose timestamp is the nearest to the deterioration determination time (step ST1803). The quality information acquiring unit uses the post-FEC packet quality information P of the video receiving terminal 102 for the isolation of a quality deterioration which the quality management system 107 carries out.

The quality information acquiring unit acquires the measurement section identification value I2 and the number of packets J2 from the post-FEC packet quality information P of the video receiving terminal 102 specified in step ST1803 (step ST1804). The quality information acquiring unit then calculates (the measurement section identification value I2–the number of packets J2/2) and (the measurement section identification value I2+the number of packets J2/2), and sets the results of these calculations as a measurement section minimum a and a measurement section maximum b respectively (step ST1805).

The quality information acquiring unit searches through the pieces of pre-FEC packet quality information of the video receiving terminal 102 to specify quality information Q' satisfying (the measurement section identification value I3–the number of packets J3/2)<the measurement section minimum a<(the measurement section identification value I3+the number of packets J3/2) and quality information Q" satisfying (the measurement section identification value I3–the number of packets J3/2)<the measurement section maximum b<(the measurement section identification value I3+the number of packets J3/2) (step ST1806).

The quality information acquiring unit generates pre-FEC packet quality information Q of the video receiving terminal 102 having a value equal to the sum total of the quality values K3 included in the pieces of quality information ranging from Q' to Q" and having continuous quality information sequence numbers G3 (step ST1807). The pre-FEC packet quality information Q of the video receiving terminal 102 is used in order for the quality management system 107 to carry out the isolation of a quality deterioration.

The quality information acquiring unit searches through the pieces of pre-FEC packet quality information of the home gateway device 104 to specify quality information R' satisfying (the measurement section identification value I4–the number of packets J4/2)<the measurement section minimum a<(the measurement section identification value I4+the number of packets J4/2) and quality information R" satisfying (the measurement section identification value I4–the number of packets J4/2)<the measurement section maximum b<(the measurement section identification value I4+the number of packets J4/2) (step ST1808).

The quality information acquiring unit generates pre-FEC packet quality information R of the home gateway device 104 having a value equal to the sum total of the quality values K4 included in the pieces of quality information ranging from R' to R" and having continuous quality information sequence numbers G4 (step ST1809). The pre-FEC packet quality information R of the home gateway device 104 is used in order for the quality management system 107 to carryout the isolation of a quality deterioration.

The quality information acquiring unit sends the post-FEC packet quality information P of the video receiving terminal 102, the pre-FEC packet quality information Q of the video receiving terminal, and the pre-FEC packet quality information R of the home gateway device 104 to a quality deterioration determinator 1406 (step ST1810).

The quality management system 107 shown in FIG. 14 can acquire quality information whose measurement section overlaps that of the post-FEC packet quality information P of the video receiving terminal 102 by adding up the quality values included in the pieces of quality information, and determining the pre-FEC packet quality information Q of the video receiving terminal 102 and the pre-FEC packet quality information R of the home gateway device 104.

Next, a method of isolating a quality deterioration which the quality management system 107 uses will be explained. The quality deterioration determinator 1406 receives the post-FEC packet quality information P of the video receiving terminal 102, the pre-FEC packet quality information Q of the video receiving terminal, and the pre-FEC packet quality information R of the home gateway device 104 from the quality information acquiring unit 1405, and carries out the determination of isolation of a quality deterioration.

The quality information acquiring unit 1405 sends the result of the determination of isolation of a quality deterioration to the output unit 1407. The result of the determination of isolation of a quality deterioration includes information showing in which one of the external network 105, the home network 103, and the video receiving terminal 102 a deterioration has occurred, and information showing whether the deterioration has been recovered by using FEC. The output unit 1407 outputs the received result of the determination of isolation of a quality deterioration.

Figure 19:
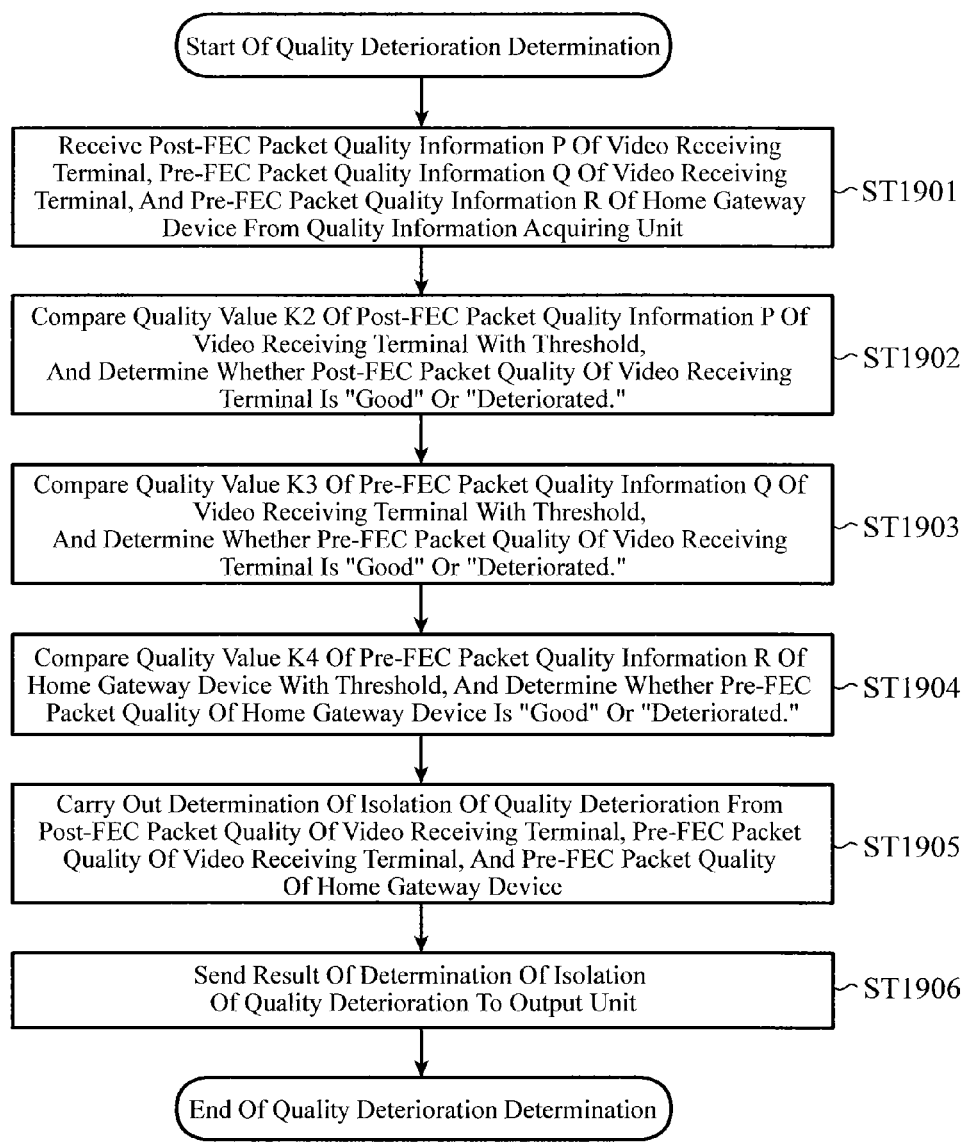
FIG. 19 is a flow chart showing a series of processes of carrying out determination of isolation of a quality deterioration which is carried out by a quality deterioration determinator disposed in the quality management system in accordance with Embodiment 1 of the present invention.

FIG. 19 is a flow chart showing a series of processes of carrying out the determination of isolation of a quality deterioration which is carried out by the quality deterioration determinator 1406. The quality deterioration determinator receives the post-FEC packet quality information P of the video receiving terminal 102, the pre-FEC packet quality information Q of the video receiving terminal 102, and the pre-FEC packet quality information R of the home gateway device 104 from the quality information acquiring unit 1405 (step ST1901).

The quality deterioration determinator compares the quality value K2 of the post-FEC packet quality information P of the video receiving terminal 102 with a threshold, and determines whether the post-FEC packet quality of the video receiving terminal 102 is "good" or "deteriorated" (step ST1902). The quality deterioration determinator compares the quality value K3 of the pre-FEC packet quality information Q of the video receiving terminal 102 with the threshold, and determines whether the pre-FEC packet quality of the video receiving terminal 102 is "good" or "deteriorated" (step ST1903). The quality deterioration determinator compares the quality value K4 of the pre-FEC packet quality information R of the home gateway device 104 with the threshold, and determines whether the pre-FEC packet quality of the home gateway device 104 is "good" or "deteriorated" (step ST1904).

The quality deterioration determinator carries out the determination of isolation of a quality deterioration on the basis of the post-FEC packet quality of the video receiving terminal 102, the pre-FEC packet quality of the video receiving terminal 102, and the pre-FEC packet quality of the home gateway device 104 (step ST1905). The quality deterioration determinator carries out the determination of isolation of a quality deterioration according to a quality deterioration isolating determination table shown in FIG. 20

As shown in FIG. 20, when the post-FEC packet quality of the video receiving terminal 102 is "good", the pre-FEC packet quality of the video receiving terminal 102 is "good", and the pre-FEC packet quality of the home gateway device 104 is "good", the result of the determination of isolation of a quality deterioration is "no deterioration has occurred."

When the post-FEC packet quality of the video receiving terminal 102 is "good", the pre-FEC packet quality of the video receiving terminal 102 is "deteriorated", and the pre-FEC packet quality of the home gateway device 104 is "good", the result of the determination of isolation of a quality deterioration is "while a deterioration has occurred in the home network 103, the deterioration has been recovered through the FEC by the video receiving terminal 102."

When the post-FEC packet quality of the video receiving terminal 102 is "deteriorated", the pre-FEC packet quality of the video receiving terminal 102 is "good", and the pre-FEC packet quality of the home gateway device 104 is "good", the result of the determination of isolation of a quality deterioration is "a deterioration has occurred in the video receiving terminal 102."

When the post-FEC packet quality of the video receiving terminal 102 is "good", the pre-FEC packet quality of the video receiving terminal 102 is "deteriorated", and the pre-FEC packet quality of the home gateway device 104 is "deteriorated", the result of the determination of isolation of a quality deterioration is "while a deterioration has occurred in the external network 105, the deterioration has been recovered through the FEC by the video receiving terminal 102."

When the post-FEC packet quality of the video receiving terminal 102 is "deteriorated", the pre-FEC packet quality of the video receiving terminal 102 is "deteriorated", and the pre-FEC packet quality of the home gateway device 104 is "good", the result of the determination of isolation of a quality deterioration is "a deterioration has occurred in the home network 103 and could not be recovered even through the FEC by the video receiving terminal 102."

When the post-FEC packet quality of the video receiving terminal 102 is "deteriorated", the pre-FEC packet quality of the video receiving terminal 102 is "deteriorated", and the pre-FEC packet quality of the home gateway device 104 is "deteriorated", the result of the determination of isolation of a quality deterioration is "a deterioration has occurred in the external network 105 and could not be recovered even through the FEC by the video receiving terminal 102."

In contrast with the above-mentioned cases, because there cannot occur, under normal conditions, cases in which the post-FEC packet quality of the video receiving terminal 102 is "good", the pre-FEC packet quality of the video receiving terminal 102 is "good", and the pre-FEC packet quality of the home gateway device 104 is "deteriorated", and in which the post-FEC packet quality of the video receiving terminal 102 is "deteriorated", the pre-FEC packet quality of the video receiving terminal 102 is "good", and the pre-FEC packet quality of the home gateway device 104 is "deteriorated", the result of the determination of isolation of a quality deterioration is "system abnormality" in these cases.

Finally, the quality deterioration determinator sends the result of the determination of isolation of a quality deterioration to the output unit 1407 (step ST1906).

Further, although the quality deterioration determinator determines each of the qualities by determining whether the quality is one of the following two quality values: "good" and "deteriorated" in the example shown in FIG. 19, the quality deterioration determinator can alternatively prepare two or more thresholds and determine whether the quality is one of multiple quality values. As a result, for example, the case in which a deterioration has occurred only in the external network 105 and the case in which a deterioration has occurred in both the external network 105 and the home network 103 can be isolated from each other.

[Advantages Provided by Embodiment 1]

As mentioned above, because the video receiving terminal in accordance with this Embodiment 1, which is connected to a best-effort network and uses a service of carrying out video communications in real time, includes: the pre-FEC packet quality analyzer that measures quality information from a video stream which is not yet stored in the buffer used for absorbing packet delay fluctuations in the video stream and on which a recovery process using FEC is not yet carried out; the post-FEC packet quality analyzer that measures quality information from the video stream which is stored in the buffer and on which the recovery process using FEC is carried out; the quality information transmitter that transmits the pieces of measured quality information; and the video receiving terminal profile transmitter that generates a video receiving terminal profile including at least information showing the size of the buffer, and transmits the video receiving terminal profile, a system that isolates the cause of a quality deterioration with a high degree of precision by taking into consideration a recovery process using FEC and so on can be provided.

Further, because the video receiving terminal in accordance with Embodiment 1 is constructed in such a way that the pre-FEC packet quality analyzer calculates a quality value of the video stream and also calculates an identification value for determining in which section of the video stream the quality information has been measured by using the sequence number included in the packet, and includes both the quality value and the result of the calculation as the quality information, a quality deterioration can be isolated correctly. More specifically, while conventionally, isolation of a quality deterioration is carried out according to pieces of quality information which the home gateway device and the video receiving terminal measure without making a comparison between measurement sections in the video stream, and hence there is a case in which a comparison between pieces of quality information measured in different sections in the video stream may be made, and isolation cannot be carried out correctly, the video receiving terminal in accordance with Embodiment 1 can solve this problem.

Further, because the video receiving terminal in accordance with Embodiment 1 is constructed in such a way that the post-FEC packet quality analyzer calculates an identification value for determining in which section of the video stream the quality information has been measured by using the sequence number included in the packet, and includes the result of the calculation in the quality information, a quality deterioration can be isolated correctly.

In addition, because the video receiving terminal in accordance with Embodiment 1 is constructed in such a way that the pre-FEC packet quality analyzer determines whether or not the packet is discarded virtually from the buffer by using the size of the buffer and determines a packet loss, and includes the result of this determination in the quality information, the cause of a quality deterioration can be isolated with a high degree of precision.

Further, because the home gateway device in accordance with Embodiment 1, which is connected to a best-effort network and uses a service of carrying out video communications in real time, includes the video receiving terminal acquiring unit that acquires the video receiving terminal profile of the video receiving terminal that receives the video stream delivered via the home gateway device, the video receiving terminal profile including at least the information showing the size of the buffer for absorbing packet delay fluctuations of the video stream, the pre-FEC packet quality analyzer that measures quality information from the video stream by using the video receiving terminal profile; and the quality information transmitter that transmits the quality information measured by the pre-FEC packet quality analyzer, the cause of a quality deterioration can be isolated with a high degree of precision.

In addition, because in the home gateway device in accordance with Embodiment 1 the pre-FEC packet quality analyzer calculates a quality value of the video stream and also calculates an identification value for determining in which section of the video stream the quality information has been measured by using the sequence number included in the packet, and includes both the quality value and the result of the calculation as the quality information, the cause of a quality deterioration can be isolated with a high degree of precision.

Further, because in the home gateway device in accordance with Embodiment 1 the pre-FEC packet quality analyzer determines whether or not the packet is discarded virtually from the buffer by using the information included in the video receiving terminal profile and showing the size of the buffer and determines a packet loss, and includes the result of the determination in the quality information, the cause of a quality deterioration can be isolated with a high degree of precision.

In addition, because the quality management system in accordance with Embodiment 1, which is connected to a best-effort network and uses a service of carrying out video communications in real time, includes the quality information classifier that classifies quality information of a video stream, the quality information being generated by using the video receiving terminal profile of the video receiving terminal that receives the video stream and the video receiving terminal profile including at least the information showing the size of the buffer for absorbing packet delay fluctuations of the video stream, and that stores the quality information in the quality information database, the quality information acquiring unit that acquires the quality information from the quality information database, and the quality deterioration determinator that isolates a quality deterioration on the basis of the acquired quality information, the cause of a quality deterioration can be isolated with a high degree of precision.

Further, because in the quality management system in accordance with Embodiment 1 the quality information includes a quality value of the video stream and an identification value for determining in which section in the video stream the quality information has been measured, and the quality information acquiring unit specifies a measurement section of the quality information transmitted from the video receiving terminal and a measurement section of the quality information transmitted from the home gateway device that transmits the video stream to the video receiving terminal by using the identification value, and generates quality information for isolating a quality deterioration, the cause of a quality deterioration can be isolated with a high degree of precision.

In addition, because in the quality management system in accordance with Embodiment 1 the quality deterioration determinator isolates whether a deterioration has occurred in the external network which is a network upstream from the home gateway device, the home network for connecting between the home gateway device and the video receiving terminal, or the video receiving terminal, or whether or not a deterioration has been recovered in the video receiving terminal by using the quality information measured by the video receiving terminal and the quality information measured by the home gateway device that transmits the video stream to the video receiving terminal, the isolating process of determining whether a deterioration has occurred in either one of the external network, the home network, and the video receiving terminal or whether a deterioration has been recovered can be carried out correctly.

Further, because the quality deterioration isolation system in accordance with Embodiment 1, which is connected to a best-effort network and uses a service of carrying out video communications in real time, includes the video receiving terminal that receives a video stream via the home gateway device, and also generates a video receiving terminal profile used for generating quality information of the video stream, the home gateway device that generates the quality information of the video stream by using the video receiving terminal profile, and the quality management system that isolates a quality deterioration of the video stream by using each of the pieces of quality information, the video receiving terminal profile includes at least information showing the size of the buffer for absorbing packet delay fluctuations of the video stream in the video receiving terminal, the video receiving terminal includes the pre-FEC packet quality analyzer that measures the quality information from the video stream which is not yet stored in the buffer and on which a recovery process using FEC is not yet carried out, the post-FEC packet quality analyzer that measures the quality information from the video stream which is stored in the buffer and on which the recovery process using FEC is carried out, the quality information transmitter that transmits the pieces of measured quality information to the quality management system, and the video receiving terminal profile transmitter that generates the video receiving terminal profile and transmits the video receiving terminal profile to the home gateway device, the home gateway device includes the video receiving terminal acquiring unit that receives the video receiving terminal profile transmitted by the video receiving terminal, the pre-FEC packet quality analyzer that measures the quality information from the video stream, and the quality information transmitter that transmits the quality information measured by the pre-FEC packet quality analyzer to the quality management system, and the quality management system includes the quality information classifier that classifies the quality information transmitted thereto and stores this quality information in the quality information database, the quality information acquiring unit that acquires the quality information from the above-mentioned quality information database, and the quality deterioration determinator that isolates a quality deterioration on the basis of the acquired quality information, the cause of a quality deterioration can be isolated with a high degree of precision.

In addition, because in the quality deterioration isolation system in accordance with Embodiment 1 the quality deterioration determinator of the quality management system isolates whether a deterioration has occurred in the external network which is a network upstream from the home gateway device, the home network for connecting between the home gateway device and the video receiving terminal, or the video receiving terminal, or whether or not a deterioration has been recovered by using the quality information measured by the pre-FEC packet quality analyzer of the video receiving terminal, the quality information measured by the post-FEC packet quality analyzer of the video receiving terminal, and the quality information measured by the pre-FEC packet quality analyzer of the home gateway device, the isolating process of determining whether a deterioration has occurred in either one of the external network, the home network, and the video receiving terminal or whether a deterioration has been recovered can be carried out correctly.

Embodiment 2

In accordance with Embodiment 1, the video receiving terminal 102 measures post-FEC packet quality information and pre-FEC packet quality information and the home gateway device 104 measures pre-FEC packet quality information, and the quality management system 107 makes a comparison to determine in which section in the video stream each quality information exists. In contrast with this, in accordance with Embodiment 2, pieces of quality information corresponding to the post-FEC packet quality information of the video receiving terminal 102, the pre-FEC packet quality information of the video receiving terminal 102, and the pre-FEC packet quality information of the home gateway device 104, which are measured as shown in Embodiment 1, are measured by one unit which is a video receiving terminal 102. This embodiment corresponds to a case in which the post-FEC packet quality information of the video receiving terminal 102, the pre-FEC packet quality information of the video receiving terminal 102, and the pre-FEC packet quality information of the home gateway device 104, which are mentioned in Embodiment 1, are measured in an identical section in the video stream. Because the entire structure of a system in accordance with this embodiment is the same as that in accordance with Embodiment 1 shown in FIG. 1, the structure will be explained by using FIG. 1.

The video receiving terminal 102 measures quality information from a video stream delivered thereto from a video delivery server 106. Information which a quality management system 107 uses to isolate the cause of a quality deterioration is included in the quality information. Pieces of quality information corresponding to the post-FEC packet quality information of the video receiving terminal 102, the pre-FEC packet quality information of the video receiving terminal 102, and the pre-FEC packet quality information of the home gateway device 104, which are mentioned in Embodiment 1, are included in the quality information measured by the video receiving terminal 102. The video receiving terminal 102 measures the quality information by using a post-FEC packet to which information required for the measurement of the quality information is added.

A home gateway device 104 catches the video stream transferred to the video receiving terminal 102, and when determining that a packet loss has occurred, transmits a dummy packet to the video receiving terminal 102. The dummy packet is used to recover and generate the packet header of the lost packet. It is assumed that a payload is dummy data. The video receiving terminal 102 uses this dummy packet to add the information required for the measurement of quality information to the post-FEC packet.

The quality management system 107 stores the quality information transmitted thereto from the video receiving terminal 102. When user identification information and a time are inputted, the quality management system 107 outputs the result of the determination of isolation of a quality deterioration of the video which the corresponding user was watching and listening at that time by using the quality information stored therein, like that in accordance with Embodiment 1.

[The Operation of the System in Accordance with Embodiment 2]

Figure 21:
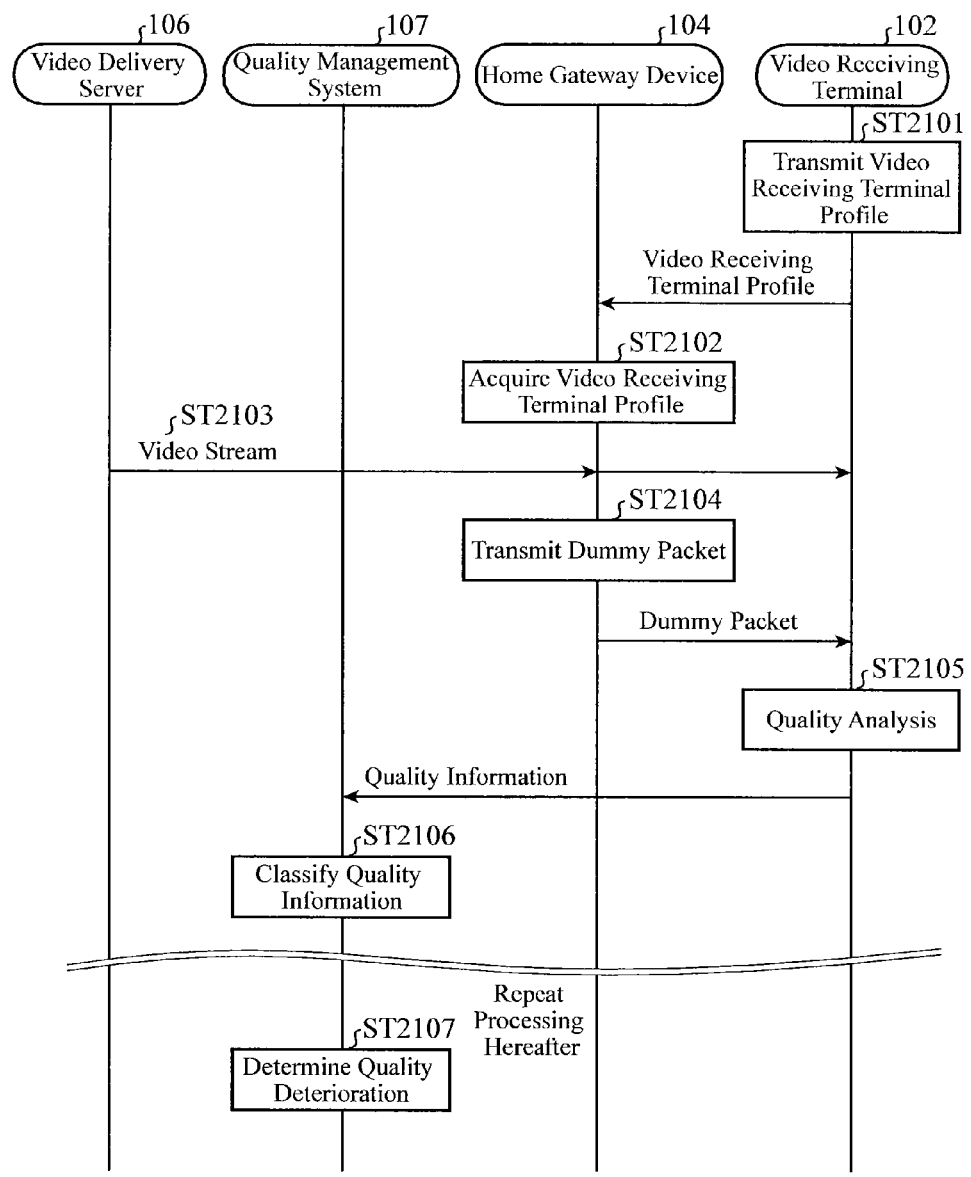
FIG. 21 is a sequence diagram showing the operation of the quality deterioration isolation system in accordance with Embodiment 2 of the present invention.

The operation of the system in accordance with Embodiment 2 of the present invention will be explained with reference to FIG. 21. FIG. 21 is a sequence diagram showing the operation of the quality deterioration isolation system. The video receiving terminal 102 generates a video receiving terminal profile, and transmits this video receiving terminal profile to the home gateway device 104 (step ST2101). Information used for the home gateway device 104 to determine whether or not to transmit a dummy packet is included in the video receiving terminal profile.

The video delivery server 106 delivers a video to an external network 105 (step ST2103). The home gateway device 104 catches the video stream delivered thereto, and, when determining that a packet loss has occurred in the video stream, generates a dummy packet for the lost packet and transmits this dummy packet to the video receiving terminal 102 (step ST2104).

After the video stream delivered is stored in a buffer, and a recovery process using FEC is also carried out on the video stream, the video receiving terminal 102 catches the video stream and measures the quality information, and transmits this quality information to the quality management system 107 (step ST2105). By identifying the dummy packet included in the video stream and determining whether or not recovery using FEC is carried out, the video receiving terminal 102 can acquire the pieces of quality information corresponding to the post-FEC packet quality information of the video receiving terminal 102, the pre-FEC packet quality information of the video receiving terminal 102, and the pre-FEC packet quality information of the home gateway device 104, which are measured as shown in Embodiment 1. The quality management system 107 classifies and stores each of the pieces of quality information received thereby (step ST2106).

When user identification information and a time are inputted, the quality management system 107 outputs the result of the determination of isolation of a quality deterioration for the video which the corresponding user was watching and listening at that time by using the quality information stored therein (step ST2107).

[The Video Receiving Terminal in Accordance with Embodiment 2]

Figure 22:
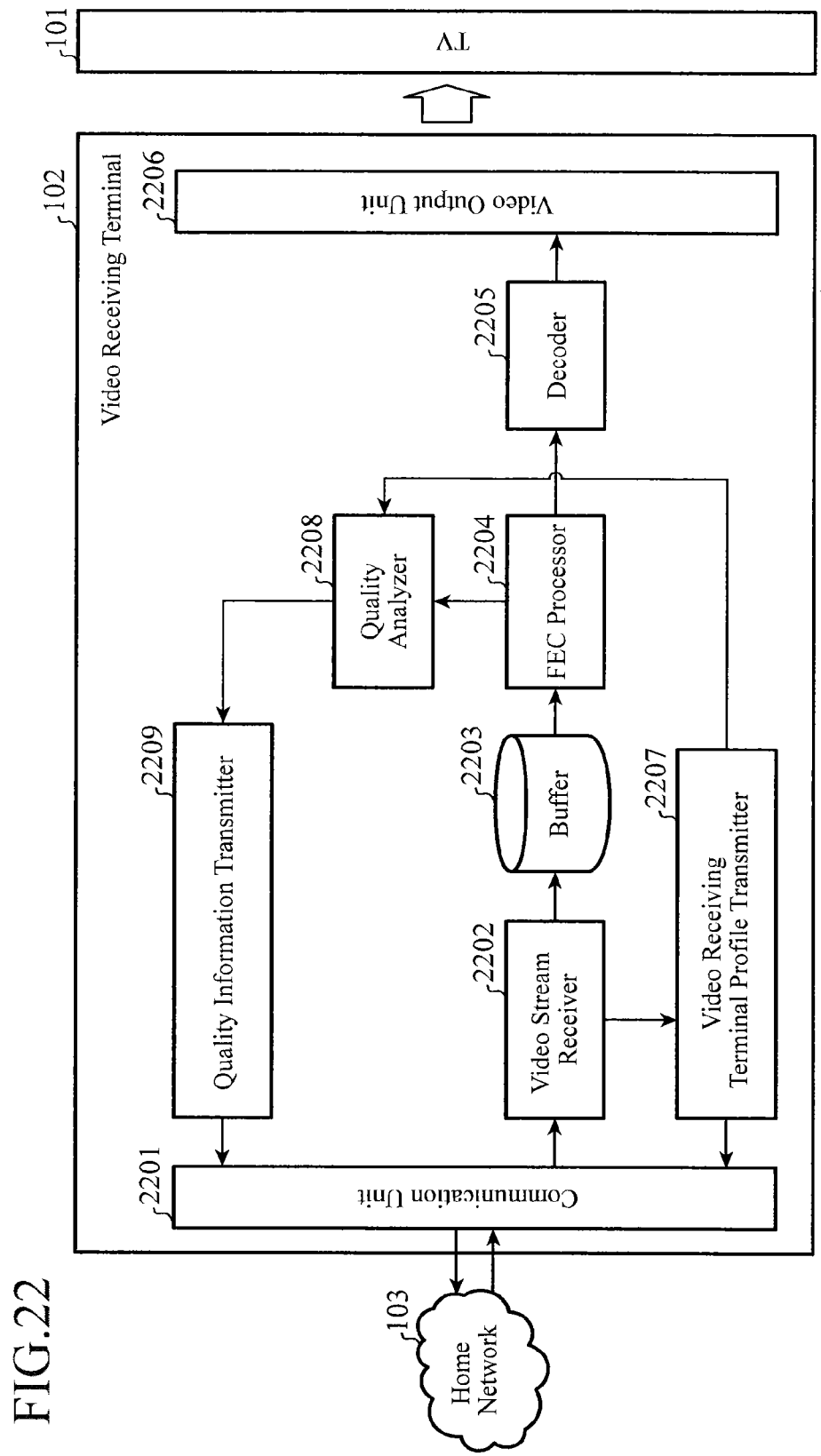
FIG. 22 is a block diagram of a video receiving terminal in accordance with Embodiment 2 of the present invention.

The structure of the video receiving terminal 102 in accordance with Embodiment 2 will be explained. FIG. 22 is a diagram showing the structure of the video receiving terminal 102. A communication unit 2201 receives a video stream from the home network 103, and delivers this video stream to a video stream receiver 2202, like that in accordance with Embodiment 1. The video stream receiver 2202 stores the video stream received thereby in a buffer 2203 in order to absorb packet delay fluctuations of the received video stream. An FEC processor 2204 extracts the video stream from the buffer 2203, and, when a packet loss has occurred in the video stream, carries out a recovery process using FEC on the video stream and sends this video stream to a decoder 2205. The decoder 2205 decodes the video stream received thereby and sends the video stream decoded thereby to a video output unit 2206. The video output unit 2206 outputs the video to a TV 101 via a video input/output interface.

Next, the video receiving terminal profile generated by the video receiving terminal 102 will be explained. A video receiving terminal profile transmitter 2207 generates the video receiving terminal profile from information specific to the video receiving terminal 102 and information acquired from the video stream receiver 2202.

The video receiving terminal 102 uses the video receiving terminal profile in order to measure the quality information. The home gateway device 104 uses the video receiving terminal profile in order to transmit a dummy packet. The video receiving terminal profile transmitter 2207 transmits the video receiving terminal profile to the home gateway device 104 via the communication unit 2201. The video receiving terminal profile is the same as that in accordance with Embodiment 1 shown in FIG. 4.

Next, the quality information measured by the video receiving terminal 102 will be explained. The FEC processor 2204 adds the information required for the measurement of quality information to the post-FEC packet, and sends this post-FEC packet a quality analyzer 2208. The information to be added is a dummy packet flag, an FEC recovery flag, and a post-FEC loss flag. These flags are added to each packet.

When the packet is a dummy packet, the dummy packet flag is set to 1, otherwise, the dummy packet flag is set to 0. When the packet is recovered by using FEC, the FEC recovery flag is set to 1, otherwise, the FEC recovery flag is set to 0.

When the lost packet cannot be recovered by using FEC, the post-FEC loss flag is set to 1, otherwise, the post-FEC loss flag is set to 0. If the substance of the lost packet does not exist at this time, the FEC processor 2204 recovers and generates the packet header of the lost packet. It is assumed that a payload is dummy data.

The FEC processor 2204 sends the post-FEC packet to which the information is added to the quality analyzer 2208. In contrast, the FEC processor 2204 sends the post-FEC packet to which the information is not added to the decoder 2205.

Figure 23:
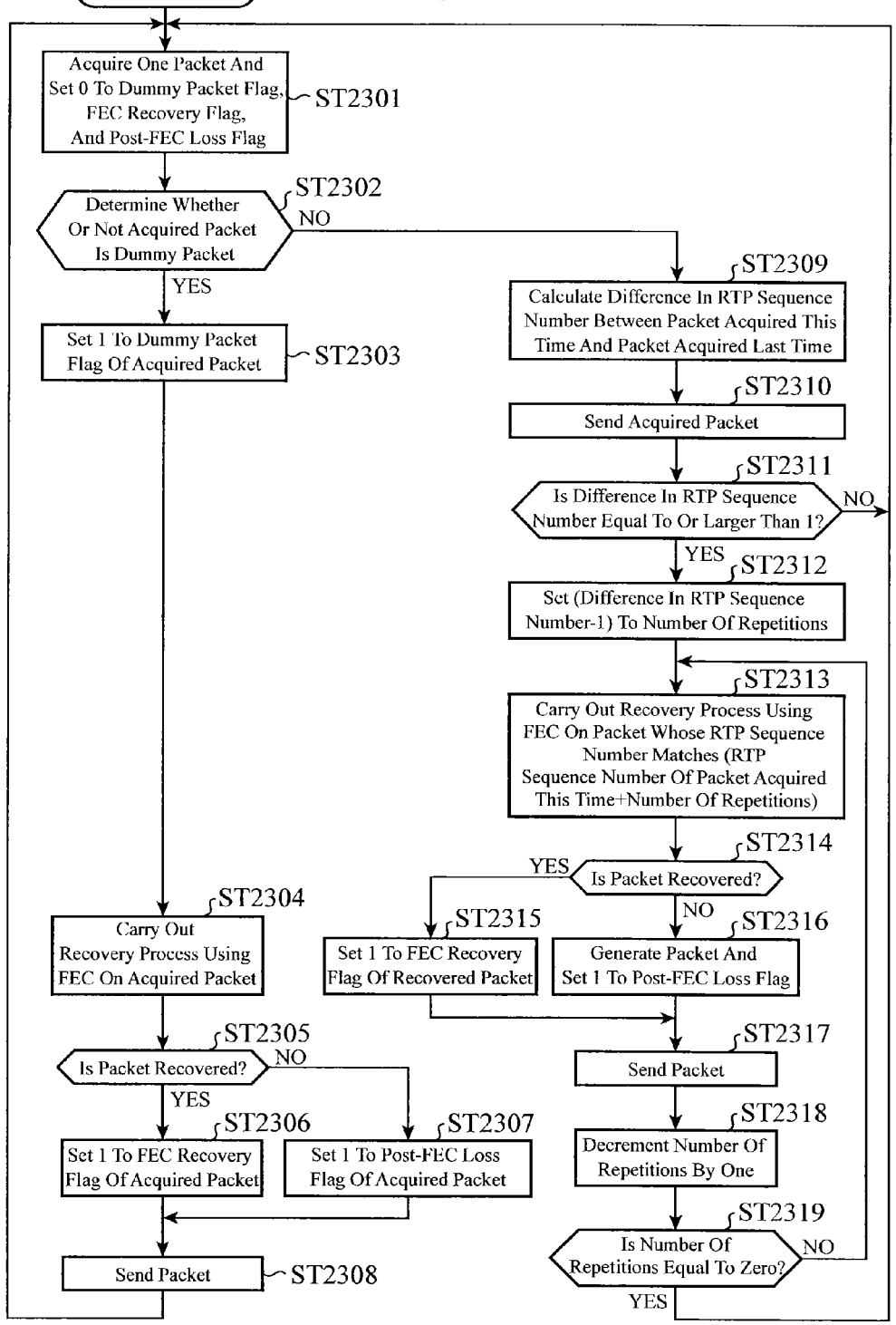
FIG. 23 is a flow chart showing a series of processes carried out by an FEC processor disposed in the video receiving terminal in accordance with Embodiment 2 of the present invention.

FIG. 23 is a flow chart showing a series of processes of the FEC processor 2204. The FEC processor 2204 acquires one packet having the longest elapsed time after stored in the buffer 2203, and sets 0 to the dummy packet flag, the FEC recovery flag, and the post-FEC loss flag (step ST2301). The FEC processor then determines whether or not the packet acquired in step ST2301 is a dummy packet (step ST2302). The FEC processor can determine whether or not the packet is a dummy packet by determining whether or not the payload of the packet is dummy data. When the acquired packet is a dummy packet, the FEC processor advances to step ST2303 (when Yes in step ST2302). In contrast, when the acquired packet is not a dummy packet, the FEC processor advances to step ST2309 (when No in step ST2302).

The FEC processor, in step ST2303, sets 1 to the dummy packet flag of the acquired packet. The FEC processor then carries out a recovery process using FEC on the acquired dummy packet (step ST2304). The FEC processor determines whether or not the packet has been recovered through the recovery process using FEC in step ST2304 (step ST2305). When the packet has been recovered, the FEC processor advances to step ST2306 (when Yes in step ST2305). In contrast, when the packet has not been recovered, the FEC processor advances to step ST2307 (when No in step ST2305). The FEC processor, in step ST2306, sets 1 to the FEC recovery flag of the acquired packet. The FEC processor, in step ST2307, sets 1 to the post-FEC loss flag of the acquired packet (step ST2307). The FEC processor sends the acquired packet to the quality analyzer 2208 and the decoder 2205 (step ST2308). However, the FEC processor sends only the packet which has been recovered by using FEC to the decoder 2205, and does not add the flag information to the packet.

The FEC processor, in step ST2309, calculates the difference in the RTP sequence number between the packet acquired this time and the packet acquired the last time. The FEC processor then sends the acquired packet to the quality analyzer 2208 and the decoder 2205 (step ST2310). However, the FEC processor does not add the flag information to the packet to be sent to the decoder 2205. The FEC processor judges the difference in the RTP sequence number calculated in step ST2309 (step ST2311). When the difference is larger than 1, the FEC processor advances to step ST2312 (when Yes in step ST2311). Otherwise, the FEC processor advances to step ST2301 (when No in step ST2311). Because the packet has been lost when the difference in the RTP sequence number is larger than 1, the FEC processor carries out a recovery process using FEC.

The FEC processor sets (the RTP sequence number−1) to the number of repetitions (step ST2312). The number of repetitions is the number of packets lost continuously. The FEC processor carries out a recovery process using FEC on a packet whose RTP sequence number matches (the RTP sequence number of the packet acquired this time+the number of repetitions) (step ST2313). The FEC processor then determines whether or not the packet has been recovered through the recovery process using FEC in step ST2313 (step ST2314). When the packet has been recovered, the FEC processor advances to step ST2315 (when Yes in step ST2314). In contrast, when the packet has not been recovered, the FEC processor advances to step ST2316 (when No in step ST2314). The FEC processor, in step ST2315, sets 1 to the FEC recovery flag of the recovered packet. The FEC processor, in step ST2316, generates a packet whose packet header has been recovered, and sets 1 to the post-FEC loss flag of the packet. The FEC processor sends the acquired packet to the quality analyzer 2208 and the decoder 2205 (step ST2317). However, the FEC processor sends only the packet which has been recovered by using FEC to the decoder 2205, and does not add the flag information to the packet. The FEC processor decrements the number of repetitions by one (step ST2318). The FEC processor then judges the number of repetitions (step ST2319). When the number of repetitions is equal to 0, the FEC processor advances to step ST2301 (when Yes in step ST2319). Otherwise, the FEC processor advances to step ST2313 (when No in step ST2319).

As shown in FIG. 23, by adding the dummy packet flag, the FEC recovery flag, and the post-FEC loss flag to the post-FEC packet to be sent to the quality analyzer 2208, the FEC processor makes it possible for the quality analyzer 2208 to measure the pieces of quality information corresponding to the post-FEC packet quality information of the video receiving terminal 102, the pre-FEC packet quality information of the video receiving terminal 102, and the pre-FEC packet quality information of the home gateway device 104, which are mentioned in Embodiment 1.

Next, the quality analyzer 2208 measures the quality information from the post-FEC packet to which the information is added. The quality analyzer 2208 sends the measured quality information to a quality information transmitter 2209. The quality information transmitter 2209 transmits the quality information to the quality management system 107 via the communication unit 2201.

FIG. 24 shows an example of the quality information measured by the video receiving terminal 102. User identification information A5 has a value equal to that of a user identification information A1 included in the video receiving terminal profile acquired from the video receiving terminal profile transmitter 2207.

A quality information sequence number G5 is incremented by one every time when the quality analyzer 2208 measures the quality information. The quality management system 107 sorts the pieces of quality information transmitted thereto in the order in which they have been measured by using the quality information sequence number G5.

A timestamp H5 is the time that the quality information is measured. The quality management system 107 isolates a quality deterioration at a specified time with reference to the timestamp H5.

A number of packets J5 is the number of packets used for the measurement of the quality information during a quality information measurement time interval of B1.

A quality value (1) L5 is a value showing quality corresponding to the post-FEC packet quality of the video receiving terminal 102 which is mentioned in Embodiment 1. In this embodiment, it is assumed that the quality value (1) L5 is the number of packet losses occurring in the post-FEC packets in the video receiving terminal 102. The quality value (1) L5 is the number of packets each of which is determined to be a loss during a quality information measurement time interval of B1. The quality management system 107 uses the quality value (1) L5 in order to determine whether the quality of the post-FEC packets deteriorates in the video receiving terminal 102.

A quality value (2) M5 is a value showing quality corresponding to the pre-FEC packet quality of the video receiving terminal 102 which is mentioned in Embodiment 1. In this embodiment, it is assumed that the quality value (2) L5 is the number of packet losses occurring in the pre-FEC packets in the video receiving terminal 102. The quality value (2) M5 is the number of packets each of which is determined to be a loss during a quality information measurement time interval of B1. The quality management system 107 uses the quality value (2) M5 in order to determine whether the quality of the pre-FEC packets deteriorates in the video receiving terminal 102.

A quality value (3) N5 is a value showing quality corresponding to the pre-FEC packet quality of the home gateway device 104 which is mentioned in Embodiment 1. In this embodiment, it is assumed that the quality value (3) N5 is the number of packet losses which is estimated to occur in the pre-FEC packets in the home gateway device 104. The quality value (3) N5 is the number of packets each of which is determined to be a loss during a quality information measurement time interval of B1. The quality management system 107 uses the quality value (3) N5 in order to determine whether the quality of the pre-FEC packets deteriorates in the home gateway device 104.

Figure 25:
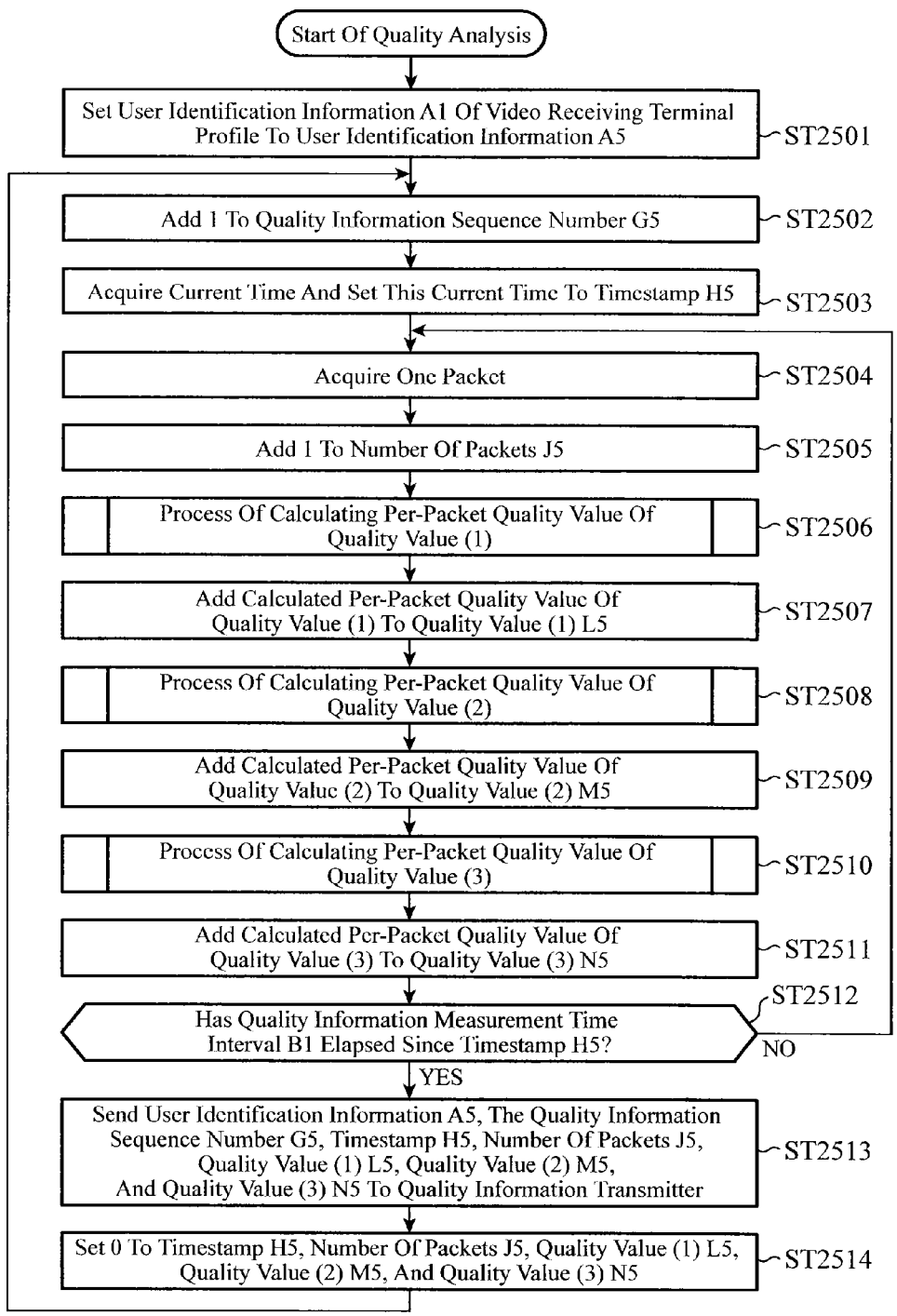
FIG. 25 is a flow chart showing a series of processes of measuring the quality information which is carried out by a quality analyzer disposed in the video receiving terminal in accordance with Embodiment 2 of the present invention.

FIG. 25 is a flow chart showing a series of processes of measuring the quality information which is carried out by the quality analyzer 2208. First, the quality analyzer sets the user identification information A1 included in the video receiving terminal profile acquired from the video receiving terminal profile transmitter 2207 to the user identification information A5 (step ST2501).

The quality analyzer adds 1 to the quality information sequence number G5 (step ST2502). The quality analyzer acquires the current time and sets this current time to the timestamp H5 (step ST2503).

The quality analyzer acquires one packet (step ST2504). The quality analyzer adds 1 to the number of packets J5 (step ST2505).

The quality analyzer calculates a per-packet quality value of the quality value (1) (step ST2506). The per-packet quality value of the quality value (1) is the one calculated for each packet, and the cumulative sum of per-packet quality values during a quality information measurement time interval of B1 is provided as the quality value (1) L5. A method of calculating the per-packet quality value of the quality value (1) in step ST2506 will be explained by using a flowchart shown in FIG. 26. Next, the quality analyzer adds the per-packet quality value calculated in step ST2506 to the quality value (1) L5 (step ST2507).

The quality analyzer calculates a per-packet quality value of the quality value (2) (step ST2508). The per-packet quality value of the quality value (2) is the one calculated for each packet, and the cumulative sum of per-packet quality values during a quality information measurement time interval of B1 is provided as the quality value (2) M5. A method of calculating the per-packet quality value of the quality value (2) in step ST2508 will be explained by using a flowchart shown in FIG. 27. Next, the quality analyzer adds the per-packet quality value calculated in step ST2508 to the quality value (2) N5 (step ST2509).

The quality analyzer calculates a per-packet quality value of the quality value (3) (step ST2510). The per-packet quality value of the quality value (3) is the one calculated for each packet, and the cumulative sum of per-packet quality values during a quality information measurement time interval of B1 is provided as the quality value (3) N5. A method of calculating the per-packet quality value of the quality value (3) in step ST2510 will be explained by using a flow chart shown in FIG. 28. Next, the quality analyzer adds the per-packet quality value calculated in step ST2510 to the quality value (3) N5 (step ST2511).

The quality analyzer checks whether a quality information measurement time interval of B1 included in the video receiving terminal profile has elapsed since the timestamp H5 set in step ST2503 (step ST2512). When the result of the check shows that a quality information measurement time interval has elapsed since the timestamp, the quality analyzer advances to step ST2513 (when Yes in step ST2512). In contrast, when a quality information measurement time interval has not elapsed since the timestamp, the quality analyzer advances to step ST2504 (when No in step ST2512).

The quality analyzer sends the user identification information A5, the quality information sequence number G5, the timestamp H5, the number of packets J5, the quality value (1) L5, the quality value (2) M5, and the quality value (3) N5 to the quality information transmitter 2209 as the quality information (step ST2513). The quality analyzer then sets 0 to the timestamp H5, the number of packets J5, the quality value (1) L5, the quality value (2) M5, and the quality value (3) N5, and advances to step ST2502 (step ST2514).

Figure 26:
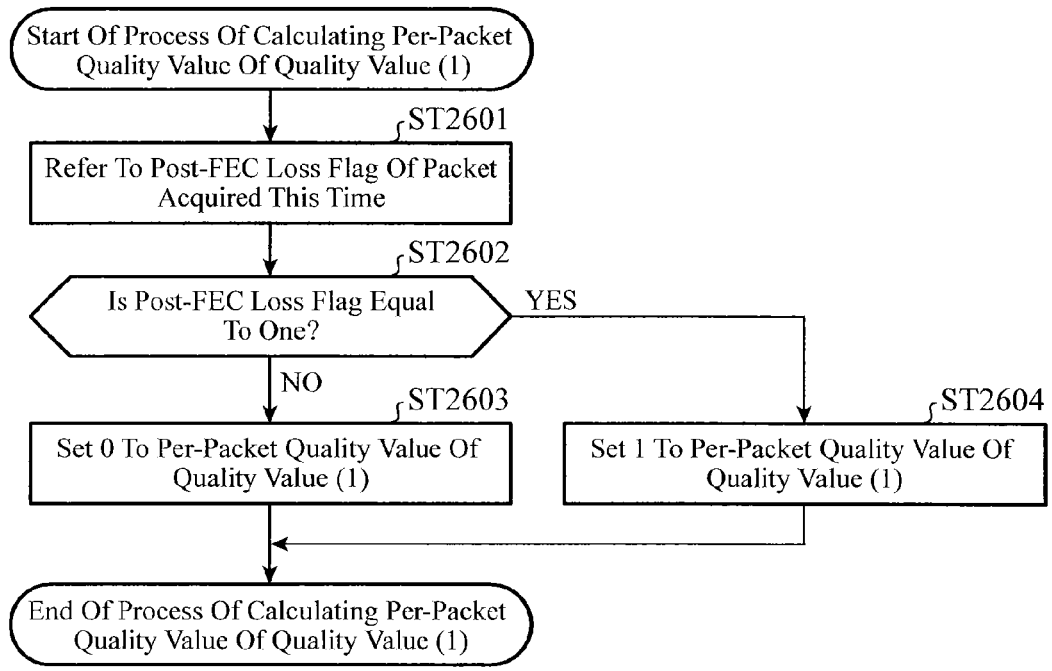
FIG. 26 is a flow chart showing a series of processes of calculating a per-packet quality value of a quality value (1) which is carried out by the quality analyzer disposed in the video receiving terminal in accordance with Embodiment 2 of the present invention.

FIG. 26 is a flow chart showing a series of processes of calculating the per-packet quality value of the quality value (1) which is carried out by the quality analyzer 2208. The quality analyzer refers to the post-FEC loss flag of the packet acquired in step ST2504 of FIG. 25 (step ST2601). The quality analyzer judges the value of the post-FEC loss flag (step ST2602). When the value is equal to 1, the quality analyzer advances to step ST2604 (when Yes in step ST2602). Otherwise, the quality analyzer advances to step ST2603 (when No in step ST2602). The quality analyzer, in step ST2603, sets 0 to the per-packet quality value of the quality value (1), and ends the processing. The quality analyzer, in step ST2604, sets 1 to the per-packet quality value of the quality value (1), and ends the processing.

As shown in FIG. 26, the quality analyzer 2208 determines a packet loss corresponding to the post-FEC packet quality of the video receiving terminal 102 which is mentioned in Embodiment 1 by checking the post-FEC loss flag for each packet.

Figure 27:
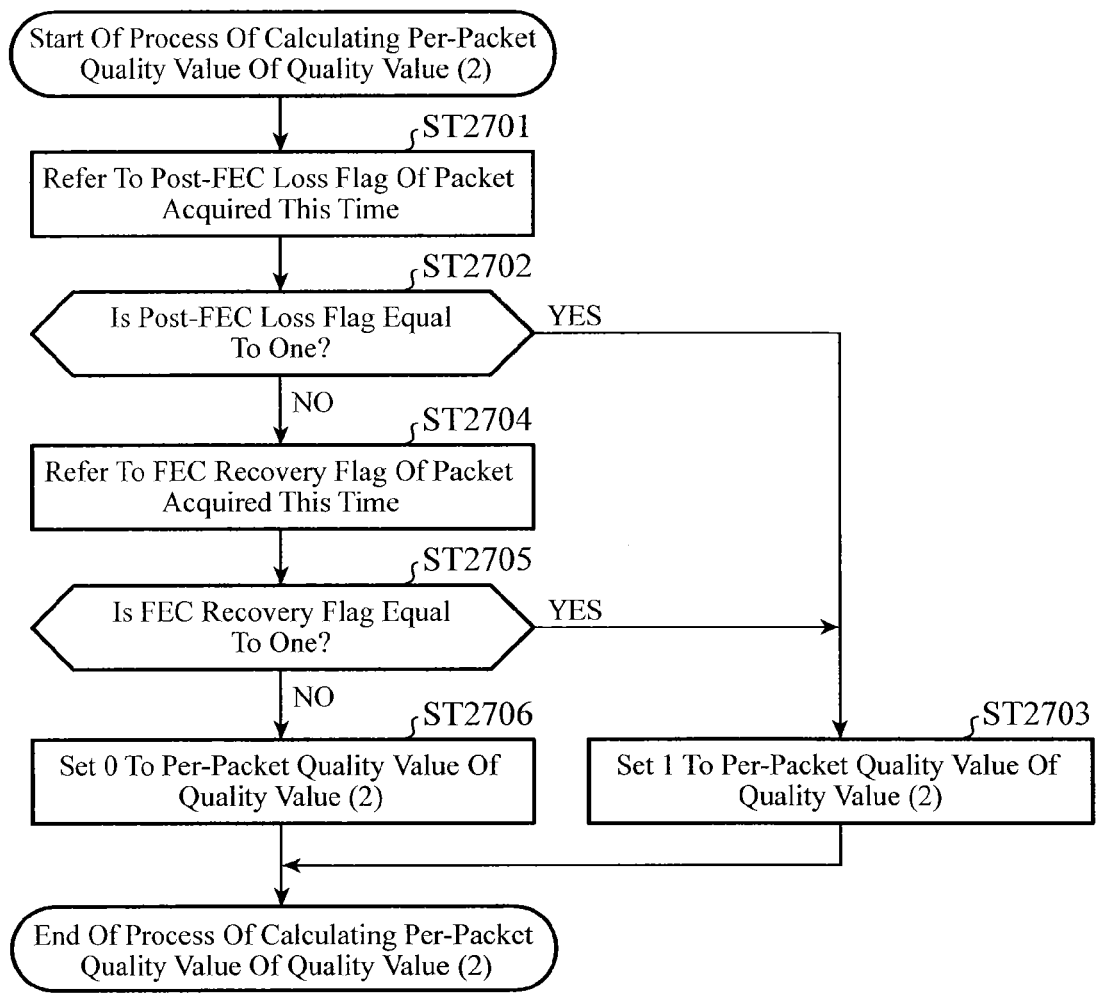
FIG. 27 is a flow chart showing a series of processes of calculating a per-packet quality value of a quality value (2) which is carried out by the quality analyzer disposed in the video receiving terminal in accordance with Embodiment 2 of the present invention.

FIG. 27 is a flow chart showing a series of processes of calculating the per-packet quality value of the quality value (2) which is carried out by the quality analyzer 2208. The quality analyzer refers to the post-FEC loss flag of the packet acquired in step ST2504 of FIG. 25 (step ST2701). Next, the quality analyzer judges the value of the post-FEC loss flag (step ST2702). When the value is equal to 1, the quality analyzer advances to step ST2703 (when Yes in step ST2702). Otherwise, the quality analyzer advances to step ST2704 (when No in step ST2702). The quality analyzer, in step ST2703, sets 1 to the per-packet quality value of the quality value (2), and ends the processing.

The quality analyzer, in step ST2704, refers to the FEC recovery flag of the acquired packet. Next, the quality analyzer judges the value of the FEC recovery flag (step ST2705). When the value is equal to 1, the quality analyzer advances to step ST2703 (when Yes in step ST2705). Otherwise, the quality analyzer advances to step ST2706 (when No in step ST2705). The quality analyzer, in step ST2706, sets 0 to the per-packet quality value of the quality value (2), and ends the processing.

As shown in FIG. 27, the quality analyzer 2208 determines a packet loss corresponding to the pre-FEC packet quality of the video receiving terminal 102 which is mentioned in Embodiment 1 by checking the post-FEC loss flag and the FEC recovery flag for each packet.

Figure 28:
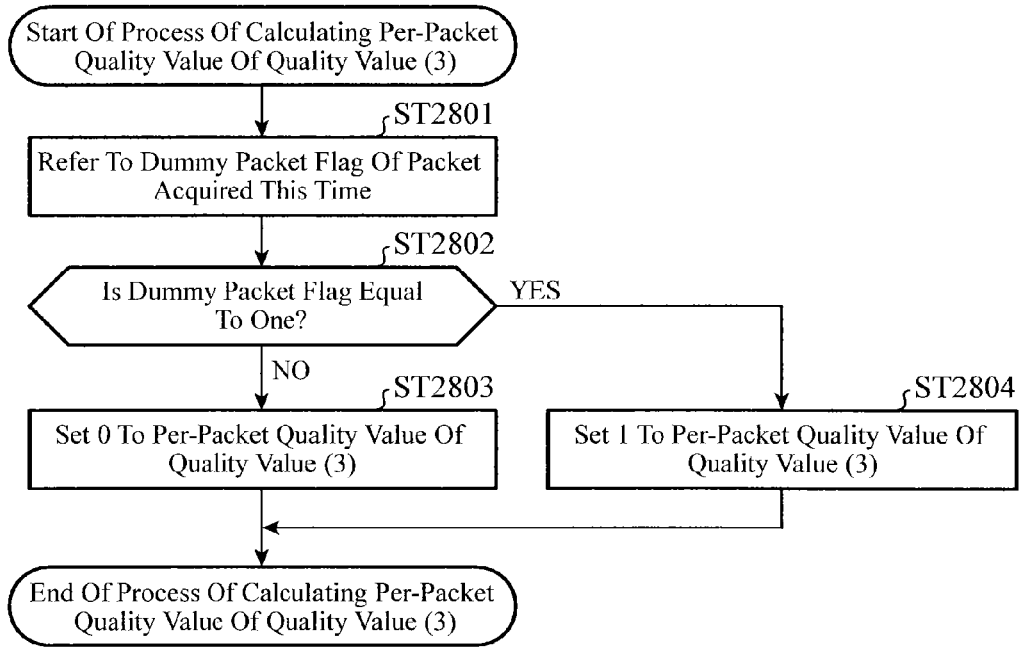
FIG. 28 is a flow chart showing a series of processes of calculating a per-packet quality value of a quality value (3) which is carried out by the quality analyzer disposed in the video receiving terminal in accordance with Embodiment 2 of the present invention.

FIG. 28 is a flow chart showing a series of processes of calculating the per-packet quality value of the quality value (3) which is carried out by the quality analyzer 2208. The quality analyzer refers to the dummy packet flag of the packet acquired in step ST2504 of FIG. 25 (step ST2801). Next, the quality analyzer judges the value of the dummy packet flag (step ST2802). When the value is equal to 1, the quality analyzer advances to step ST2804 (when Yes in step ST2802). Otherwise, the quality analyzer advances to step ST2803 (when No in step ST2802). The quality analyzer, in step ST2803, sets 0 to the per-packet quality value of the quality value (3), and ends the processing. The quality analyzer, in step ST2804, sets 1 to the per-packet quality value of the quality value (3), and ends the processing.

As shown in FIG. 28, the quality analyzer 2208 determines a packet loss corresponding to the pre-FEC packet quality of the home gateway device 104 which is mentioned in Embodiment 1 by checking the dummy packet flag for each packet. However, there is a possibility that a dummy packet is lost when a deterioration has occurred in the home network 103. In this case, because the value of the quality value (1) L or the quality value (2) M, instead of the quality value (3) N, is counted, and the quality management system 107 finally determines whether a quality deterioration has occurred in the home network 103, no problem is presented.

[The Home Gateway Device in Accordance with Embodiment 2]

Figure 29:
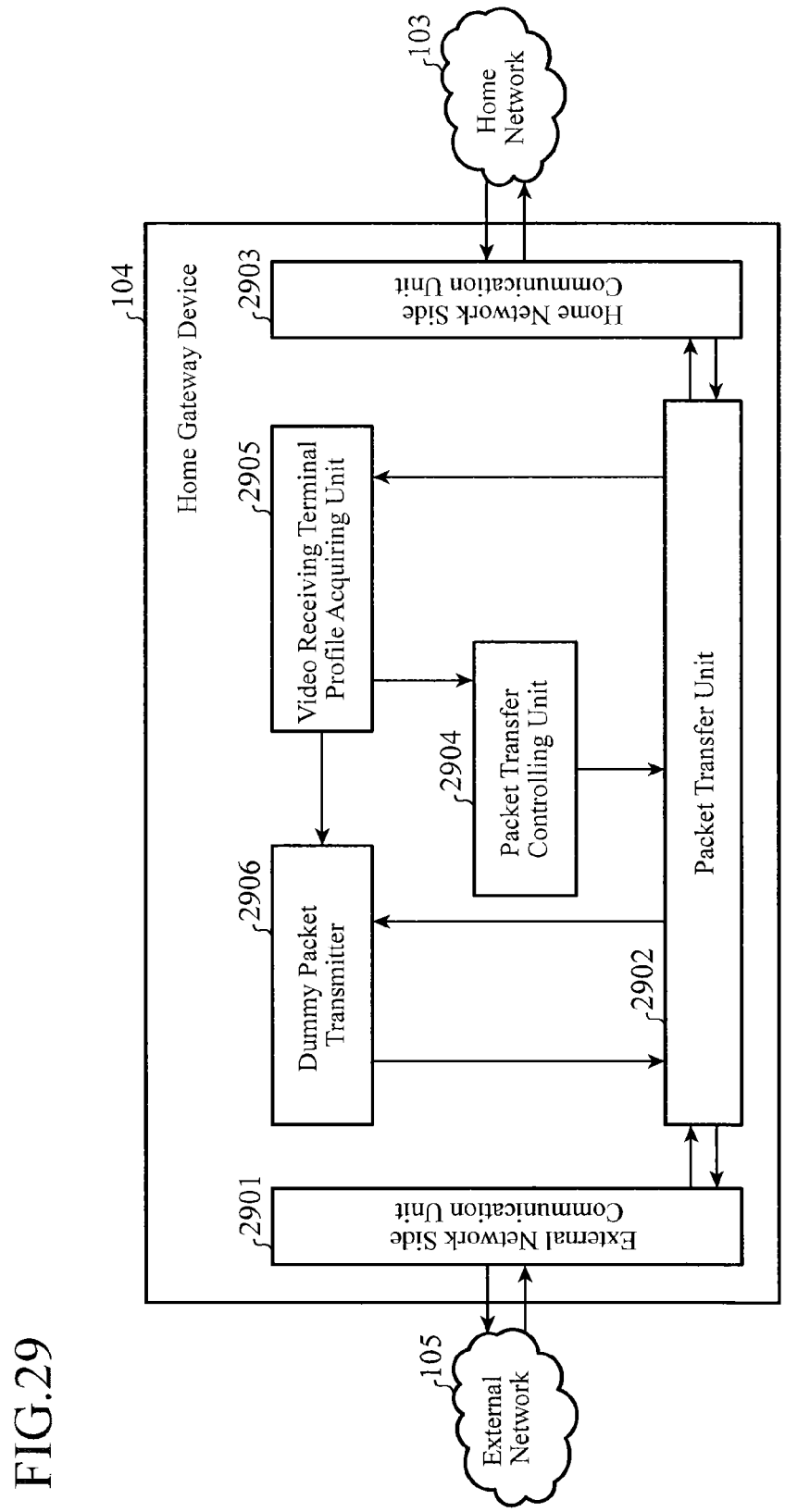
FIG. 29 is a block diagram of a home gateway device in accordance with Embodiment 2 of the present invention.

Next, the structure of the home gateway device 104 in accordance with Embodiment 2 of the present invention will be explained. FIG. 29 is a diagram showing the structure of the home gateway device 104. An external network side communication unit 2901 receives a video stream which the video delivery server 106 delivers via the external network 105. The external network side communication unit 2901 sends the video stream received thereby to a packet transfer unit 2902. The packet transfer unit 2902 transfers the video stream to a home network side communication unit 2903. The home network side communication unit 2903 transmits the video stream received thereby to the video receiving terminal 102 via the home network 103.

Next, the video receiving terminal profile transmitted from the video receiving terminal 102 to the home gateway device 104 will be explained. The home network side communication unit 2903 receives the video receiving terminal profile which the video receiving terminal 102 transmits via the home network 103. The home network side communication unit 2903 sends the video receiving terminal profile received thereby to the packet transfer unit 2902. The packet transfer unit 2902 transfers the video receiving terminal profile to a video receiving terminal profile acquiring unit 2905.

The video receiving terminal profile acquiring unit 2905 sends a destination address C1 included in the video receiving terminal profile to a packet transfer controlling unit 2904. The packet transfer controlling unit 2904 provides a setting for making a copy of a packet whose destination IP address matches the destination address C1 and sending the copy to a dummy packet transmitter 2906 for the packet transfer unit 2902. As a result, the packet transfer unit 2902 makes a copy of the video stream delivered to the video receiving terminal 102, and sends the copy to the dummy packet transmitter 2906.

The video receiving terminal profile acquiring unit 2905 sends a buffer size D1 included in the video receiving terminal profile to the dummy packet transmitter 2906. The dummy packet transmitter 2906 determines whether or not to transmit a dummy packet by using the buffer size D1.

The dummy packet transmitter 2906 receives the video stream from the packet transfer unit 2902, and monitors whether or not a packet loss has occurred. When determining that a packet loss has occurred, the dummy packet transmitter generates a dummy packet and sends this dummy packet to the packet transfer unit 2902. The packet transfer unit 2902 transmits the dummy packet to the video receiving terminal 102 via the home network side communication unit 2903.

Figure 30:
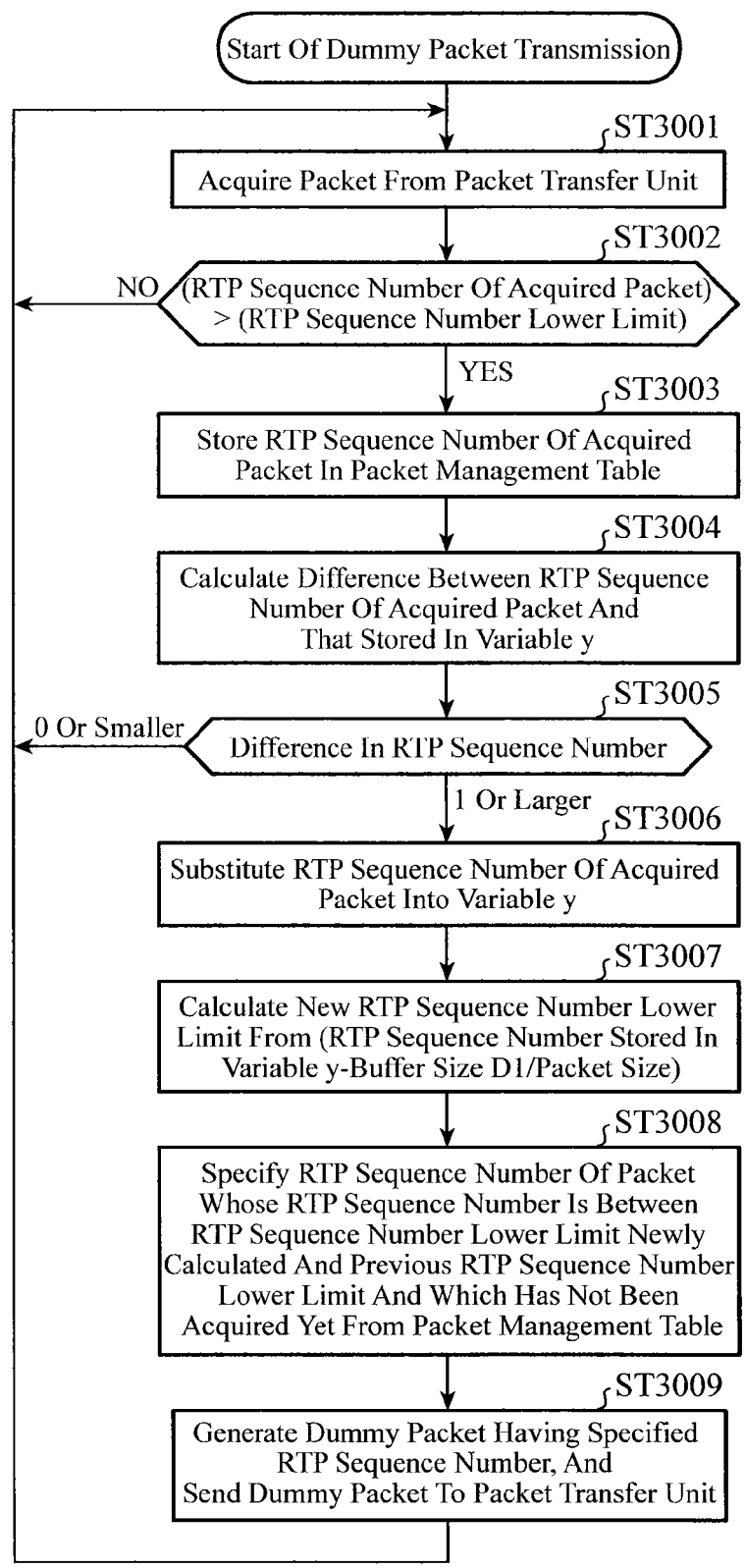
FIG. 30 is a flow chart showing a series of processes of transmitting a dummy packet which is carried out by a dummy packet transmitter disposed in a home gateway device in accordance with Embodiment 2 of the present invention.

FIG. 30 is a flow chart showing a series of processes of transmitting the dummy packet which is carried out by the dummy packet transmitter 2906. The dummy packet transmitter acquires a packet from the packet transfer unit 2902 (step ST3001). The dummy packet transmitter compares the RTP sequence number of the acquired packet with an RTP sequence number lower limit (step ST3002). The RTP sequence number lower limit is a threshold used for determining whether the packet is discarded virtually from the buffer having the buffer size D1 because of a delay in the arrival of the packet. When the RTP sequence number of the packet is smaller than the RTP sequence number lower limit, the dummy packet transmitter determines that the packet is discarded. In contrast, when the RTP sequence number of the packet acquired is equal to or larger than the RTP sequence number lower limit, the dummy packet transmitter advances to step ST3003 (when Yes in step ST3002). Otherwise, the dummy packet transmitter advances to step ST3001 (when No in step ST3002).

The dummy packet transmitter stores the RTP sequence number of the acquired packet in a packet management table (step ST3003). The packet management table stores information showing whether a packet whose RTP sequence number is equal to or larger than the RTP sequence number lower limit has been acquired.

The dummy packet transmitter calculates the difference between the RTP sequence number of the acquired packet and that stored in a variable y (step ST3004). The RTP sequence number of the packet which is acquired the last time is stored in the variable y.

Next, the dummy packet transmitter judges the difference in the RTP sequence number calculated in step ST3004 (step ST3005). When the difference is equal to or larger than 1, the dummy packet transmitter advances to step ST3006 (when 1 or larger in step ST3005). When the difference is equal to or smaller than 0, the dummy packet transmitter advances to step ST3001 (when 0 or smaller in step ST3005). The dummy packet transmitter substitutes the RTP sequence number of the acquired packet into the variable y (step ST3006). Next, the dummy packet transmitter calculates (the RTP sequence number stored in the variable y−the buffer size D1/the packet size), and sets the result of this calculation to the RTP sequence number lower limit (step ST3007). The buffer size D1 is included in the video receiving terminal profile. The packet size is the one of each packet of the video stream.

The dummy packet transmitter specifies the RTP sequence number of a packet whose RTP sequence number is between the RTP sequence number lower limit newly calculated and the previous RTP sequence number lower limit and which has not been acquired yet from the packet management table (step ST3008). The dummy packet transmitter generates the dummy packet having the RTP sequence number specified in step ST3008, and sends the dummy packet to the packet transfer unit 2902 (step ST3009).

Referring to FIG. 30, the dummy packet transmitter determines whether or not the packet is discarded virtually from the buffer by using the buffer size D1 of the buffer disposed in the video receiving terminal 102, and transmits the dummy packet when determining that the packet is discarded.

[The Quality Management System in Accordance with Embodiment 2]

Next, the structure of the quality management system 107 in accordance with Embodiment 2 of the present invention will be explained. The structure is the same as that in accordance with Embodiment 1 shown in FIG. 14. A communication unit 1401 receives the quality information transmitted by the video receiving terminal 102 from the external network 105. The communication unit 1401 sends the quality information to a quality information classifier 1402. The quality information classifier 1402 classifies the quality information received thereby, and stores this quality information in a quality information database 1403. The quality information transmitted to the quality management system 107 is only one type of quality information transmitted from the video receiving terminal 102.

Figure 31:
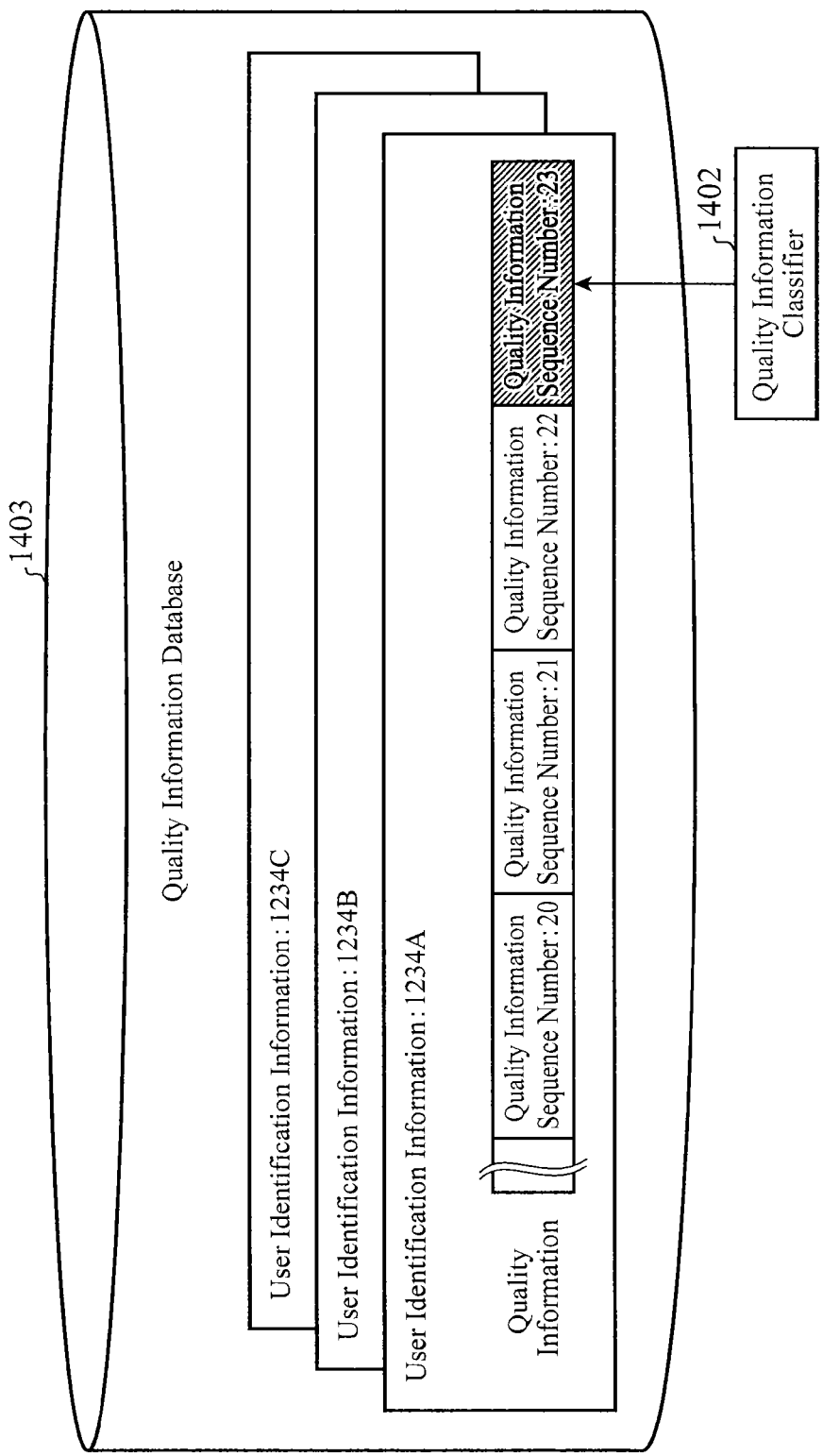
FIG. 31 is an explanatory drawing showing an example in which a quality information classifier disposed in the quality management system in accordance with Embodiment 2 of the present invention stores quality information in a quality information database.

FIG. 31 shows an example in which the quality information classifier 1402 classifies the quality information and stores this quality information in the quality information database 1403. The quality information database 1403 should just hold the quality information in the order of its quality information sequence number for each user identification information. The quality information classifier 1402 stores the quality information in a section corresponding to each user identification information in the quality information database 1403.

When acquiring the quality information used for the determination of a quality deterioration from the quality information database 1403, a quality information acquiring unit 1405 should just refer to user identification information and a deterioration determination time which are received from an input unit 1404 and acquire only one piece of quality information used for the isolation of a quality deterioration from the quality information database 1403.

A quality deterioration determinator 1406 isolates a quality deterioration on the basis of the quality information received from the quality information acquiring unit 1405. At this time, the quality deterioration determinator determines a deterioration by assuming that the quality value (1) L5 corresponds to the quality value of the post-FEC packet quality information of the video receiving terminal 102 in accordance with Embodiment 1, the quality value (2) M5 corresponds to the quality value of the pre-FEC packet quality information of the video receiving terminal 102 in accordance with Embodiment 1, and the quality value (3) N5 corresponds to the quality value of the pre-FEC packet quality information of the home gateway device 104 in accordance with Embodiment 1. The quality deterioration determinator sends the result of the determination of isolation of a quality deterioration to an output unit 1407.

[Advantages Provided by Embodiment 2]

As mentioned above, because the video receiving terminal in accordance with this Embodiment 2, which is connected to a best-effort network and uses a service of carrying out video communications in real time, includes the video receiving terminal profile transmitter that generates a video receiving terminal profile showing information specific to the video receiving terminal, and also transmits the video receiving terminal profile to the home gateway device that delivers a video stream, the FEC processor that carries out a recovery process using FEC on the video stream including a dummy packet which is generated on the basis of the video receiving terminal profile by the home gateway device, and also adds information including at least the result of the recovery process to the video stream, the quality analyzer that measures quality information from the video stream to which the information is added, and the quality information transmitter that transmits the measured quality information, the cause of a quality deterioration can be isolated with a high degree of precision.

Further, because in the video receiving terminal in accordance with Embodiment 2 the dummy packet includes information identifying where in the video stream caught by the home gateway device a packet loss has occurred, and the FEC processor determines whether or not the packet is the dummy packet and whether or not a lost packet has been recovered by using FEC, and adds the information including at least the result of the recovery process to the video stream, the cause of a quality deterioration can be isolated with a high degree of precision.

In addition, because in the video receiving terminal in accordance with Embodiment 2 the quality analyzer measures quality values of the video stream respectively corresponding to pre-FEC packet quality information which is the quality information measured from the video stream which is not yet stored in the buffer used for absorbing packet delay fluctuations in the video stream and on which the recovery process using FEC is not yet carried out, post-FEC packet quality information which is the quality information measured from the video stream which is stored in the buffer and on which the recovery process using FEC is carried out, and quality information which is measured from the video stream by the home gateway device, the cause of a quality deterioration can be isolated with a high degree of precision.

Further, because in the video receiving terminal in accordance with Embodiment 2 the video receiving terminal profile includes information showing the size of the buffer for absorbing packet delay fluctuations in the video stream in the video receiving terminal, the cause of a quality deterioration can be isolated with a high degree of precision.

In addition, because the home gateway device in accordance with Embodiment 2, which is connected to a best-effort network and uses a service of carrying out video communications in real time, includes the video receiving terminal acquiring unit that acquires the video receiving terminal profile which is information specific to the video receiving terminal that receives the video stream delivered via the home gateway device, and the dummy packet transmitter that judges the video stream on the basis of the video receiving terminal profile, and transmits a dummy packet including information identifying where in the video stream caught by the home gateway device a packet loss has occurred to the video receiving terminal, the cause of a quality deterioration can be isolated with a high degree of precision.

Further, because in the home gateway device in accordance with Embodiment 2 the video receiving terminal profile includes the information showing the size of the buffer for absorbing packet delay fluctuations of the video stream in the video receiving terminal, and the dummy packet transmitter determines whether or not the packet is discarded virtually from the buffer by using the information showing the size of the buffer, and, when it is determined that a packet loss has occurred, transmits the dummy packet to the video receiving terminal, the cause of a quality deterioration can be isolated with a high degree of precision.

In addition, because the quality deterioration isolation system in accordance with Embodiment 2, which is connected to a best-effort network and uses a service of carrying out video communications in real time, includes the video receiving terminal that receives the video stream via the home gateway device, and also generates the video receiving terminal profile which is information specific to the video receiving terminal, the home gateway device that generates a dummy packet by using the video receiving terminal profile, and transmits the dummy packet to the video receiving terminal, and the quality management system that isolates a quality deterioration of the video stream by using the quality information, the video receiving terminal includes the FEC processor that carries out a recovery process using FEC on the video stream including the dummy packet, and also adds the information including at least the result of the recovery process to the video stream, the quality analyzer that measures the quality information from the video stream to which the information is added, the quality information transmitter that transmits the measured quality information to the quality management system, and the video receiving terminal profile transmitter that generates the video receiving terminal profile and transmits the video receiving terminal profile to the home gateway device, the home gateway device includes the video receiving terminal acquiring unit that receives the video receiving terminal profile transmitted by the video receiving terminal, and the dummy packet transmitter that judges the video stream on the basis of the video receiving terminal profile, and transmits the dummy packet to the video receiving terminal, and the quality management system includes the quality information classifier that classifies the quality information transmitted thereto and stores the quality information in the quality information database, the quality information acquiring unit that acquires the quality information from the above-mentioned quality information database, and the quality deterioration determinator that isolates a quality deterioration on the basis of the acquired quality information, the difference between the measurement sections resulting from the quality management system making a comparison among a plurality of pieces of quality information can be eliminated, and the system can isolate the cause of a quality deterioration with a high degree of precision.

Embodiment 3

In accordance with Embodiments 1 and 2 of the present invention, the video receiving terminal 102 and the home gateway device 104 measure quality information at all times when a video stream is delivered to them. In accordance with Embodiment 3 of the present invention, whether or not a quality deterioration has occurred in a video stream delivered is detected, and quality information is measured only when a quality deterioration has occurred.

[The Operation of a System in Accordance with Embodiment 3]

The operation of the system in accordance with Embodiment 3 will be explained. Hereafter, although an explanation of an operation of measuring quality information only when whether or not a quality deterioration has occurred is detected and a quality deterioration has occurred will be explained on the assumption that this embodiment is applied to Embodiment 1, this embodiment can be similarly applied to Embodiment 2.

Figure 32:
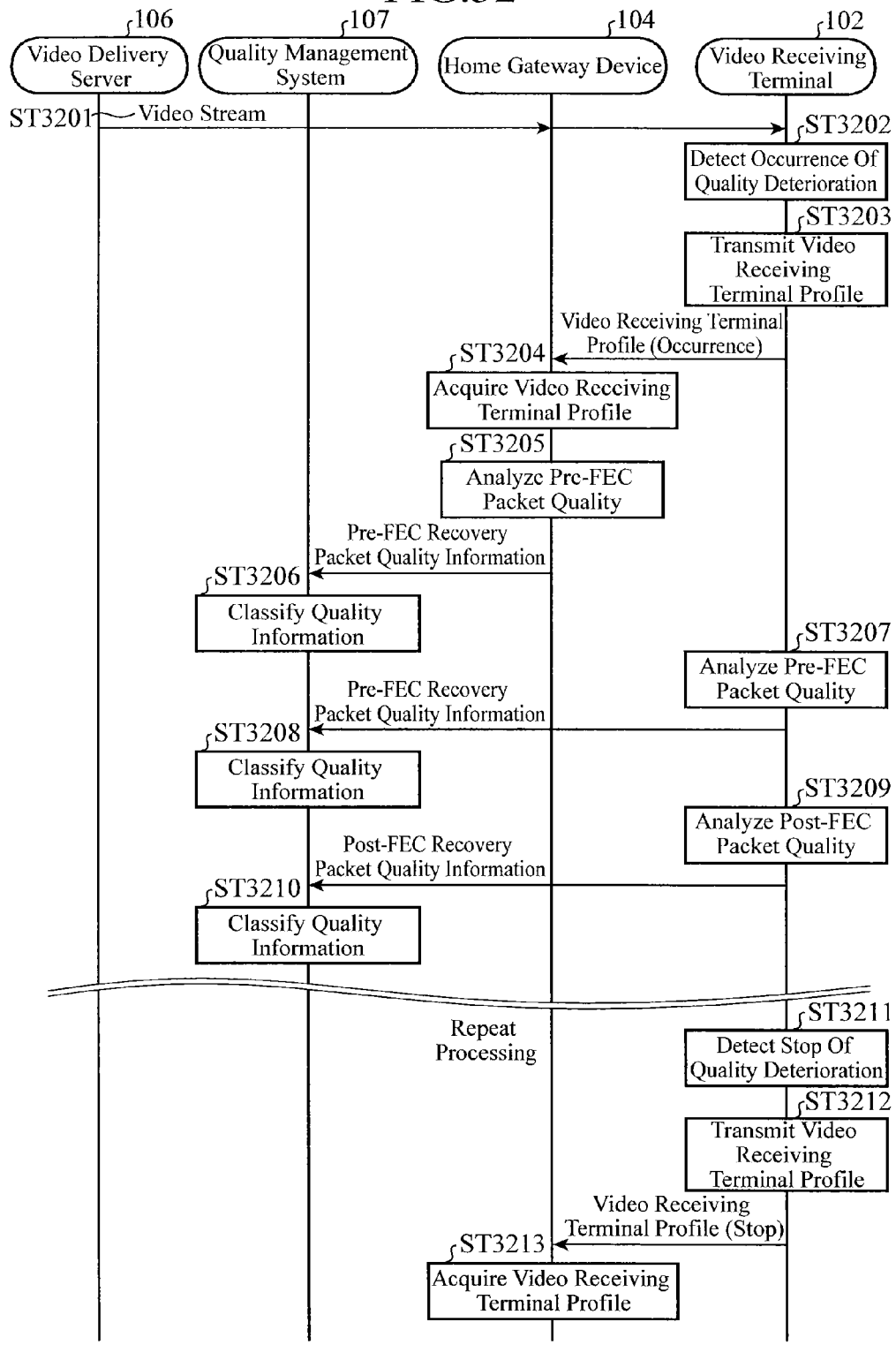
FIG. 32 is a sequence diagram showing the operation of a quality deterioration isolation system in accordance with Embodiment 3 of the present invention.

FIG. 32 is a sequence diagram showing the operation of the quality deterioration isolation system. A video delivery server 106 delivers a video to an external network 105 (step ST3201). A video receiving terminal 102 detects the occurrence of a quality deterioration in the video stream (step ST3202). The video receiving terminal 102 generates a video receiving terminal profile, and transmits this video receiving terminal profile to a home gateway device 104 (step ST3203). Information used for the home gateway device 104 to measure pre-FEC packet quality information and information notifying a start of the measurement of quality information are included in the video receiving terminal profile.

The home gateway device 104 catches the video stream delivered thereto, measures pre-FEC packet quality information, and transmits this pre-FEC packet quality information to a quality management system 107 (step ST3205). The quality management system 107 classifies and stores the pre-FEC packet quality information received thereby (step ST3206).

The video receiving terminal 102 catches the video stream delivered thereto which is not yet stored in a buffer and on which a recovery process using FEC is not yet carried out, and measures pre-FEC packet quality information and transmits this pre-FEC packet quality information to the quality management system 107 (step ST3207). The quality management system 107 classifies and stores the pre-FEC packet quality information received thereby (step ST3208).

The video receiving terminal 102 catches the video stream delivered thereto which is stored in the buffer and on which a recovery process using FEC is carried out, and measures post-FEC packet quality information and transmits this post-FEC packet quality information to the quality management system 107 (step ST3209). The quality management system 107 classifies and stores the post-FEC packet quality information received thereby (step ST3210).

The video receiving terminal 102 and the home gateway device 104 transmit the pieces of quality information measured thereby to the quality management system 107 at specified quality information measurement time intervals.

The video receiving terminal 102 detects a stop of a quality deterioration of the video stream (step ST3211). The video receiving terminal 102 generates a video receiving terminal profile, and transmits this video receiving terminal profile to the home gateway device 104 (step ST3212). Information notifying a stop of the measurement of quality information is included in the video receiving terminal profile.

After that, the video receiving terminal 102 and the home gateway device 104 stop their measurements of quality information.

[The Video Receiving Terminal in Accordance with Embodiment 3]

Figure 33:
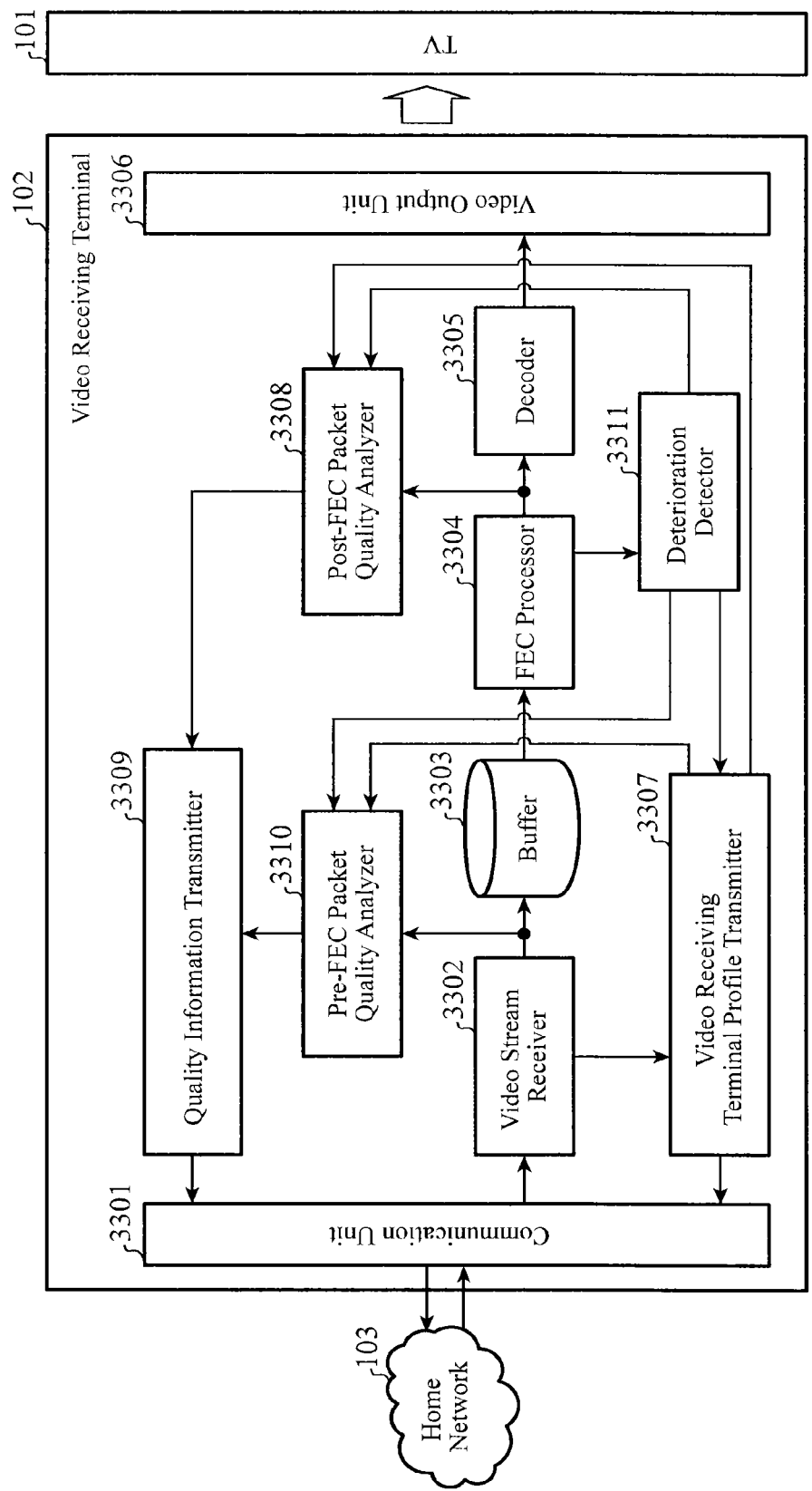
FIG. 33 is a block diagram of a video receiving terminal in accordance with Embodiment 3 of the present invention.

The structure of the video receiving terminal 102 in accordance with Embodiment 3 will be explained. FIG. 33 is a diagram showing the structure of the video receiving terminal 102. The video receiving terminal 102 in accordance with Embodiment 3 includes a deterioration detector 3311 in addition to the structural components of the video receiving terminal 102 in accordance with Embodiment 1. The basic functions of a communication unit 301, . . . , and a pre-FEC packet quality analyzer 3310 shown in FIG. 33 are the same as those of the communication unit 301, . . . , and the pre-FEC packet quality analyzer 310 shown in FIG. 3.

When there exists a lost packet which cannot not be recovered by using FEC, an FEC processor 3304 notifies the existence to the deterioration detector 3311. When receiving the notification, the deterioration detector 3311 notifies the occurrence of a quality deterioration of the video stream to the pre-FEC packet quality analyzer 3310, a post-FEC packet quality analyzer 3308, and a video receiving terminal profile transmitter 3307. When a fixed time interval or longer has elapsed after finally receiving the notification from the FEC processor 3304, the deterioration detector 3311 notifies a stop of the quality deterioration of the video stream to the pre-FEC packet quality analyzer 3310, the post-FEC packet quality analyzer 3308, and the video receiving terminal profile transmitter 3307.

In this embodiment, when there exists a lost packet which cannot be recovered by using FEC, instead of the FEC processor 3304 notifying the existence to the deterioration detector 3311, a decoder 3305 can notify a failure of decoding to the deterioration detector 3311.

The post-FEC packet quality analyzer 3308 and the pre-FEC packet quality analyzer 3310 start their quality measurements when the occurrence of a quality deterioration is notified thereto from the deterioration detector 3311, and end the quality measurements when a stop of the quality deterioration is notified thereto.

When receiving a notification from the deterioration detector 3311, the video receiving terminal profile transmitter 3307 generates a video receiving terminal profile and transmits this video receiving terminal profile to the home gateway device 104. When receiving a notification of the occurrence of a quality deterioration from the deterioration detector 3311, the video receiving terminal profile transmitter includes information used for the home gateway device 104 to measure pre-FEC packet quality information and information notifying a start of the measurement of the quality information in the video receiving terminal profile. When receiving a notification of the occurrence of a quality deterioration from the deterioration detector 3311, the video receiving terminal profile transmitter includes information notifying a stop of the measurement of the quality information in the video receiving terminal profile.

Instead of including the information notifying a start or stop of the measurement of the quality information, the home gateway device is enabled to determine a start or stop of the measurement by, for example, determining whether or not a destination address C1 is valid. As a result, the home gateway device 104 can know the time that the measurement of the pre-FEC packet quality information is started and the time that the measurement is stopped from the video receiving terminal profile.

[Advantages Provided by Embodiment 3]

As mentioned above, because the video receiving terminal in accordance with this Embodiment 3 includes the deterioration detector that detects whether a quality deterioration has occurred in the video stream, and, only when the deterioration detector detects the occurrence of a quality deterioration, generates a video receiving terminal profile, there can be provided a system that isolates the cause of a quality deterioration while saving resources including the CPU usage and the memory usage of the video receiving terminal.

Further, because in the quality deterioration isolation system in accordance with Embodiment 3, the video receiving terminal includes the deterioration detector that detects whether a quality deterioration has occurred in the video stream, and, only when the deterioration detector detects the occurrence of a quality deterioration, generates the video receiving terminal profile, the system can isolate the cause of a quality deterioration while saving resources including the CPU usages and the memory usages of the video receiving terminal, the home gateway device, and the quality management system.

Embodiment 4

In accordance with Embodiment 1 of the present invention, the video receiving terminal 102 generates a video receiving terminal profile and transmits this video receiving terminal profile to the home gateway device 104. The home gateway device 104 generates quality information by using the video receiving terminal profile. The video receiving terminal 102 and the home gateway device 104 measure quality information using the video receiving terminal profile. The quality management system 107 isolates a quality deterioration by using the quality information transmitted thereto from the video receiving terminal 102 and the home gateway device 104.

In contrast, Embodiment 4 is the same as Embodiment 1 in that a quality management system 107 isolates a quality deterioration by using quality information received from a video receiving terminal 102 and a home gateway device 104, while Embodiment 4 differs from Embodiment 1 in that the video receiving terminal 102 does not transmit a video receiving terminal profile to the home gateway device 104.

The video receiving terminal 102 and the home gateway device 104 include an NTP (Network Time Protocol) time in quality information. A quality management system 107 specifies a quality measurement section on the basis of this NTP time, and isolates a quality deterioration. The NTP time is the time that a specific packet is received, and it is assumed that the video receiving terminal 102 and the home gateway device 104 carryout time synchronization by using an NTP server connected to an external network 105.

The video receiving terminal 102 measures quality information from a video stream delivered thereto from a video delivery server 106. The NTP time is included in the quality information. Post-FEC packet quality information of the video receiving terminal 102 in accordance with Embodiment 4 and pre-FEC packet quality information of the video receiving terminal 102 are included in the quality information measured by the video receiving terminal 102.

The home gateway device 104 measures quality information from the video stream delivered thereto from the video delivery server 106. The NTP time is included in the quality information. Pre-FEC packet quality information of the home gateway device 104 in accordance with Embodiment 4 is included in the quality information measured by the home gateway device 104.

The quality management system 107 stores the quality information transmitted thereto from the video receiving terminal 102. When user identification information and a time are inputted, the quality management system 107 outputs the result of the determination of isolation of a quality deterioration of the video which the corresponding user was watching and listening at that time by using the quality information stored therein, like that in accordance with Embodiment 1.

[The Operation of a System in Accordance with Embodiment 4]

Figure 34:
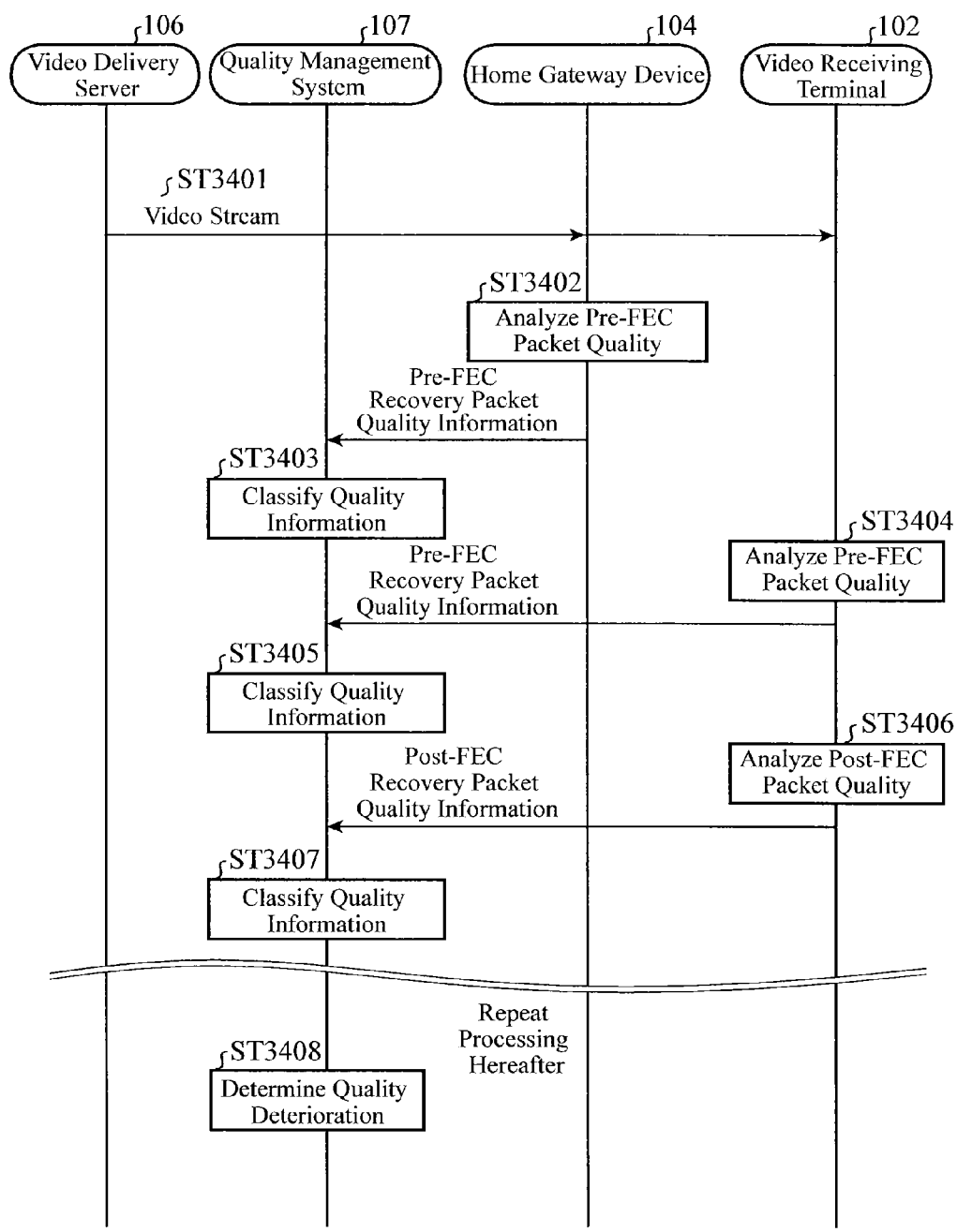
FIG. 34 is a sequence diagram showing the operation of a quality deterioration isolation system in accordance with Embodiment 4 of the present invention.

The operation of the system in accordance with Embodiment 4 of the present invention will be explained with reference to FIG. 34. FIG. 34 is a sequence diagram showing the operation of the quality deterioration isolation system. The video delivery server 106 delivers a video to the external network 105 (step ST3401). The home gateway device 104 catches the video stream delivered thereto, measures pre-FEC packet quality information, and transmits this pre-FEC packet quality information to the quality management system 107 (step ST3402). The quality management system 107 classifies and stores the pre-FEC packet quality information received thereby (step ST3403).

The video receiving terminal 102 catches the video stream delivered thereto which is not yet stored in the buffer and on which a recovery process using FEC is not yet carried out, and measures pre-FEC packet quality information and transmits this pre-FEC packet quality information to the quality management system 107 (step ST3404). The quality management system 107 classifies and stores the pre-FEC packet quality information received thereby (step ST3405).

The video receiving terminal 102 catches the video stream delivered thereto which is stored in the buffer and on which the recovery process using FEC is carried out, and measures post-FEC packet quality information and transmits this post-FEC packet quality information to the quality management system 107 (step ST3406). The quality management system 107 classifies and stores the post-FEC packet quality information received thereby (step ST3407).

After that, the video receiving terminal 102 and the home gateway device 104 transmit the pieces of quality information measured thereby to the quality management system 107 at specified quality information measurement time intervals.

When user identification information and a time are inputted, the quality management system 107 outputs the result of the determination of isolation of a quality deterioration for the video which the corresponding user was watching and listening at that time by using the quality information stored therein (step ST3408).

[The Video Receiving Terminal in Accordance with Embodiment 4]

Figure 35:
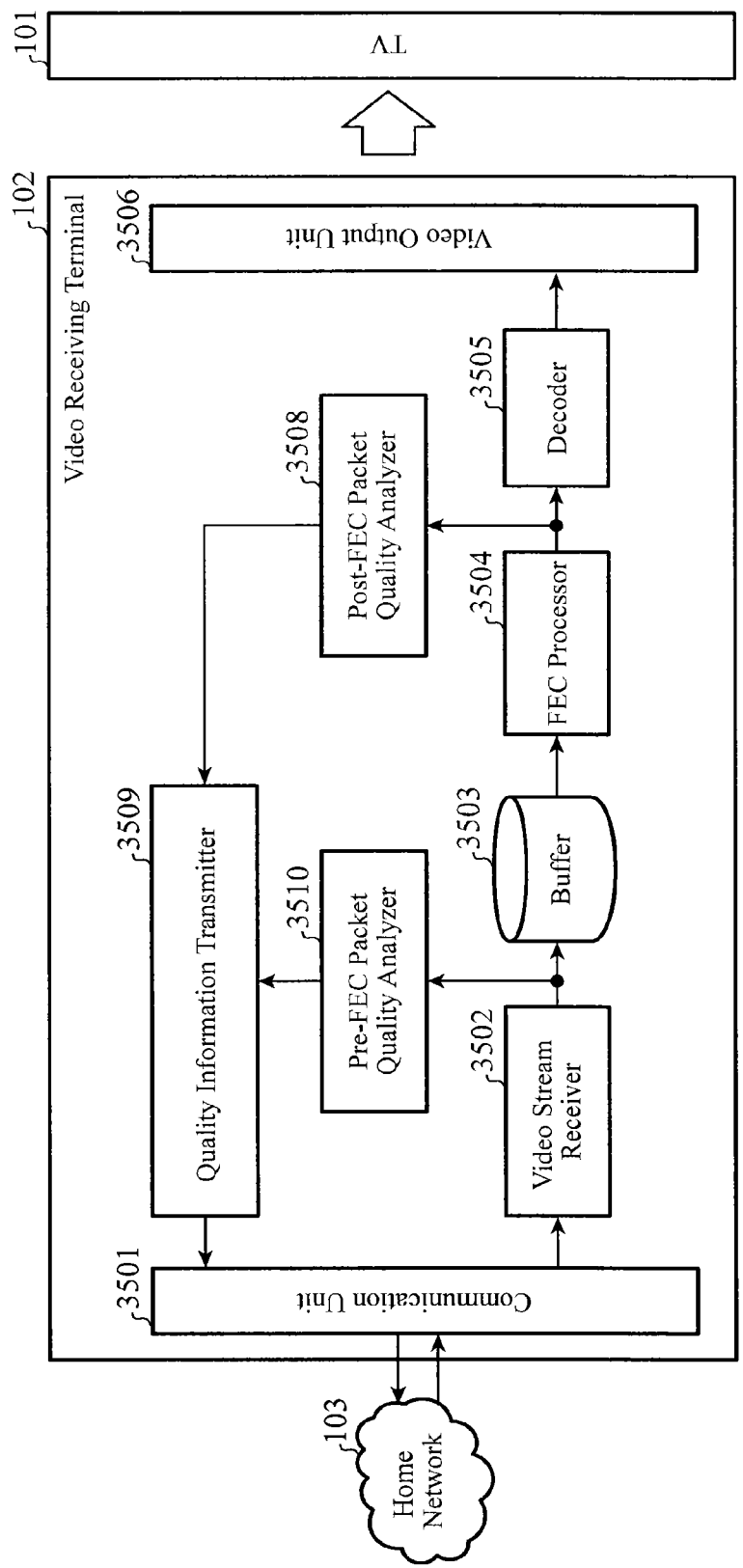
FIG. 35 is an explanatory drawing showing the structure of a video receiving terminal in accordance with Embodiment 4 of the present invention.

The structure of the video receiving terminal 102 in accordance with Embodiment 4 will be explained. FIG. 35 is a diagram showing the structure of the video receiving terminal 102. The video receiving terminal 102 in accordance with Embodiment 4 includes a communication unit 3501, a video stream receiver 3502, a buffer 3503, an FEC processor 3504, a decoder 3505, a video output unit 3506, a post-FEC packet quality analyzer 3508, a quality information transmitter 3509, and a pre-FEC packet quality analyzer 3510. More specifically, the video receiving terminal has a structure of not including the video receiving terminal profile transmitter 307 in accordance with Embodiment 1 in terms of drawings.

The communication unit 3501 receives a video stream from the home network 103, and delivers this video stream to the video stream receiver 3502. The video stream receiver 3502 stores the video stream received thereby in the buffer 3503 in order to absorb packet delay fluctuations of the received video stream. The FEC processor 3504 extracts the video stream from the buffer 3503, and, when a packet loss has occurred in the video stream, carries out a recovery process using FEC on the video stream and sends this video stream to the decoder 3505. The decoder 3505 decodes the video stream received thereby and sends the video stream decoded thereby to the video output unit 3506. The video output unit 3506 outputs the video to a TV 101 via a video input/output interface.

Next, the post-FEC packet quality information measured by the video receiving terminal 102 will be explained. The post-FEC packet quality analyzer 3508 makes a copy of the video stream which the FEC processor 3504 sends to the decoder 3505, and measures the post-FEC packet quality information.

The post-FEC packet quality analyzer 3508 then sends the post-FEC packet quality information measured thereby to the quality information transmitter 3509. The quality information transmitter 3509 transmits the post-FEC packet quality information to the quality management system 107 via the communication unit 3501.

FIG. 36 shows an example of the post-FEC packet quality information measured by the video receiving terminal 102. User identification information A6 is the one for identifying a user. Device identification information E6 is used in order to identify which one of the video receiving terminal 102 and the home gateway device 104 has measured the quality information. The quality management system 107 identifies from which one of the video receiving terminal 102 and the home gateway device 104 the quality information has been transmitted by using the device identification information E6. In the example shown in FIG. 36, the identifier of the video receiving terminal is set to the device identification information E6.

A quality information type F6 is used in order to identify whether the quality information is pre-FEC packet quality information or post-FEC packet quality information. The quality management system 107 identifies whether the quality information is pre-FEC packet quality information or post-FEC packet quality information by using the quality information type F6. In the example shown in FIG. 36, the identifier of the post-FEC packet quality information is set to the quality information type F6.

A quality information sequence number G6 is incremented by one every time when the post-FEC packet quality analyzer 308 measures the post-FEC packet quality information. The quality management system 107 sorts the pieces of post-FEC packet quality information transmitted thereto in the order in which they have been measured by using the quality information sequence number G6.

A quality value K6 is a value showing the quality of the post-FEC packet quality information. In this embodiment, the quality value K6 is the number of packet losses. The number of packet losses is the number of post-FEC packets each of which is determined to be a loss during a quality information measurement time interval. The quality management system 107 uses the quality value K6 in order to determine whether the quality of post-FEC packets has deteriorated. Therefore, in the case of using, for example, MPEG-2 or H.264 for the image compression coding of the video stream, the quality value K6 can be the number of lost video frames or the like. Further, an only one value does not have to be provided as the quality value K6, and a plurality of values can be alternatively provided as quality values.

An NTP time L6 at the time of receiving a first packet is the one when receiving a post-FEC packet for the first time during a quality information measurement time interval. The quality management system 107 specifies a quality measurement section by using the NTP time L6 at the time of receiving a first packet. An NTP time M6 at the time of receiving a final packet is the one when finally receiving a post-FEC packet during the quality information measurement time interval. The quality management system 107 specifies a quality measurement section by using the NTP time M6 at the time of receiving a final packet.

An NTP time N6 at the time of receiving a specific packet is the one when receiving a specific post-FEC packet during the quality information measurement time interval. For example, the specific packet is a packet whose RTP sequence number is a specific number, such as an integral multiple of 10,000, which can be identified in the video stream. The quality management system 107 determines how much fixed delay has occurred at the time of the reception by using the NTP time N6 at the time of receiving a specific packet.

A specific packet identification value O6 is an identification value of the specific packet. For example, the specific packet identification value is the RTP sequence number of the specific packet. The quality management system 107 determines how much fixed delay has occurred at the time of the reception by using the specific packet identification value O6.

Figure 37:
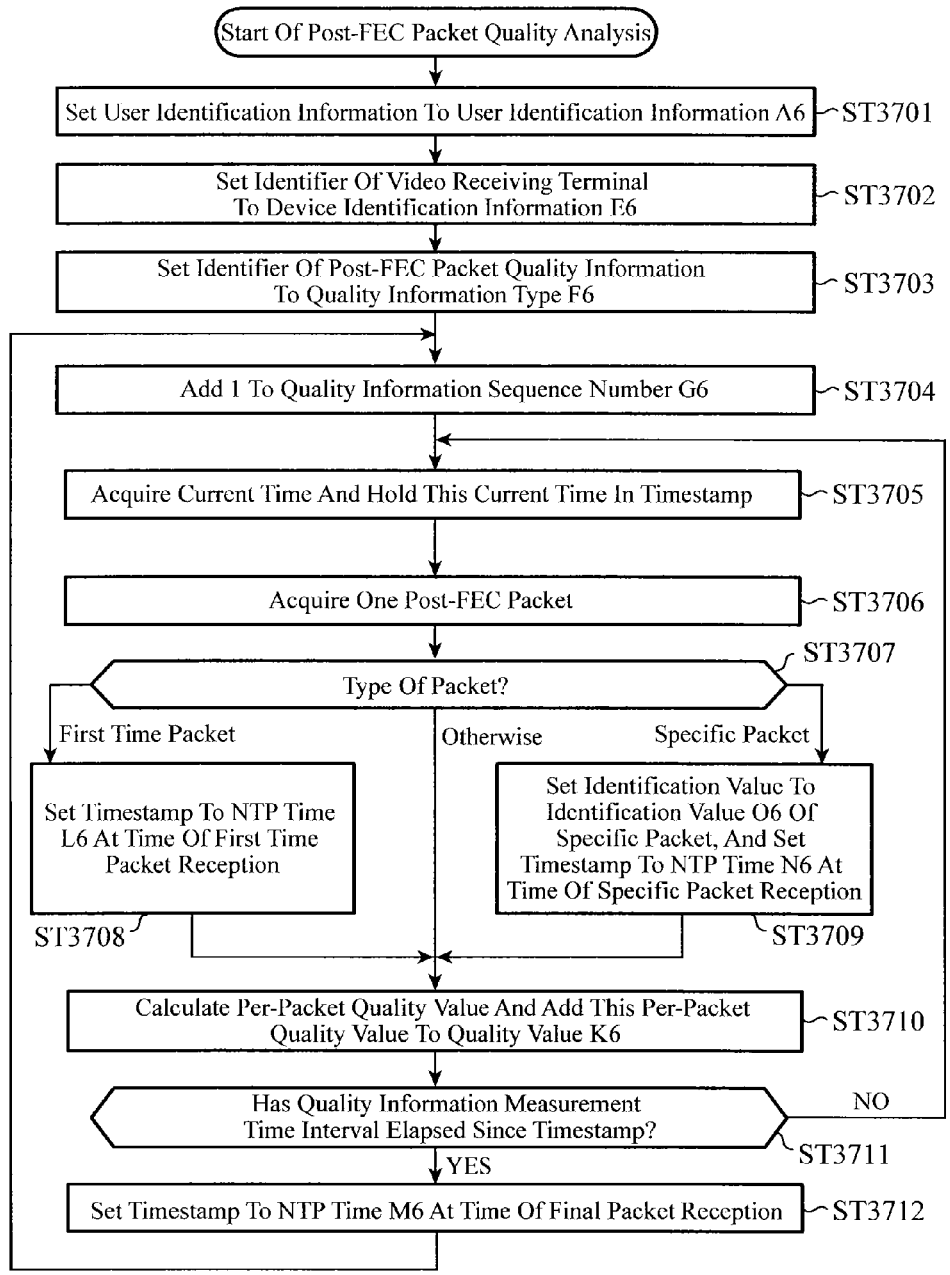
FIG. 37 is a flow chart a series of processes of measuring the post-FEC packet quality information which is carried out by a post-FEC packet quality analyzer disposed in the video receiving terminal in accordance with Embodiment 4 of the present invention.

FIG. 37 is a flow chart a series of processes of measuring the post-FEC packet quality information which is carried out by the post-FEC packet quality analyzer 308. First, the post-FEC packet quality analyzer sets the user's identification information to the user identification information A6 (step ST3701). The post-FEC packet quality analyzer sets the identifier of the video receiving terminal to the device identification information E6 (step ST3702). The post-FEC packet quality analyzer sets the identifier of the post-FEC packet quality information to the quality information type F6 (step ST3703).

The post-FEC packet quality analyzer adds 1 to the quality information sequence number G6 (step ST3704). The post-FEC packet quality analyzer acquires the current time and holds this current time in the timestamp (step ST3705). The post-FEC packet quality analyzer acquires one post-FEC packet (step ST3706). The post-FEC packet quality analyzer checks the type of the post-FEC packet acquired in step ST3706. When the result of the check shows that the packet is the one which is received for the first time during the quality information measurement time interval, the post-FEC packet quality analyzer advances to step ST3708 (when receiving the first time packet in step ST3707). In contrast, when the result of the check shows that the packet is a specific packet, the post-FEC packet quality analyzer advances to step ST3709 (when receiving a specific packet in step ST3707). Otherwise, the post-FEC packet quality analyzer advances to step ST3710 (otherwise in step ST3707).

The post-FEC packet quality analyzer, in step ST3708, sets the timestamp which the post-FEC packet quality analyzer holds in step ST3705 to the NTP time L6 at the time of receiving a first packet. The post-FEC packet quality analyzer, in step ST3709, sets the timestamp which the post-FEC packet quality analyzer holds in step ST3705 to the NTP time N6 at the time of receiving a specific packet. The post-FEC packet quality analyzer also sets the value for identifying the specific packet to the specific packet identification value O6.

Next, the post-FEC packet quality analyzer calculates a per-packet quality value of the post-FEC packet, and adds this per-packet quality value to the quality value K6 (step ST3710). The post-FEC packet quality analyzer checks whether a quality information measurement time interval has elapsed since the timestamp held in step ST3705. When the result of the check shows that a quality information measurement time interval has elapsed since the timestamp, the post-FEC packet quality analyzer advances to step ST3712 (when Yes in step ST3711). In contrast, when a quality information measurement time interval has not elapsed since the timestamp, the post-FEC packet quality analyzer advances to step ST3705 (when No in step ST3711). The post-FEC packet quality analyzer, in step ST3712, sets the timestamp which the post-FEC packet quality analyzer holds in step ST3705 to the NTP time M6 at the time of receiving a final packet, and advances to step ST3704.

Next, the pre-FEC packet quality information measured by the video receiving terminal 102 will be explained. The pre-FEC packet quality analyzer 3510 makes a copy of the video stream which is not yet stored in the buffer 303 by the video stream receiver 302, and measures the pre-FEC packet quality information.

The pre-FEC packet quality analyzer 3510 sends the pre-FEC packet quality information measured thereby to the quality information transmitter 3509. The quality information transmitter 3509 transmits the pre-FEC packet quality information to the quality management system 107 via the communication unit 3501.

FIG. 38 shows an example of the pre-FEC packet quality information measured by the video receiving terminal 102. User identification information A8 is the one for identifying the user. Device identification information E7 is used in order to identify which one of the video receiving terminal 102 and the home gateway device 104 has measured the quality information. The quality management system 107 identifies from which one of the video receiving terminal 102 and the home gateway device 104 the quality information has been transmitted by using the device identification information E7. In the example shown in FIG. 38, the identifier of the video receiving terminal is set to the device identification information E7.

A quality information type F7 is used in order to identify whether the quality information is pre-FEC packet quality information or post-FEC packet quality information. The quality management system 107 identifies whether the quality information is pre-FEC packet quality information or post-FEC packet quality information by using the quality information type F7. In the example of FIG. 38, the identifier of the pre-FEC packet quality information is set to the quality information type F7.

A quality information sequence number G7 is incremented by one every time when the pre-FEC packet quality analyzer 310 measures the pre-FEC packet quality information. The quality management system 107 sorts the pieces of pre-FEC packet quality information transmitted thereto in the order in which they have been measured by using the quality information sequence number G7.

A quality value K7 is a value showing the quality of the pre-FEC packet quality information. In this embodiment, the quality value K7 is the number of packet losses. The number of packet losses is the number of pre-FEC packets each of which is determined to be a loss during a quality information measurement time interval. The quality management system 107 uses the quality value K7 in order to determine whether the quality of pre-FEC packets has deteriorated. Therefore, in the case of using, for example, MPEG-2 or H.264 for the image compression coding of the video stream, the quality value K7 can be the number of lost video frames or the like. Further, an only one value does not have to be provided as the quality value K7, and a plurality of values can be alternatively provided as quality values.

An NTP time L7 at the time of receiving a first packet is the one when receiving a pre-FEC packet for the first time during a quality information measurement time interval. The quality management system 107 specifies a quality measurement section by using the NTP time L7 at the time of receiving a first packet. An NTP time M7 at the time of receiving a final packet is the one when finally receiving a pre-FEC packet during the quality information measurement time interval. The quality management system 107 specifies a quality measurement section by using the NTP time M7 at the time of receiving a final packet.

An NTP time N7 at the time of receiving a specific packet is the one when receiving a specific pre-FEC packet during the quality information measurement time interval. For example, the specific packet is a packet whose RTP sequence number is a specific number, such as an integral multiple of 10,000, which can be identified in the video stream. The quality management system 107 determines how much fixed delay has occurred at the time of the reception by using the NTP time N7 at the time of receiving a specific packet.

A specific packet identification value O7 is an identification value of the specific packet. For example, the specific packet identification value is the RTP sequence number of the specific packet. The quality management system 107 determines how much fixed delay has occurred at the time of the reception by using the specific packet identification value O7.

Figure 39:
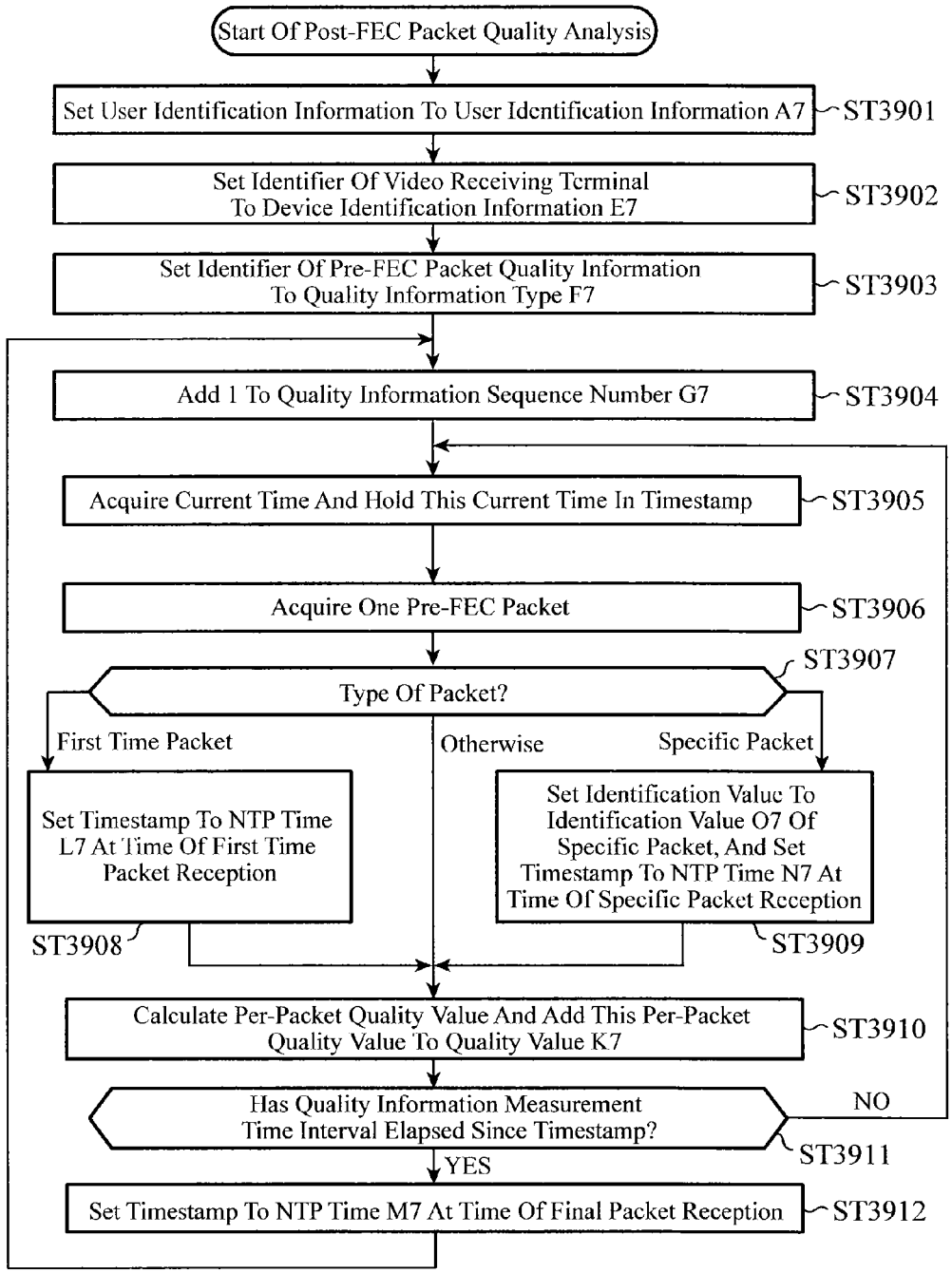
FIG. 39 is a flow chart a series of processes of measuring the pre-FEC packet quality information which is carried out by a pre-FEC packet quality analyzer disposed in the video receiving terminal in accordance with Embodiment 4 of the present invention.

FIG. 39 is a flow chart a series of processes of measuring the pre-FEC packet quality information which is carried out by the pre-FEC packet quality analyzer 3510. First, the pre-FEC packet quality analyzer sets the user's identification information to the user identification information A7 (step ST3901). The pre-FEC packet quality analyzer sets the identifier of the video receiving terminal to the device identification information E7 (step ST3902). The pre-FEC packet quality analyzer sets the identifier of the pre-FEC packet quality information to the quality information type F7 (step ST3903). The pre-FEC packet quality analyzer adds 1 to the quality information sequence number G7 (step ST3904). The pre-FEC packet quality analyzer acquires the current time and holds this current time in the timestamp (step ST3905). The pre-FEC packet quality analyzer acquires one pre-FEC packet (step ST3906). The pre-FEC packet quality analyzer checks the type of the pre-FEC packet acquired in step ST3906. When the result of the check shows that the packet is the one which is received for the first time during the quality information measurement time interval, the pre-FEC packet quality analyzer advances to step ST3908 (when receiving the first time packet in step ST3907). In contrast, when the result of the check shows that the packet is a specific packet, the pre-FEC packet quality analyzer advances to step ST3909 (when receiving a specific packet in step ST3907). Otherwise, the pre-FEC packet quality analyzer advances to step ST3910 (otherwise in step ST3907).

The pre-FEC packet quality analyzer, in step ST3908, sets the timestamp which the pre-FEC packet quality analyzer holds in step ST3905 to the NTP time L7 at the time of receiving a first packet. The pre-FEC packet quality analyzer, in step ST3909, sets the timestamp which the pre-FEC packet quality analyzer holds in step ST3905 to the NTP time N7 at the time of receiving a specific packet. The pre-FEC packet quality analyzer also sets the value for identifying the specific packet to the specific packet identification value O7. Next, the pre-FEC packet quality analyzer calculates a per-packet quality value of the pre-FEC packet, and adds this per-packet quality value to the quality value K7 (step ST3910).

The pre-FEC packet quality analyzer checks whether a quality information measurement time interval has elapsed since the timestamp held in step ST3905. When the result of the check shows that a quality information measurement time interval has elapsed since the timestamp, the pre-FEC packet quality analyzer advances to step ST3912 (when Yes in step ST3911). In contrast, when a quality information measurement time interval has not elapsed since the timestamp, the pre-FEC packet quality analyzer advances to step ST3905 (when No in step ST3911). The pre-FEC packet quality analyzer, in step ST3912, sets the timestamp which the pre-FEC packet quality analyzer holds in step ST3905 to the NTP time M7 at the time of receiving a final packet, and advances to step ST3904.

[The Home Gateway Device in Accordance with Embodiment 4]

Figure 40:
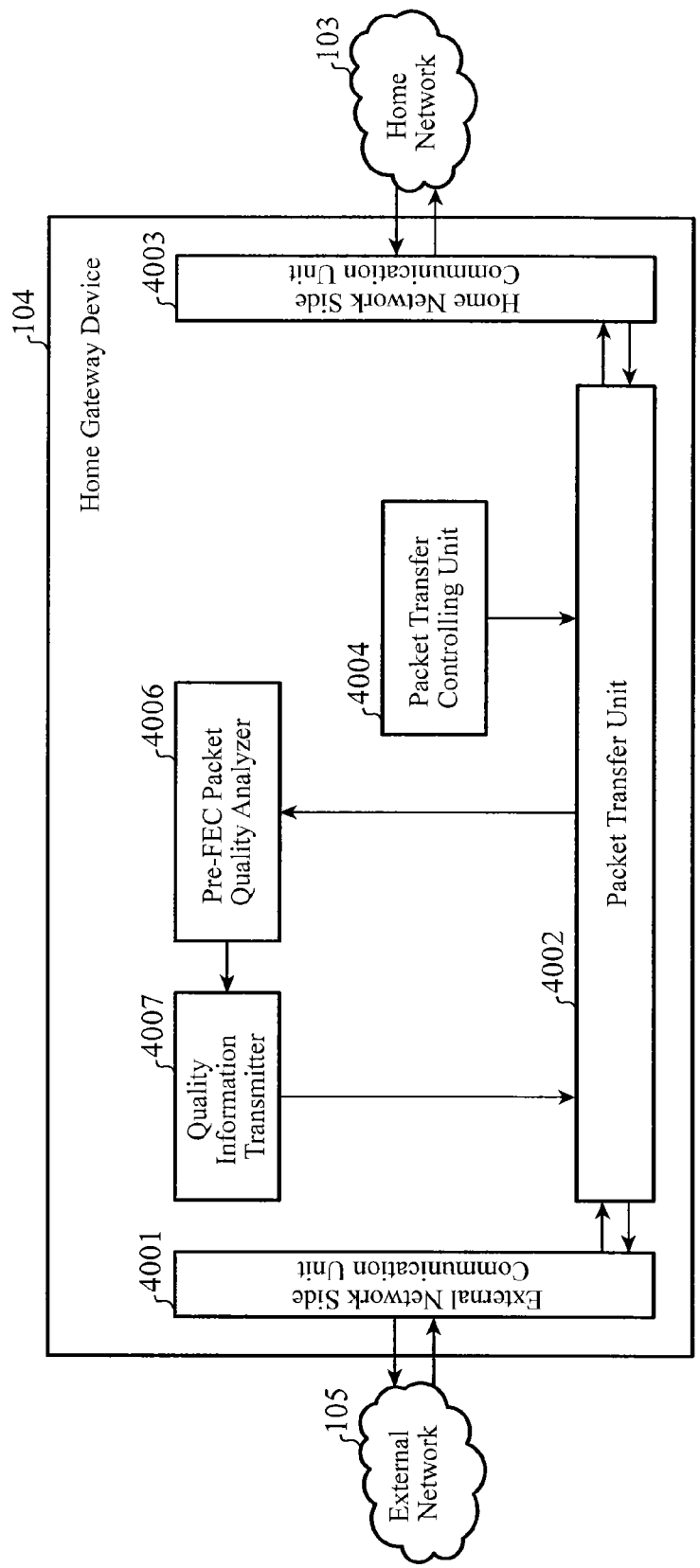
FIG. 40 is an explanatory drawing showing the structure of a home gateway device in accordance with Embodiment 4 of the present invention.

Next, the structure of the home gateway device 104 in accordance with Embodiment 4 will be explained. FIG. 40 is a diagram showing the structure of the home gateway device 104. The home gateway device 104 in accordance with Embodiment 4 includes an external network side communication unit 4001, a packet transfer unit 4002, a home network side communication unit 4003, a packet transfer controlling unit 4004, a pre-FEC packet quality analyzer 4006, and a quality information transmitter 4007. More specifically, the home gateway device has a structure of not including the video receiving terminal profile acquiring unit 1105 in accordance with Embodiment 1 in terms of drawings.

The external network side communication unit 4001 receives a video stream which the video delivery server 106 delivers via the external network 105. The external network side communication unit 4001 sends the video stream received thereby to the packet transfer unit 4002. The packet transfer unit 4002 transfers the video stream to the home network side communication unit 4003. The home network side communication unit 4003 transmits the video stream received thereby to the video receiving terminal 102 via the home network 103.

Next, the pre-FEC packet quality information measured by the home gateway device 104 will be explained. The pre-FEC packet quality analyzer 4006 measures the pre-FEC packet quality information from the video stream received from the packet transfer unit 4002.

The pre-FEC packet quality analyzer 4006 sends the pre-FEC packet quality information measured thereby to the quality information transmitter 4007. The quality information transmitter 4007 transmits the pre-FEC packet quality information to the quality management system 107 via the packet transfer unit 4002 and the external network side communication unit 4001.

FIG. 41 is an example of the pre-FEC packet quality information measured by the home gateway device 104. User identification information A8 is the information for identifying the user. Device identification information E8 is used in order to identify which one of the video receiving terminal 102 and the home gateway device 104 has measured the quality information. The quality management system 107 identifies from which one of the video receiving terminal 102 and the home gateway device 104 the quality information has been transmitted by using the device identification information E8. In the example shown in FIG. 41, the identifier of the home gateway device is set to the device identification information E8.

A quality information type F8 is used in order to identify whether the quality information is pre-FEC packet quality information or post-FEC packet quality information. The quality management system 107 identifies whether the quality information is pre-FEC packet quality information or post-FEC packet quality information by using the quality information type F8. In the example shown in FIG. 41, the identifier of the pre-FEC packet quality information is set to the quality information type F8.

A quality information sequence number G8 is incremented by one every time when the pre-FEC packet quality analyzer 4006 measures the pre-FEC packet quality information. The quality management system 107 sorts the pieces of pre-FEC packet quality information transmitted thereto in the order in which they have been measured by using the quality information sequence number G8.

A quality value K8 is a value showing the quality of the pre-FEC packet quality information. In this embodiment, the quality value K8 is the number of packet losses. The number of packet losses is the number of pre-FEC packets each of which is determined to be a loss during a quality information measurement time interval. The quality management system 107 uses the quality value K8 in order to determine whether the quality of pre-FEC packets has deteriorated. Therefore, in the case of using, for example, MPEG-2 or H.264 for the image compression coding of the video stream, the quality value K8 can be the number of lost video frames or the like. Further, an only one value does not have to be provided as the quality value K8, and a plurality of values can be alternatively provided as quality values.

An NTP time L8 at the time of receiving a first packet is the one when receiving a pre-FEC packet for the first time during a quality information measurement time interval. The quality management system 107 specifies a quality measurement section by using the NTP time L8 at the time of receiving a first packet. An NTP time M8 at the time of receiving a final packet is the one when finally receiving a pre-FEC packet during the quality information measurement time interval. The quality management system 107 specifies a quality measurement section by using the NTP time M8 at the time of receiving a final packet.

An NTP time N8 at the time of receiving a specific packet is the one when receiving a specific pre-FEC packet during the quality information measurement time interval. For example, the specific packet is a packet whose RTP sequence number is a specific number, such as an integral multiple of 10,000, which can be identified in the video stream. The quality management system 107 determines how much fixed delay has occurred at the time of the reception by using the NTP time N8 at the time of receiving a specific packet.

A specific packet identification value O8 is an identification value of the specific packet. For example, the specific packet identification value is the RTP sequence number of the specific packet. The quality management system 107 determines how much fixed delay has occurred at the time of the reception by using the specific packet identification value O8.

Figure 42:
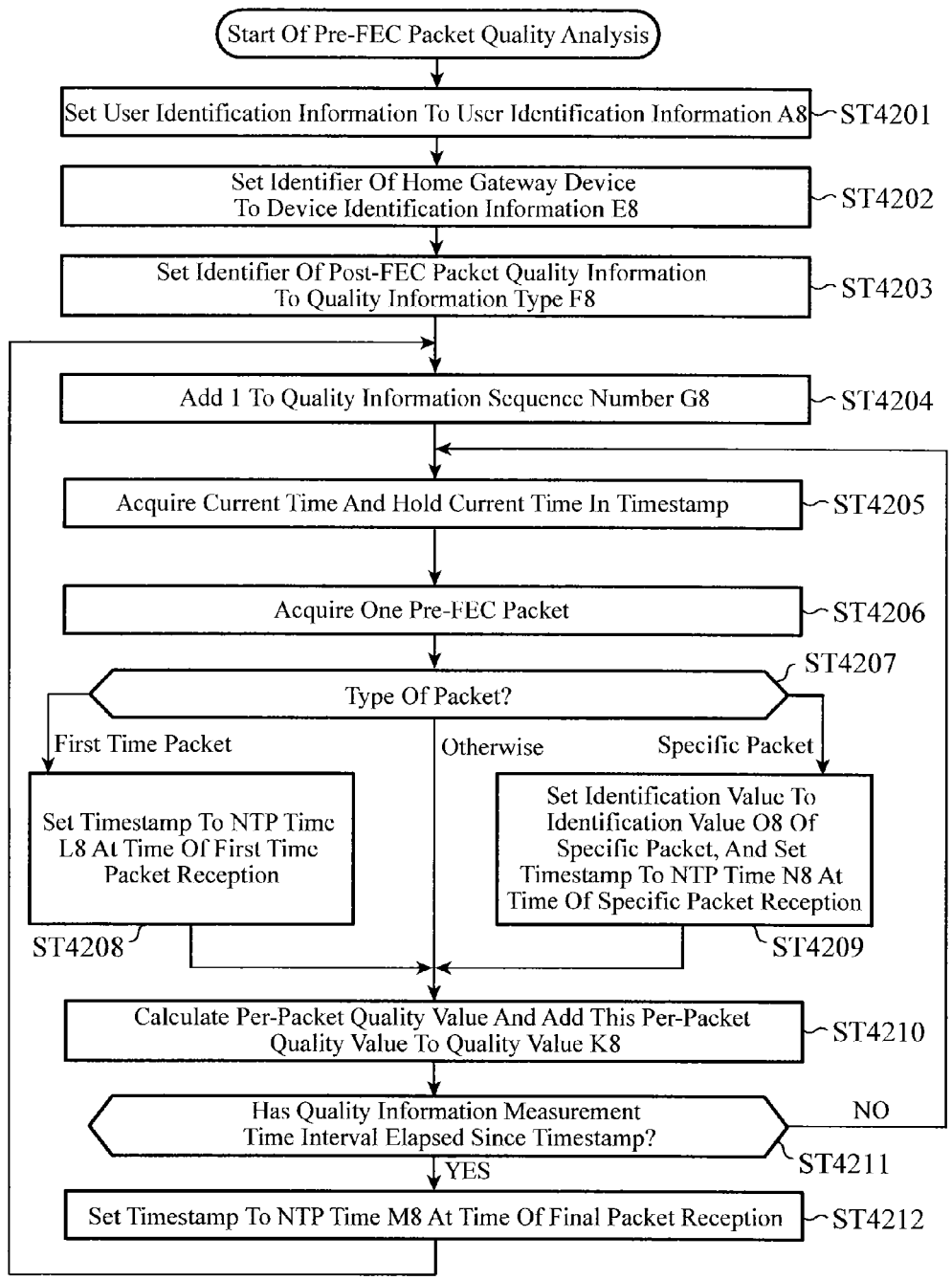
FIG. 42 is a flow chart a series of processes of measuring the pre-FEC packet quality information which is carried out by a pre-FEC packet quality analyzer disposed in the home gateway device in accordance with Embodiment 4 of the present invention.

FIG. 42 is a flow chart a series of processes of measuring the pre-FEC packet quality information which is carried out by the pre-FEC packet quality analyzer 4006. First, the pre-FEC packet quality analyzer sets the user's identification information to the user identification information A8 (step ST4201). The pre-FEC packet quality analyzer sets the identifier of the home gateway device to the device identification information E8 (step ST4202). The pre-FEC packet quality analyzer sets the identifier of the pre-FEC packet quality information to the quality information type F8 (step ST4203).

The pre-FEC packet quality analyzer adds 1 to the quality information sequence number G8 (step ST4204). The pre-FEC packet quality analyzer acquires the current time and holds this current time in the timestamp (step ST4205). The pre-FEC packet quality analyzer acquires one pre-FEC packet (step ST4206). The pre-FEC packet quality analyzer checks the type of the pre-FEC packet acquired in step ST4206. When the result of the check shows that the packet is the one which is received for the first time during the quality information measurement time interval, the pre-FEC packet quality analyzer advances to step ST4208 (when receiving the first time packet in step ST4207). In contrast, when the result of the check shows that the packet is a specific packet, the pre-FEC packet quality analyzer advances to step ST4209 (when receiving a specific packet in step ST4207). Otherwise, the pre-FEC packet quality analyzer advances to step ST4210 (otherwise in step ST4207).

The pre-FEC packet quality analyzer, in step ST4208, sets the timestamp which the pre-FEC packet quality analyzer holds in step ST4205 to the NTP time L8 at the time of receiving a first packet. The pre-FEC packet quality analyzer, in step ST4209, sets the timestamp which the pre-FEC packet quality analyzer holds in step ST4205 to the NTP time N8 at the time of receiving a specific packet. The pre-FEC packet quality analyzer also sets the value for identifying the specific packet to the specific packet identification value O8.

Next, the pre-FEC packet quality analyzer calculates a per-packet quality value of the pre-FEC packet, and adds this per-packet quality value to the quality value K8 (step ST4210).

The pre-FEC packet quality analyzer checks whether a quality information measurement time interval has elapsed since the timestamp held in step ST4205. When the result of the check shows that a quality information measurement time interval has elapsed since the timestamp, the pre-FEC packet quality analyzer advances to step ST4212 (when Yes in step ST4211). In contrast, when a quality information measurement time interval has not elapsed since the timestamp, the pre-FEC packet quality analyzer advances to step ST4205 (when No in step ST4211). The pre-FEC packet quality analyzer, in step ST4212, sets the timestamp which the pre-FEC packet quality analyzer holds in step ST4205 to the NTP time M8 at the time of receiving a final packet, and advances to step ST4204.

[The Quality Management System in Accordance with Embodiment 4]

Next, the structure of the quality management system 107 in accordance with Embodiment 4 will be explained. Because the quality management system has the same structure as that in accordance with Embodiment 1 shown in FIG. 14 in terms of drawings, the quality management system will be explained by using the structure shown in FIG. 14. A communication unit 1401 receives the quality information transmitted by the video receiving terminal 102 from the external network 105. The communication unit 1401 sends the quality information to a quality information classifier 1402. The quality information classifier 1402 classifies the quality information received thereby, and stores the quality information in a quality information database 1403. Embodiment 4 differs from Embodiment 1 in a process of a quality information acquiring unit 1405 acquiring the quality information from the quality information database 1403.

FIG. 43 is a flow chart showing a series of processes of acquiring the quality information from the quality information database 1403 which is carried out by the quality information acquiring unit 1405. The quality information acquiring unit receives user identification information and a deterioration determination time from an input unit 1404 (step ST4301). The quality information acquiring unit compares the user identification information received from the input unit 1404 with the pieces of user identification information stored in the quality information database 1403 (step ST4302). As a result, the quality information acquiring unit specifies the user of the quality information which the quality information acquiring unit acquires from the quality information database 1403.

The quality information acquiring unit calculates a fixed delay X between the post-FEC packet of the video receiving terminal 102 and the pre-FEC packet of the video receiving terminal 102 by using the NTP time N6 at the time of receiving a specific packet included in the post-FEC packet quality information of the video receiving terminal 102, and the NTP time N7 at the time of receiving a specific packet included in the pre-FEC packet quality information of the video receiving terminal 102 (step ST4303). The difference in the NTP time at the time of receiving a specific packet between the post-FEC packet quality information of the video receiving terminal 102 and the pre-FEC packet quality information of the video receiving terminal 102, the identification value O6 of the specific packet included in the post-FEC packet quality information matching the identification value O7 included in the pre-FEC packet quality information, is the fixed delay X. As an alternative, the average of the differences in the NTP time at the times of reception of plural specific packets can be provided as the fixed delay X.

The quality information acquiring unit calculates a fixed delay Y between the post-FEC packet of the video receiving terminal 102 and the pre-FEC packet of the home gateway device 104 by using the NTP time N6 at the time of receiving a specific packet included in the post-FEC packet quality information of the video receiving terminal 102, and the NTP time N8 at the time of receiving a specific packet included in the pre-FEC packet quality information of the home gateway device 104 (step ST4304). The difference in the NTP time at the time of receiving a specific packet between the post-FEC packet quality information of the video receiving terminal 102 and the pre-FEC packet quality information of the home gateway device 104, the identification value O6 of the specific packet included in the post-FEC packet quality information matching the identification value O8 included in the pre-FEC packet quality information, is the fixed delay Y. As an alternative, the average of the differences in the NTP time at the times of reception of plural specific packets can be provided as the fixed delay Y.

The quality information acquiring unit compares the deterioration determination time received from the input unit 1404 with the NTP time L6 at the time of receiving a first packet included in the post-FEC packet quality information of the video receiving terminal 102 and the NTP time M6 at the time of receiving a final packet, and specifies post-FEC packet quality information P2 of the video receiving terminal which is the nearest to the deterioration determination time (step ST4305).

The quality information acquiring unit compares the sum of the deterioration determination time received from the input unit 1404 and the fixed delay X calculated in step ST4303 with the NTP time L7 at the time of receiving a first packet and the NTP time M7 at the time of receiving a final packet, which are included in the pre-FEC packet quality information of the video receiving terminal 102, and specifies pre-FEC packet quality information Q2 of the video receiving terminal which is the nearest to the deterioration determination time (step ST4306).

The quality information acquiring unit compares the sum of the deterioration determination time received from the input unit 1404 and the fixed delay Y calculated in step ST4304 with the NTP time L8 at the time of receiving a first packet and the NTP time M8 at the time of receiving a final packet, which are included in the pre-FEC packet quality information of the home gateway device 104, and specifies pre-FEC packet quality information R2 of the home gateway device 104 which is the nearest to the deterioration determination time (step ST4307).

The quality information acquiring unit sends the post-FEC packet quality information P2 of the video receiving terminal 102, the pre-FEC packet quality information Q2 of the video receiving terminal 102, and the pre-FEC packet quality information R2 of the home gateway device 104 to a quality deterioration determinator 1406 (step ST4308).

[Advantages Provided by Embodiment 4]

As mentioned above, because the video receiving terminal in accordance with this Embodiment 4, which is connected to a best-effort network and uses a service of carrying out video communications in real time, includes the pre-FEC packet quality analyzer that measures quality information from a video stream which is not yet stored in the buffer used for absorbing packet delay fluctuations in the video stream and on which a recovery process using FEC is not yet carried out, and also adds information generated from the time at the time when receiving a packet to the quality information in order to determine in which section in the video stream the quality information has been measured, and the quality information transmitter that transmits the quality information, a system that isolates the cause of a quality deterioration with a high degree of precision by taking into consideration a recovery process using FEC and so on can be provided.

Further, because the video receiving terminal in accordance with this Embodiment 4, which is connected to a best-effort network and uses a service of carrying out video communications in real time, includes the post-FEC packet quality analyzer that measures quality information from a video stream which is stored in the buffer used for absorbing packet delay fluctuations in the video stream and on which the recovery process using FEC is carried out, and also adds information generated from the time at the time when receiving a packet to the quality information in order to determine in which section in the video stream the quality information has been measured, and the quality information transmitter that transmits the quality information, a system that isolates the cause of a quality deterioration with a high degree of precision by taking into consideration a recovery process using FEC and so on can be provided.

In addition, because the home gateway device in accordance with Embodiment 4, which is connected to a best-effort network and uses a service of carrying out video communications in real time, includes the pre-FEC packet quality analyzer that measures the quality information of a packet to be transferred, and also adds information generated from the time at the time when receiving a packet to the quality information in order to determine in which section in the video stream the quality information has been measured, and the quality information transmitter that transmits the quality information measured by the pre-FEC packet quality analyzer, the cause of a quality deterioration can be isolated with a high degree of precision.

Further, because the quality management system in accordance with Embodiment 4, which is connected to a best-effort network and uses a service of carrying out video communications in real time, includes the quality information classifier that, on the basis of information generated from the time at the time of receiving a packet, the time being added to the quality information received from at least either one of the video receiving terminal that receives the video stream and the home gateway device that transfers the video stream, classifies the quality information of the video stream and stores the quality information in the quality information database, the quality information acquiring unit that acquires the quality information from the quality information database, and the quality deterioration determinator that isolates a quality deterioration on the basis of the acquired quality information, the cause of a quality deterioration can be isolated with a high degree of precision.

In addition, because the quality deterioration isolation system in accordance with Embodiment 4 generates quality information without using the video receiving terminal profile which is generated as shown in Embodiment 1, and therefore does not require communications between the video receiving terminal 102 and the home gateway device 104, the system can easily isolate the cause of a quality deterioration.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, the video receiving terminal, the home gateway device, the quality management system, and the quality deterioration isolation system in accordance with the present invention relate to a system that isolates the cause of a quality deterioration in consideration of a recovery process using FEC, and are suitable for use in a system that carries out video delivery on an IP network.

EXPLANATIONS OF REFERENCE NUMERALS

101 TV, 102 video receiving terminal, 103 home network, 104 home gateway device, 105 external network, 106 video delivery server, 107 quality management system, 301, 2201, 3301, and 3501 communication unit, 302, 2202, 3302, and 3502 video stream receiver, 303, 2203, 3303, and 3503 buffer, 304, 2204, 3304, and 3504 FEC processor, 305, 2205, 3305, and 3505 decoder, 306, 2206, 3306, and 3506 video output unit, 307, 2207, and 3307 video receiving terminal profile transmitter, 308, 3308 and 3508 post-FEC packet quality analyzer, 309, 2209, 3309, and 3509 quality information transmitter, 310, 3310, and 3510 pre-FEC packet quality analyzer, 1101, 2901, and 4001 external network side communication unit, 1102, 2902, and 4002 packet transfer unit 1103, 2903, and 4003 home network side communication unit, 1104, 2904, and 4004 packet transfer controlling unit, 1105 and 2905 video receiving terminal profile acquiring unit, 1106 and 4006 pre-FEC packet quality analyzer, 1107 and 4007 quality information transmitter, 1401 communication unit, 1402 quality information classifier, 1403 quality information database, 1404 input unit, 1405 quality information acquiring unit, 1406 quality deterioration determinator, 1407 output unit, 2208 quality analyzer, 2906 dummy packet transmitter.

The invention claimed is:

1. A video receiving terminal connected to a best-effort network and using a service of carrying out video communications in real time, said video receiving terminal comprising:
   a pre-FEC packet quality analyzer that measures quality information from a video stream which is not yet stored in a buffer used for absorbing packet delay fluctuations in a video stream and on which a recovery process using FEC is not yet carried out;
   a post-FEC packet quality analyzer that measures quality information from a video stream which is stored in said buffer and on which the recovery process using FEC is carried out;
   a quality information transmitter that transmits pieces of measured quality information; and
   a video receiving terminal profile transmitter that generates a video receiving terminal profile including at least information showing a size of said buffer, and transmits the video receiving terminal profile.

2. The video receiving terminal according to claim 1, wherein the pre-FEC packet quality analyzer calculates a quality value of the video stream and also calculates an identification value for determining in which section of the video stream the quality information has been measured by using a sequence number included in a packet, and includes both said quality value and a result of said calculation as said quality information.

3. The video receiving terminal according to claim 1, wherein the post-FEC packet quality analyzer calculates an identification value for determining in which section of the video stream the quality information has been measured by using a sequence number included in a packet, and includes a result of said calculation in said quality information.

4. The video receiving terminal according to claim 1, wherein the pre-FEC packet quality analyzer determines whether or not a packet is discarded virtually from the buffer by using a size of said buffer and determines a packet loss, and includes a result of this determination in the quality information.

5. The video receiving terminal according to claim 1, wherein said video receiving terminal includes a deterioration detector that detects whether a quality deterioration has occurred in the video stream, and, only when said deterioration detector detects occurrence of a quality deterioration, generates the video receiving terminal profile.

6. A home gateway device connected to a best-effort network and using a service of carrying out video communications in real time, said home gateway device comprising:
   a video receiving terminal acquiring unit that acquires a video receiving terminal profile of a video receiving terminal that receives a video stream delivered via said home gateway device, said video receiving terminal profile including at least information showing a size of a buffer for absorbing packet delay fluctuations of said video stream;
   a pre-FEC packet quality analyzer that measures quality information from said video stream by using said video receiving terminal profile; and
   a quality information transmitter that transmits the quality information measured by said pre-FEC packet quality analyzer.

7. The home gateway device according to claim 6, wherein the pre-FEC packet quality analyzer calculates a quality value of the video stream and also calculates an identification value for determining in which section of the video stream the quality information has been measured by using a sequence number included in a packet, and includes both said quality value and a result of said calculation as said quality information.

8. The home gateway device according to claim 6, wherein the pre-FEC packet quality analyzer determines whether or not a packet is discarded virtually from the buffer by using the information included in the video receiving terminal profile and showing the size of said buffer and determines a packet loss, and includes a result of said determination in the quality information.

9. A quality management system connected to a best-effort network and using a service of carrying out video communications in real time, said quality management system comprising:
   a quality information classifier that classifies quality information of a video stream, the quality information being generated by using a video receiving terminal profile of a video receiving terminal that receives said video stream and said video receiving terminal profile including at least information showing a size of a buffer for absorbing packet delay fluctuations of said video stream, and that stores said quality information in a quality information database;
   a quality information acquiring unit that acquires said quality information from said quality information database; and
   a quality deterioration determinator that isolates a quality deterioration on a basis of said acquired quality information.

10. The quality management system according to claim 9, wherein the quality information includes a quality value of the video stream and an identification value for determining in which section in the video stream said quality information has been measured, and the quality information acquiring unit specifies a measurement section of quality information transmitted from the video receiving terminal and a measurement section of quality information transmitted from a home gateway device that transmits the video stream to said video receiving terminal by using said identification value, and generates quality information for isolating a quality deterioration.

11. The quality management system according to claim 9, wherein the quality deterioration determinator isolates whether a deterioration has occurred in an external network which is a network upstream from a home gateway device that transmits the video stream to said video receiving terminal, a home network for connecting between said home gateway device and said video receiving terminal, or said video receiving terminal, or whether or not a deterioration has been recovered in said video receiving terminal by using quality information measured by the video receiving terminal and quality information measured by the home gateway device.

12. A quality deterioration isolation system connected to a best-effort network and using a service of carrying out video communications in real time, said quality deterioration isolation system comprising:
- a video receiving terminal that receives a video stream via a home gateway device, and also generates a video receiving terminal profile used for generating quality information of said video stream;
- the home gateway device that generates quality information of said video stream by using said video receiving terminal profile; and
- a quality management system that isolates a quality deterioration of the video stream by using each of pieces of quality information,
- wherein said video receiving terminal profile includes at least information showing a size of a buffer for absorbing packet delay fluctuations of the video stream in said video receiving terminal, said video receiving terminal includes a pre-FEC packet quality analyzer that measures quality information from the video stream which is not yet stored in the buffer and on which a recovery process using FEC is not yet carried out, a post-FEC packet quality analyzer that measures quality information from the video stream which is stored in the buffer and on which the recovery process using FEC is carried out, a quality information transmitter that transmits pieces of measured quality information to a quality management system, and a video receiving terminal profile transmitter that generates said video receiving terminal profile and transmits said video receiving terminal profile to the home gateway device, said home gateway device includes a video receiving terminal acquiring unit that receives the video receiving terminal profile transmitted by the video receiving terminal, a pre-FEC packet quality analyzer that measures quality information from the video stream, and a quality information transmitter that transmits the quality information measured by said pre-FEC packet quality analyzer to the quality management system, and said quality management system includes a quality information classifier that classifies the quality information transmitted thereto and stores this quality information in a quality information database, a quality information acquiring unit that acquires said quality information from said quality information database, and a quality deterioration determinator that isolates a quality deterioration on a basis of said acquired quality information.

13. The quality deterioration isolation system according to claim 12, wherein the quality deterioration determinator of the quality management system isolates whether a deterioration has occurred in an external network which is a network upstream from said home gateway device, a home network for connecting between said home gateway device and said video receiving terminal, or said video receiving terminal, or whether or not a deterioration has been recovered by using the quality information measured by the pre-FEC packet quality analyzer of said video receiving terminal, the quality information measured by the post-FEC packet quality analyzer of said video receiving terminal, and the quality information measured by the pre-FEC packet quality analyzer of said home gateway device.

14. The quality deterioration isolation system according to claim 12, wherein the video receiving terminal includes a deterioration detector that detects whether a quality deterioration has occurred in the video stream, and, only when said deterioration detector detects occurrence of a quality deterioration, generates the video receiving terminal profile.

15. A video receiving terminal connected to a best-effort network and using a service of carrying out video communications in real time, said video receiving terminal comprising:
- a video receiving terminal profile transmitter that generates a video receiving terminal profile showing information specific to said video receiving terminal, and also transmits said video receiving terminal profile to a home gateway device that delivers a video stream;
- an FEC processor that carries out a recovery process using FEC on the video stream including a dummy packet which is generated on a basis of said video receiving terminal profile by said home gateway device, and also adds information including at least a result of said recovery process to said video stream;
- a quality analyzer that measures quality information from the video stream to which said information is added; and
- a quality information transmitter that transmits the measured quality information.

16. The video receiving terminal according to claim 15, wherein the dummy packet includes information identifying where in the video stream caught by the home gateway device a packet loss has occurred, and the FEC processor determines whether or not a packet is said dummy packet and whether or not a lost packet has been recovered by using FEC, and adds information including at least a result of said recovery process to the video stream.

17. The video receiving terminal according to claim 15, wherein the quality analyzer measures quality values of the video stream respectively corresponding to pre-FEC packet quality information which is quality information measured from the video stream which is not yet stored in a buffer used for absorbing packet delay fluctuations in the video stream and on which the recovery process using FEC is not yet carried out, post-FEC packet quality information which is quality information measured from the video stream which is stored in said buffer and on which the recovery process using FEC is carried out, and quality information which is measured from the video stream by the home gateway device.

18. The video receiving terminal according to claim 15, wherein the video receiving terminal profile includes information showing a size of a buffer for absorbing packet delay fluctuations in the video stream in the video receiving terminal.

19. A home gateway device connected to a best-effort network and using a service of carrying out video communications in real time, said home gateway device comprising:
- a video receiving terminal acquiring unit that acquires a video receiving terminal profile which is information specific to a video receiving terminal that receives a video stream delivered via said home gateway device, the video receiving terminal profile including information showing a size of a buffer for absorbing packet delay fluctuations of the video stream in the video receiving terminal; and
- a dummy packet transmitter that judges whether a packet of the video stream to be caught by the home gateway device has been lost, and transmits a dummy packet for the lost packet to said video receiving terminal,
- wherein the dummy packet transmitter is configured to determine, on a basis of the size of the buffer shown in the video receiving terminal profile, whether a packet of the video stream received by the video receiving terminal will be discarded from the buffer, and perform the transmission of the dummy packet when it is determined that the packet will be discarded from the buffer.

20. A quality deterioration isolation system connected to a best-effort network and using a service of carrying out video communications in real time, said quality deterioration isolation system comprising:

a video receiving terminal that receives a video stream via a home gateway device, and also generates a video receiving terminal profile which is information specific to said video receiving terminal;

a home gateway device that generates a dummy packet by using said video receiving terminal profile, and transmits the dummy packet to said video receiving terminal; and a quality management system that isolates a quality deterioration of the video stream by using said quality information, wherein said video receiving terminal includes an FEC processor that carries out a recovery process using FEC on the video stream including said dummy packet, and also adds information including at least a result of said recovery process to said video stream, a quality analyzer that measures quality information from the video stream to which said information is added, a quality information transmitter that transmits the measured quality information to a quality management system, and a video receiving terminal profile transmitter that generates said video receiving terminal profile and transmits said video receiving terminal profile to the home gateway device, said home gateway device includes a video receiving terminal acquiring unit that receives said video receiving terminal profile transmitted by said video receiving terminal, and a dummy packet transmitter that judges the video stream on a basis of said video receiving terminal profile, and transmits the dummy packet to said video receiving terminal, and said quality management system includes a quality information classifier that classifies the quality information transmitted thereto and stores the quality information in a quality information database, a quality information acquiring unit that acquires said quality information from said quality information database, and a quality deterioration determinator that isolates a quality deterioration on a basis of said acquired quality information.

21. A video receiving terminal connected to a best-effort network and using a service of carrying out video communications in real time, said video receiving terminal comprising:

a pre-FEC packet quality analyzer that measures quality information from a video stream which is not yet stored in a buffer used for absorbing packet delay fluctuations in the video stream and on which a recovery process using FEC is not yet carried out, and also adds information generated from a time at a time when receiving a packet to said quality information in order to determine in which section in the video stream said quality information has been measured; and a quality information transmitter that transmits said quality information.

22. A video receiving terminal connected to a best-effort network and using a service of carrying out video communications in real time, said video receiving terminal comprising:

a post-FEC packet quality analyzer that measures quality information from a video stream which is stored in a buffer used for absorbing packet delay fluctuations in the video stream and on which a recovery process using FEC is carried out, and also adds information generated from a time at a time when receiving a packet to said quality information in order to determine in which section in the video stream said quality information has been measured; and a quality information transmitter that transmits said quality information.

23. A home gateway device connected to a best-effort network and using a service of carrying out video communications in real time, said home gateway device comprising:

a pre-FEC packet quality analyzer that measures quality information of a packet to be transferred, and also adds information generated from a time at a time when receiving a packet to said quality information in order to determine in which section in the video stream said quality information has been measured; and a quality information transmitter that transmits the quality information measured by said pre-FEC packet quality analyzer.

24. A quality management system connected to a best-effort network and using a service of carrying out video communications in real time, said quality management system comprising:

a quality information classifier that, on a basis of information generated from a time at a time of receiving a packet, the time being added to quality information received from at least either one of a video receiving terminal that receives a video stream and a home gateway device that transfers said video stream, classifies the quality information of said video stream and stores the quality information in a quality information database;

a quality information acquiring unit that acquires said quality information on a basis of said quality information database; and a quality deterioration determinator that isolates a quality deterioration from said acquired quality information.

* * * * *